(12) United States Patent
Nohara et al.

(10) Patent No.: US 6,473,134 B1
(45) Date of Patent: Oct. 29, 2002

(54) TELEVISION RECEIVER THAT DETECTS ELECTRIC FIELD INFORMATION FROM A RECEIVED TELEVISION SIGNAL AND STABILIZES A DETECTED SYNCHRONIZING SIGNAL ACCORDING TO THE ELECTRIC FIELD INFORMATION

(75) Inventors: Akira Nohara, Nishinomiya; Joji Kane, Nara; Noboru Nomura, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/878,069

(22) Filed: Jun. 18, 1997

(30) Foreign Application Priority Data

Jun. 19, 1996 (JP) .......................................... 8-158017
Jan. 27, 1997 (JP) .......................................... 9-012197

(51) Int. Cl.[7] .................................................. H04N 5/21
(52) U.S. Cl. ........................ 348/614; 348/511; 348/542
(58) Field of Search ................................ 348/542, 511, 348/614, 607, 521; 345/213, 132

(56) References Cited

U.S. PATENT DOCUMENTS

| | | | |
|---|---|---|---|
| 2,520,988 A | 9/1950 | Everitt | 250/33 |
| 2,935,746 A | 5/1960 | Marston et al. | 343/761 |
| 3,568,206 A | 3/1971 | Sisson et al. | 343/750 |
| 3,858,220 A | 12/1974 | Arnow | 343/794 |
| 4,207,574 A | 6/1980 | Toia | 343/752 |
| 4,571,596 A | 2/1986 | Hodgkinson | 343/860 |
| 4,737,991 A | 4/1988 | Sugai et al. | 381/13 |
| 4,801,944 A | 1/1989 | Madnick et al. | 343/944 |
| 4,823,143 A | 4/1989 | Bockrath | 343/781 |
| 4,873,530 A | 10/1989 | Takeuchi et al. | 343/711 |
| 4,958,167 A | 9/1990 | Schroeder | 343/853 |
| 5,138,451 A | 8/1992 | Shinkawa et al. | 358/148 |

(List continued on next page.)

FOREIGN PATENT DOCUMENTS

| | | | |
|---|---|---|---|
| AU | 55898/73 | 11/1974 | |
| DE | 37 32 994 A1 | 4/1989 | |
| EP | 0 777 293 A1 | 6/1997 | |
| FR | 2 553 584 | 4/1985 | |
| GB | 1 020 727 | 2/1966 | |
| JP | 5-191307 | * 1/1992 | H04N/5/44 |
| JP | 4-207303 | 7/1992 | |
| JP | 8-251445 | * 3/1995 | H04N/5/14 |
| WO | WO85-02719 | 6/1985 | |
| WO | WO93-12559 | 6/1993 | |

OTHER PUBLICATIONS

Patent Abstracts of Japan, 1996:04, Apr. 30, 1996, (JP 07 322 156).
Patent Abstracts of Japan, 18:623, Nov. 28, 1994, (JP 06 237 418).
Patent Abstracts of Japan, 12:375, Oct. 7, 1988, (JP 63 122 367).
Patent Abstracts of Japan, 16:104, Mar. 13, 1992, (JP 03 280 674).
Patent Abstracts of Japan, vol. 016, No. 546, (Nov. 16, 1992), JP 04 207593, (Jul. 29, 1992).
Patent Abstracts of Japane, vol. 013, No. 470, (Oct. 24, 1989), JP 01 185076 (Jul. 24, 1989).

Primary Examiner—Victor R. Kostak
(74) Attorney, Agent, or Firm—Smith, Gambrell & Russell, LLP

(57) ABSTRACT

A television signal receiver has: receiving means for receiving a television signal; detecting means for detecting a pulse of a video signal obtained from the receiving means; phase detecting means for detecting the phase of the pulse; video signal stabilizing means for conducting image-stabilization on the video signal obtained in the receiving means, in accordance with control information obtained from the phase detecting means and based on the reception disturbance state; and displaying means for displaying a video signal obtained from the video signal stabilizing means. According to this configuration, therefore, the video signal can be stabilized by the video signal stabilizing means, so that disturbance of an image can be reduced.

4 Claims, 40 Drawing Sheets

U.S. PATENT DOCUMENTS

| | | | |
|---|---|---|---|
| 5,177,493 A | 1/1993 | Kawamura | 343/713 |
| 5,303,396 A | 4/1994 | Ooyagi et al. | |
| 5,311,315 A * | 5/1994 | Sakata | 348/614 |
| 5,335,010 A | 8/1994 | Lindemeier et al. | |
| 5,442,368 A | 8/1995 | Harada et al. | 343/713 |
| 5,457,467 A | 10/1995 | Schenkyr | 343/713 |
| 5,486,836 A | 1/1996 | Kuffner et al. | 343/700 |
| 5,517,206 A | 5/1996 | Boone et al. | 343/806 |
| 5,572,226 A | 11/1996 | Tuttle | 343/726 |
| 5,574,508 A * | 11/1996 | Diamant | 348/511 |
| 5,585,807 A | 12/1996 | Takei | 343/702 |
| 5,600,380 A * | 2/1997 | Patel et al. | 348/614 |
| 5,623,320 A * | 4/1997 | Rim | 348/614 |
| 5,710,568 A | 1/1998 | Shirazi et al. | 343/719 |
| 5,717,467 A * | 2/1998 | Shiki | 348/511 |
| 5,781,185 A * | 7/1998 | Shin | 345/213 |
| 5,801,767 A * | 9/1998 | Wu | 348/511 |
| 5,973,752 A * | 10/1999 | Matsunaga | 348/614 |

* cited by examiner

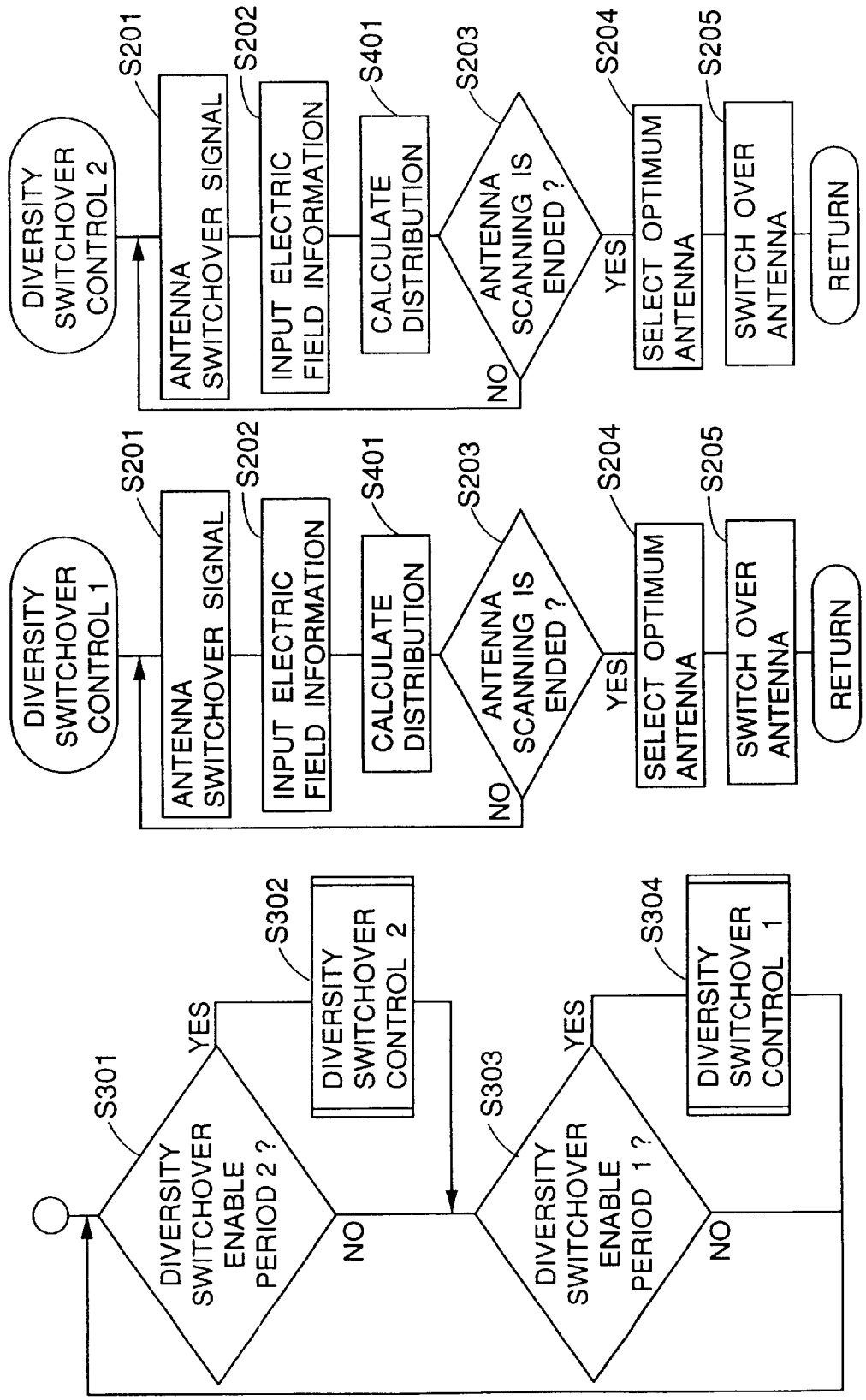

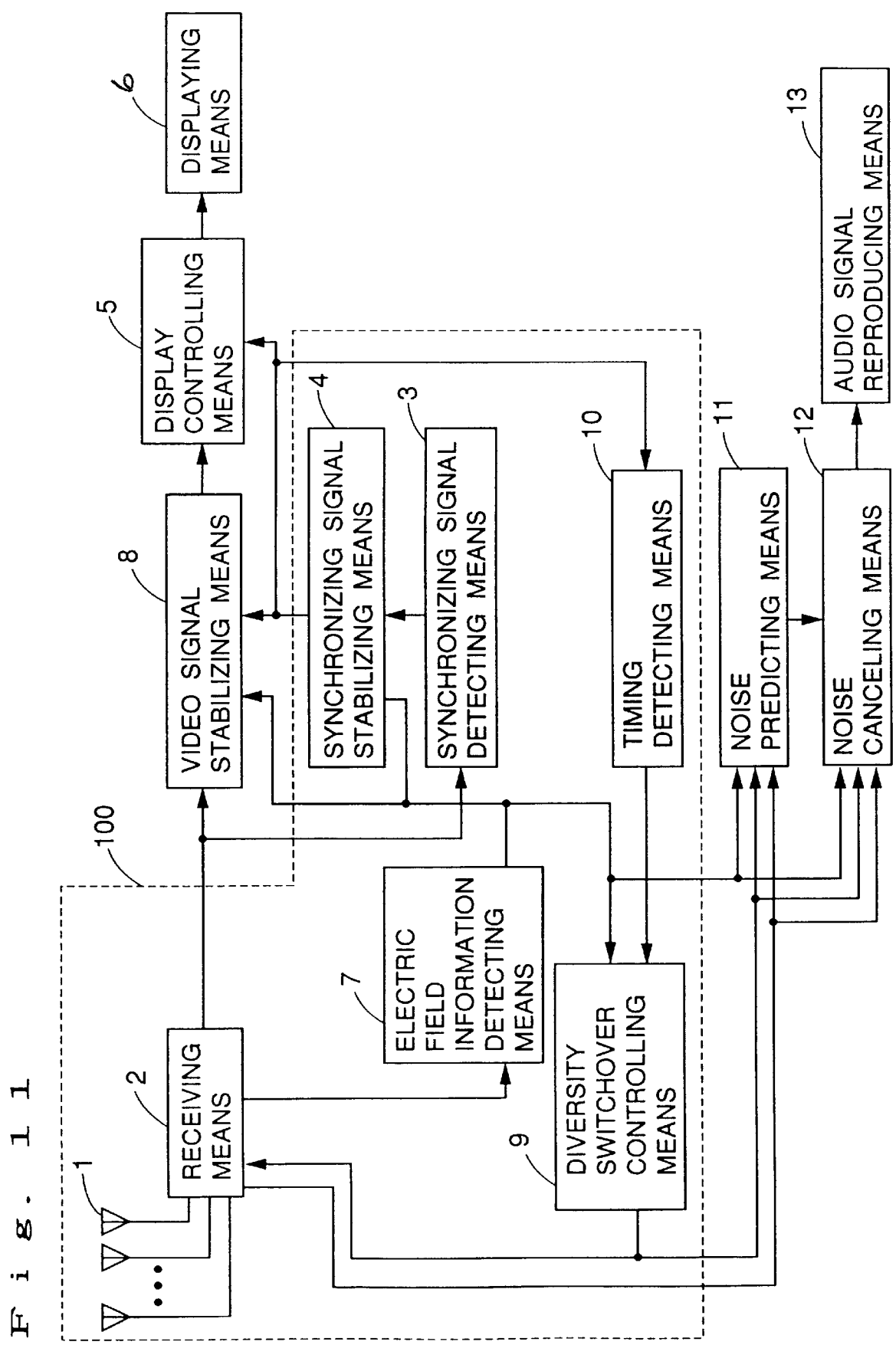

Fig. 16 (a)

| HORIZONTAL SYNCHRONIZING SIGNAL H₁ | 50 |
|---|---|
|  |  |
|  |  |
| ⋮ | ⋮ |
|  |  |
|  |  |

Fig. 16 (b)

| HORIZONTAL SYNCHRONIZING SIGNAL H₂ | 70 |
|---|---|
| HORIZONTAL SYNCHRONIZING SIGNAL H₁ | 50 |
|  |  |
| ⋮ | ⋮ |
|  |  |
|  |  |

Fig. 16 (c)

| HORIZONTAL SYNCHRONIZING SIGNAL Hₙ | 60 |
|---|---|
| HORIZONTAL SYNCHRONIZING SIGNAL Hₙ₋₁ | 65 |
|  |  |
| ⋮ | ⋮ |
| HORIZONTAL SYNCHRONIZING SIGNAL Hⱼ₊₁ | 100 |
| HORIZONTAL SYNCHRONIZING SIGNAL Hⱼ | 120 |

VERTICAL SYNCHRONIZING SIGNAL INPUT TABLE

| DATA NUMBER | VERTICAL SYNCHRONIZATION PHASE | HORIZONTAL SYNCHRONIZATION PHASE | ELECTRIC FIELD INFORMATION | RELIABILITY |
|---|---|---|---|---|
| 1 | VERTICAL SYNCHRONIZATION PHASE 1 | HORIZONTAL SYNCHRONIZATION PHASE 1 | ELECTRIC FIELD INFORMATION 1 | RELIABILITY 1 |
| 2 | VERTICAL SYNCHRONIZATION PHASE 2 | HORIZONTAL SYNCHRONIZATION PHASE 2 | ELECTRIC FIELD INFORMATION 2 | RELIABILITY 2 |
| ... | ... | ... | ... | ... |
| J | VERTICAL SYNCHRONIZATION PHASE J | HORIZONTAL SYNCHRONIZATION PHASE J | ELECTRIC FIELD INFORMATION J | RELIABILITY J |

Fig. 18(b)

HORIZONTAL SYNCHRONIZING SIGNAL INPUT TABLE

| DATA NUMBER | VERTICAL SYNCHRONIZATION PHASE | HORIZONTAL SYNCHRONIZATION PHASE | ELECTRIC FIELD INFORMATION | RELIABILITY |
|---|---|---|---|---|
| 1 | VERTICAL SYNCHRONIZATION PHASE 1 | HORIZONTAL SYNCHRONIZATION PHASE 1 | ELECTRIC FIELD INFORMATION 1 | RELIABILITY 1 |
| 2 | VERTICAL SYNCHRONIZATION PHASE 2 | HORIZONTAL SYNCHRONIZATION PHASE 2 | ELECTRIC FIELD INFORMATION 2 | RELIABILITY 2 |
| ... | ... | ... | ... | ... |
| J | VERTICAL SYNCHRONIZATION PHASE J | HORIZONTAL SYNCHRONIZATION PHASE J | ELECTRIC FIELD INFORMATION J | RELIABILITY J |

Fig. 18(a)

| FREQUENCY TABLE 1 | | | | |
|---|---|---|---|---|
| PHASE 1 | DETECTION FREQUENCY 1 |
| PHASE 2 | DETECTION FREQUENCY 2 |
| ... | ... |
| PHASE M | DETECTION FREQUENCY M |

Fig. 19(a)

| FREQUENCY TABLE 2 | | | | |
|---|---|---|---|---|
| PHASE 1 | DETECTION FREQUENCY 1 |
| PHASE 2 | DETECTION FREQUENCY 2 |
| ... | ... |
| PHASE M | DETECTION FREQUENCY M |

Fig. 19(b)

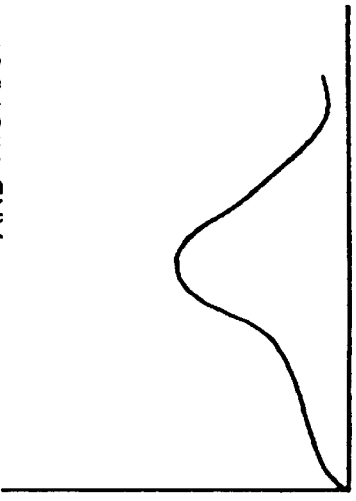
Fig. 20(b) PHASE FREQUENCY DISTRIBUTIONS AND HISTOGRAMS
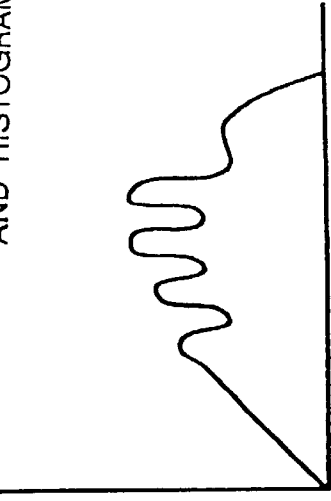
Fig. 20(d) PHASE FREQUENCY DISTRIBUTIONS AND HISTOGRAMS
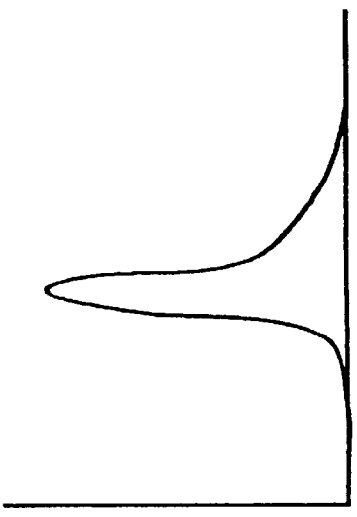
Fig. 20(a) PHASE FREQUENCY DISTRIBUTIONS AND HISTOGRAMS
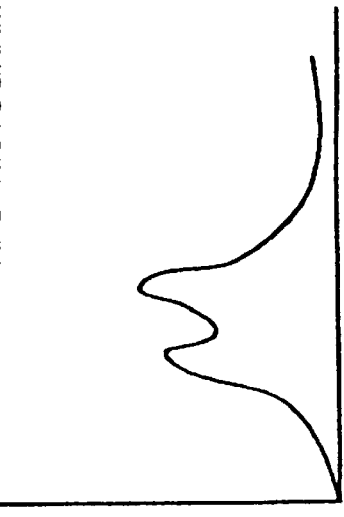
Fig. 20(c) PHASE FREQUENCY DISTRIBUTIONS AND HISTOGRAMS

MANNER OF EQUALIZED
PHASE DISTRIBUTION

MANNER OF EQUALIZED
PHASE DISTRIBUTION

TELEVISION RECEIVER THAT DETECTS ELECTRIC FIELD INFORMATION FROM A RECEIVED TELEVISION SIGNAL AND STABILIZES A DETECTED SYNCHRONIZING SIGNAL ACCORDING TO THE ELECTRIC FIELD INFORMATION

BACKGROUND OF THE INVENTION

1. Field of the Invention

The invention relates to a television receiver, an antenna diversity controller, a synchronizing signal stabilizer, a luminance signal stabilizer, a color signal stabilizer, a video signal stabilizer, and a method of transmitting a television signal and a television signal receiver.

2. Related Art of the Invention

Recently, a car television set which is one of video signal receivers for a mobile unit comes into widespread use.

Hereinafter, an example of such a car television set of the prior art will be described with reference to the drawings. FIG. 40 is a view showing the configuration of a car television set of the prior art.

In the figure, 901 designates diversity antennas, 902 designates a tuner unit, 903 designates a video signal processing unit, 904 designates a display control unit, 905 designates a display unit, 906 designates an audio signal processing unit, and 907 designates an audio output unit.

The operation of the thus configured car television set will be described.

First, a television signal obtained by the diversity antennas 901 is subjected to video detection and audio detection in the tuner unit 902 to be divided into a video signal and an audio signal. The audio signal is subjected to a filtering process by the audio signal processing unit 906, and then transmitted to the audio output unit 907, thereby obtaining an audio output.

On the other hand, the video signal obtained from the tuner unit 902 is subjected to a color signal process and a synchronizing signal process in the video signal processing unit 903 to be divided into RGB signals, and then transmitted to the display control unit 904. The display control unit transmits the RGB signals and the synchronizing signal obtained from the video signal processing unit 903 to the display unit 905, and an image is output from the display unit 905.

In the configuration, however, multipaths of the RF video signal and variation of the electric field strength during mobile reception cause the video and audio signals to be disturbed. This produces problems as follows. In the video signal, a disturbance appears in the synchronizing signal, so that the image flows or is distorted. In the audio signal, many pulsative noises are produced.

On the other hand, in the above configuration, however, wave multipaths in mobile reception cause the video and audio signals to be disturbed. This produces a problem in that disturbances such as image flow, distortion, image skip, and multiple images occur in the video signal. At present, the ghost cancel system using a ghost cancel reference signal (GCR) is employed. However, the system requires several seconds until an effect is attained, and has a problem in that the system cannot attain an effect in mobile reception.

SUMMARY OF THE INVENTION

In view of the problems of the related art, it is an object of the invention to provide a television receiver, an antenna diversity controller, a synchronizing signal stabilizer, a luminance signal stabilizer, a color signal stabilizer, and a video signal stabilizer which can stabilize an image in mobile reception and reduce noises in an audio signal as compared with the prior art.

In view of the problems of the related prior it is an object of the invention to provide a method of transmitting a television signal and a television signal receiver in which an image in mobile reception can be stabilized as compared with the prior art.

A television receiver of the invention comprises:
receiving means for receiving a television signal;
synchronizing signal detecting means for detecting a synchronizing signal of a video signal obtained from said receiving means;
electric field information detecting means for detecting electric field information from a signal obtained from said receiving means;
synchronizing signal stabilizing means for stabilizing the detected synchronizing signal on the basis of the electric field information;
display controlling means for controlling a display of the video signal by using the stabilized synchronizing signal; and
displaying means for displaying a signal output from said display controlling means.

A television receiver of the invention comprises:
receiving means for receiving a television signal;
synchronizing signal detecting means for detecting a synchronizing signal of a video signal obtained from said receiving means;
synchronizing signal stabilizing means for stabilizing the detected synchronizing signal;
video signal stabilizing means for stabilizing the video signal obtained from said receiving means, by using the stabilized synchronizing signal, and for outputting the stabilized video signal;
display controlling means for controlling a display of the stabilized video signal by using the stabilized synchronizing signal; and
displaying means for displaying a signal output from said display controlling means.

A television receiver of the invention comprises:
receiving means for receiving a television signal;
synchronizing signal detecting means for detecting a synchronizing signal of a video signal obtained from said receiving means;
synchronizing signal stabilizing means for stabilizing the detected synchronizing signal;
display controlling means for controlling a display of the video signal by using the stabilized synchronizing signal; and
liquid crystal displaying means for conducting a liquid crystal display of a signal output from said display controlling means.

An antenna diversity controller of the invention comprises: antennas of a diversity system for receiving a television wave; receiving means of the diversity system for receiving television signals obtained from said antennas; and diversity switchover controlling means for sending an antenna switchover signal to said receiving means to conduct a diversity switchover control, wherein said controller further comprises:
synchronizing signal detecting means for detecting a synchronizing signal of a video signal obtained from said receiving means;

synchronizing signal stabilizing means for stabilizing the detected synchronizing signal; and timing detecting means for detecting a timing of the video signal, on the basis of the stabilized synchronizing signal, and said diversity switchover controlling means sends the antenna switchover signal to said receiving means on the basis of at least the detected timing, and conducts the diversity switchover control.

A television receiver of the invention comprises:

antennas of a diversity system for receiving a television wave;

receiving means of the diversity system for receiving television signals obtained from said antennas;

synchronizing signal detecting means for detecting a synchronizing signal of a video signal obtained from said receiving means;

synchronizing signal stabilizing means for stabilizing the detected synchronizing signal;

timing detecting means for detecting a timing of the video signal on the basis of the stabilized synchronizing signal;

diversity switchover controlling means for sending an antenna switchover signal to said receiving means on the basis of at least the detected timing to conduct a diversity switchover control;

electric field information detecting means for detecting electric field information from a signal obtained from said receiving means;

noise predicting means for predicting noises of an audio signal obtained from said receiving means, on the basis of the electric field information;

noise canceling means for reducing noises of the audio signal, on the basis of the predicted noises obtained from said noise predicting means and the electric field information;

audio signal reproducing means for reproducing an audio signal output from said noise canceling means;

display controlling means for controlling a display of the video signal obtained from said receiving means, by using the stabilized synchronizing signal; and displaying means for displaying a signal output from said display controlling means.

A television receiver of the invention comprises:

antennas of a diversity system for receiving a television wave;

receiving means of the diversity system for receiving television signals obtained from said antennas;

synchronizing signal detecting means for detecting a synchronizing signal of a video signal obtained from said receiving means;

synchronizing signal stabilizing means for stabilizing the detected synchronizing signal;

timing detecting means for detecting a timing of the video signal on the basis of the stabilized synchronizing signal;

diversity switchover controlling means for sending an antenna switchover signal to said receiving means on the basis of at least the detected timing to conduct a diversity switchover control;

display controlling means for controlling a display of the video signal obtained from said receiving means, by using the stabilized synchronizing signal; and displaying means for displaying a signal output from said display controlling means.

A synchronizing signal stabilizer of the invention comprises:

synchronizing signal detecting means for detecting a synchronizing signal of an input video signal;

horizontal synchronization phase detecting means for detecting a phase of a horizontal synchronizing signal of the synchronizing signal obtained from said synchronizing signal detecting means;

horizontal synchronization phase distribution calculating means for obtaining a distribution of the detected phase of the horizontal synchronizing signal;

horizontal synchronization phase estimating means for estimating the phase of the horizontal synchronizing signal, by using the obtained distribution of the phase of the horizontal synchronizing signal; and synchronizing signal outputting means for outputting a stabilized synchronizing signal on the basis of the estimated phase of the horizontal synchronizing signal.

A synchronizing signal stabilizer of the invention comprises:

synchronizing signal detecting means for detecting a synchronizing signal of an input video signal;

horizontal synchronization phase detecting means for detecting a phase of a horizontal synchronizing signal of the synchronizing signal obtained from said synchronizing signal detecting means;

horizontal synchronization phase distribution calculating means for obtaining a distribution of the detected phase of the horizontal synchronizing signal;

horizontal synchronization phase estimating means for estimating the phase of the horizontal synchronizing signal, by using the obtained distribution of the phase of the horizontal synchronizing signal;

vertical synchronization phase detecting means for detecting a phase of a vertical synchronizing signal of the synchronizing signal obtained from said synchronizing signal detecting means;

vertical synchronization phase distribution calculating means for obtaining a distribution of the detected phase of the vertical synchronizing signal;

vertical synchronization phase estimating means for estimating the phase of the vertical synchronizing signal, by using the obtained distribution of the phase of the vertical synchronizing signal; and synchronizing signal outputting means for outputting a stabilized synchronizing signal on the basis of the estimated phase of the horizontal synchronizing signal and the estimated phase of the vertical synchronizing signal.

A synchronizing signal stabilizer of the invention comprises:

synchronizing signal detecting means for detecting a synchronizing signal of an input video signal;

synchronizing signal stabilizing means for stabilizing the synchronizing signal obtained from said synchronizing signal detecting means;

memory means for storing the stabilized synchronizing signal; and comparing means for comparing the stored synchronizing signal with the synchronizing signal obtained from said synchronizing signal detecting means, and when the stabilization is to be conducted, said synchronizing signal stabilizing means utilizes a result of the comparison conducted by said comparing means.

A luminance signal stabilizer of the invention comprises luminance reference signal detecting means for, by using a synchronizing signal of a video signal included in a received signal, obtaining a luminance reference signal of the video signal;

luminance information calculating means for calculating luminance information from the luminance reference signal, and for holding the calculated luminance information;

luminance reference signal judging means for judging reliability of the luminance reference signal by using the held luminance information;

luminance reference signal interpolation controlling means for conducting an interpolation generation control of the luminance reference signal on the basis of a result of the judgement; and luminance reference signal interpolating means for, on the basis of the result of the judgement, outputting the luminance reference signal with interpolating the luminance reference signal in accordance with interpolation information obtained from said luminance reference signal interpolation controlling means, or outputting the luminance reference signal without conducting the interpolation.

A color signal stabilizer of the invention comprises:

color reference signal detecting means for, by using a synchronizing signal of a video signal included in a received signal, obtaining a color reference signal of the video signal;

color information calculating means for calculating color information from the color reference signal, and for holding the calculated color information;

color reference signal judging means for judging reliability of the color reference signal by using the held color information;

color reference signal interpolation controlling means for conducting an interpolation generation control of the color reference signal on the basis of a result of the judgement; and color reference signal interpolating means for, on the basis of the result of the judgement, outputting the color reference signal with interpolating the color reference signal in accordance with interpolation information obtained from said color reference signal interpolation controlling means, or outputting the color reference signal without conducting the interpolation.

A video signal stabilizer of the invention comprises: said luminance signal stabilizer set forth in claim 31; and said color signal stabilizer set forth in claim 37, said stabilizer further comprising:

video signal synthesizing means for synthesizing the video signal, the luminance reference signal output from said luminance reference signal interpolating means, and the color reference signal output from said color reference signal interpolating means with each other, and for outputting the synthesized signal.

A video signal stabilizer of the invention comprises:

electric field information detecting means for detecting electric field information from an input received signal;

a video frame memory which stores a video signal of the received signal;

video signal stabilizing means for conducting a stabilizing process on the video signal; and video output controlling means for, by using the electric field information, selecting one of the video signal obtained from said video signal synthesizing means, and the video signal obtained from said video frame memory, and for outputting the selected video signal.

According to the invention, therefore, an abnormality of the synchronizing signal caused by radio interference such as multipaths or variation of an electric field is stabilized by the synchronizing signal stabilizing means. A video signal process is then conducted by using the correct synchronizing signal which has been stabilized, and synchronization is stabilized, thereby enabling the abnormality of the video signal to be detected. An image is stabilized by the video signal stabilizing means, whereby disturbance of the image can be reduced. With respect to an audio signal, noise components contained in the audio signal are predicted by the noise predicting means, and audio noises are canceled by the noise canceling means. Therefore, pulsative noises which are produced in the prior art can be reduced.

A television signal receiver of the invention comprises: receiving means for receiving a television signal; pulse detecting means for detecting a pulse of a video signal obtained from said receiving means; phase detecting means for detecting a phase of the detected pulse; video signal stabilizing means for conducting image-stabilization on the video signal obtained in said receiving means, on the basis of control information output from said phase detecting means; and displaying means for displaying a video signal obtained from said video signal stabilizing means.

A television signal receiver of the invention comprises: receiving means for receiving a television signal; pulse detecting means for detecting a pulse of a video signal obtained from said receiving means; phase detecting means for detecting a phase of the detected pulse; ghost detecting means for detecting a ghost of the video signal; video signal stabilizing means for conducting image-stabilization on the video signal obtained in said receiving means, on the basis of control information obtained from said phase detecting means and control information obtained from said ghost detecting means; and displaying means for displaying a video signal obtained from said video signal stabilizing means.

49. A method of transmitting a television signal in which a control signal is inserted into a vertical blanking interval of the television signal.

A television signal receiver of the invention comprises: receiving means for receiving a television signal; pulse detecting means for detecting a pulse of a video signal obtained from said receiving means; phase detecting means for detecting a phase of the detected pulse; control signal detecting means for detecting a control signal of the television signal; video signal stabilizing means for conducting image-stabilization on the video signal obtained in said receiving means, on the basis of control information obtained from said phase detecting means and control information obtained from said control signal detecting means; and displaying means for displaying a video signal obtained from said video signal stabilizing means.

A television signal receiver of the invention comprises: receiving means for receiving a television signal; synchronizing signal detecting means for detecting a synchronizing signal of a video signal obtained from said receiving means; synchronization phase detecting means for detecting a phase of the synchronizing signal; control signal detecting means for detecting a control signal of the television signal; video signal stabilizing means for conducting image-stabilization on the video signal obtained in said receiving means, on the basis of control information obtained from said control signal detecting means; and displaying means for displaying a video signal obtained from said video signal stabilizing means.

A television signal receiver of the invention comprises: receiving means for receiving a television signal; synchronizing signal detecting means for detecting a synchronizing signal of a video signal obtained from said receiving means; synchronization phase detecting means for detecting a phase of the synchronizing signal; synchronizing signal stabilizing means for stabilizing the synchronizing signal on the basis of phase information obtained from said synchronization phase detecting means; control signal detecting means for detecting a control signal of the television signal; video signal stabilizing means for conducting image-stabilization on the video signal obtained in said receiving means, on the basis of control information obtained from said control signal detecting means and control information obtained from said synchronizing signal stabilizing means; and displaying means for displaying a video signal obtained from said video signal stabilizing means.

A television signal receiver of the invention comprises: receiving means for receiving a television signal; synchronizing signal detecting means for detecting a synchronizing signal of a video signal obtained from said receiving means; synchronization phase detecting means for detecting a phase of the synchronizing signal; synchronizing signal stabilizing means for stabilizing the synchronizing signal on the basis of phase information obtained from said synchronization phase detecting means; video signal stabilizing means for conducting image-stabilization on the video signal obtained in said receiving means, on the basis of control information obtained from said synchronizing signal stabilizing means; and displaying means for displaying a video signal obtained from said video signal stabilizing means.

A television signal receiver of the invention comprises: receiving means for receiving a television signal; synchronizing signal detecting means for detecting a synchronizing signal of a video signal obtained from said receiving means; synchronization phase detecting means for detecting a phase of the synchronizing signal; synchronizing signal stabilizing means for stabilizing the synchronizing signal on the basis of phase information obtained from said synchronization phase detecting means; ghost detecting means for detecting a ghost of the television signal obtained from said receiving means, on the basis of ghost information obtained from said synchronization phase detecting means; video signal stabilizing means for conducting image-stabilization on the video signal obtained in said receiving means, on the basis of ghost control information obtained from said ghost detecting means and control information obtained from said synchronizing signal stabilizing means; and displaying means for displaying a video signal output from said video signal stabilizing means.

A television signal receiver of the invention comprises: receiving means for receiving a television signal; synchronizing signal detecting means for detecting a synchronizing signal of a video signal obtained from said receiving means; synchronization phase detecting means for detecting a phase of the synchronizing signal; synchronizing signal stabilizing means for stabilizing the synchronizing signal on the basis of phase information obtained from said synchronization phase detecting means; ghost detecting means for detecting a ghost of the television signal obtained from said receiving means, on the basis of ghost information obtained from said synchronization phase detecting means; control signal detecting means for detecting a control signal of the television signal; video signal stabilizing means for conducting image-stabilization on the video signal obtained in said receiving means, on the basis of control information obtained from said control signal detecting means, ghost control information obtained from said ghost detecting means, and control information obtained from said synchronizing signal stabilizing means; and displaying means for displaying a video signal output from said video signal stabilizing means.

According to the invention, therefore, a television signal into which the control signal is inserted is received, whereby abnormality of a video signal caused by multipaths or the like can be detected. Furthermore, the video signal can be stabilized by the video signal stabilizing means, so that disturbance of an image can be reduced.

BRIEF DESCRIPTION OF THE DRAWINGS

FIG. 10(*a*) is a flowchart showing another method of the diversity switchover control of the antenna diversity controller of the embodiment, FIG. 10(*b*) is a flowchart showing diversity switchover control routine 2 in the other method of the diversity switchover control, and FIG. 10(*c*) is a flowchart showing diversity switchover control routine 1 in the other method of the diversity switchover control.

FIG. 11 is a view showing the configuration of a television video/audio signal receiver which is a further embodiment of the television receiver of the invention.

FIG. 16(*a*) is a diagrammatic view showing the manner of storing phase data of a horizontal synchronizing signal H1 in a horizontal synchronization phase input buffer of the embodiment, FIG. 16(*b*) is a diagrammatic view showing the manner of storing phase data of horizontal synchronizing signals H1 and H2 in the horizontal synchronization phase input buffer of the embodiment, and FIG. 16(*c*) is a diagrammatic view showing the manner of storing latest phase data in the horizontal synchronization phase input buffer of the embodiment.

FIG. 18(*a*) is a diagrammatic view showing a horizontal synchronizing signal input table, and FIG. 18(*b*) is a diagrammatic view showing a vertical synchronizing signal input table.

FIG. 19(*a*) is a diagrammatic view showing horizontal phase frequency table 1, and FIG. 19(*b*) is a diagrammatic view showing horizontal phase frequency table 2.

FIG. 20(*a*) is a view of a phase distribution in the case where the wave strength is sufficiently high and disturbances due to multipaths and the like less occur, FIG. 20(*b*) is a view of a phase distribution in the case where the wave level is low, FIG. 20(*c*) is a view of a phase distribution in the case where multipaths exist, and FIG. 20(*d*) is a view of a phase distribution in the case where multipaths exist.

Figure 1:
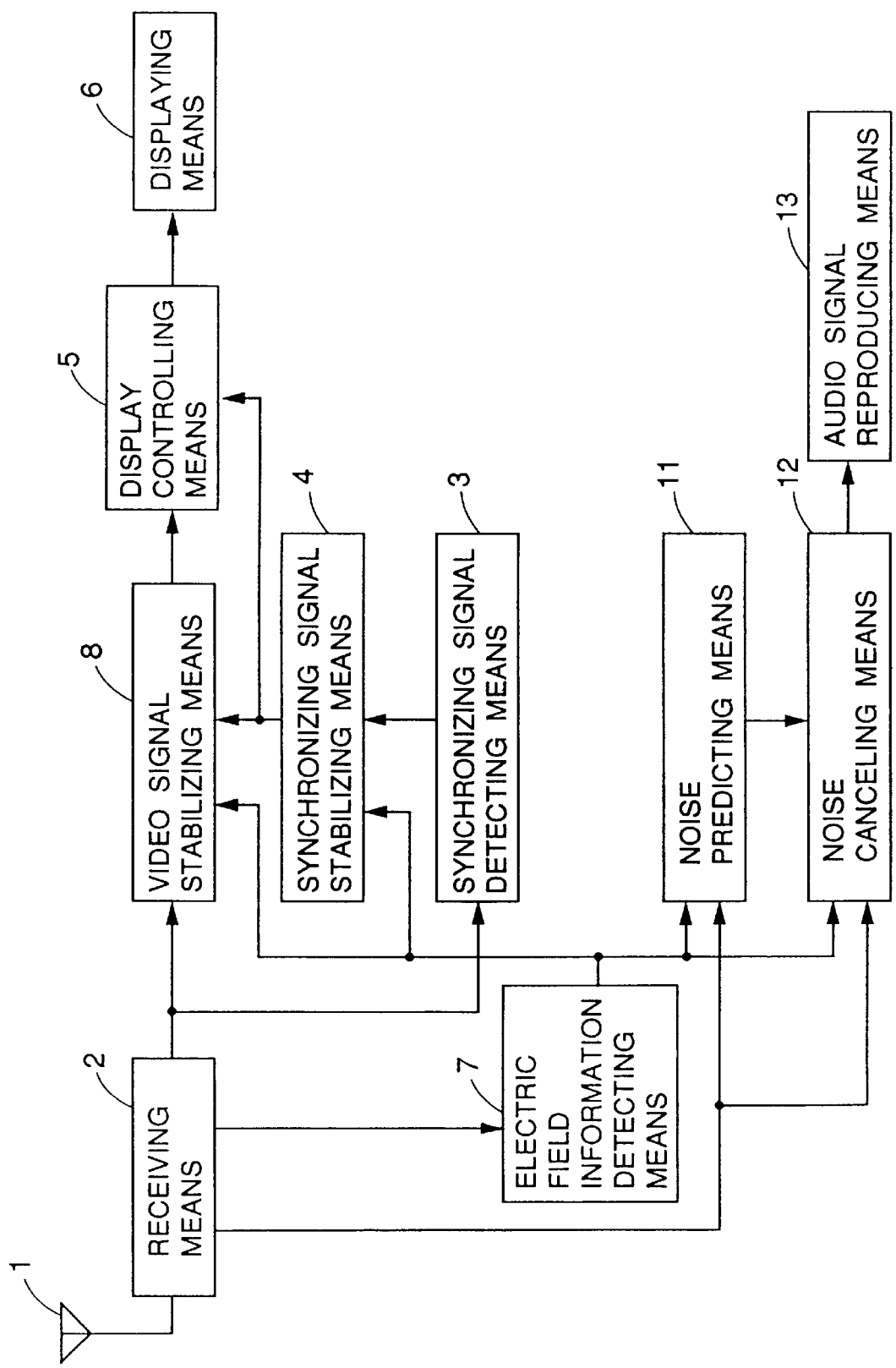
FIG. 1 is a view showing the configuration of a television video/audio signal receiver which is an embodiment of the television receiver of the invention.

DESCRIPTION OF THE REFERENCE NUMERALS 1 antenna
2 receiving means
3 synchronizing signal detecting means
4 synchronizing signal stabilizing means
5 display controlling means
6 displaying means
7 electric field information detecting means
8 video signal stabilizing means
9 diversity switchover controlling means
10 timing detecting means
11 noise predicting means
12 noise canceling means
13 audio signal reproducing means
100 antenna diversity controller
401 horizontal synchronization phase detecting means
402 horizontal synchronization phase distribution calculating means
403 horizontal synchronization phase estimating means
408 horizontal synchronization phase input buffer
404 vertical synchronization phase detecting means
405 vertical synchronization phase distribution calculating means
406 vertical synchronization phase estimating means
409 vertical synchronization phase input buffer
407 synchronizing signal outputting means
801 luminance reference signal detecting means
804 luminance information calculating means
802 luminance reference signal judging means 803 pedestal clamp interpolation controlling means
821 color reference signal detecting means
822 color reference signal judging means
824 color information calculating means
310 receiving means
302 pulse detecting means
303 phase detecting means
304 ghost detecting means
305 video signal stabilizing means
306 displaying means
307 control signal detecting means
310 vertical blanking interval
311 video signal interval
312 anterior equalizing pulse interval
313 vertical synchronizing signal interval
314 posterior equalizing pulse interval
315 reserve video signal interval
316 video signal interval
81 synchronizing signal detecting means
82 synchronization phase detecting means
83 synchronizing signal stabilizing means

DESCRIPTION OF THE PREFERRED
EMBODIMENTS

Hereinafter, embodiments of the invention will be described with reference to the drawings.

(Embodiment 1)

FIG. 1 is a view showing the configuration of a television video/audio signal receiver which is an embodiment of the television receiver of the invention.

The configuration of the embodiment will be described with reference to the figure. An antenna 1 receives a television wave, and receiving means 2 receives a television signal obtained from the antenna 1. Synchronizing signal detecting means 3 detects a synchronizing signal of a video signal obtained from the receiving means 2, and synchronizing signal stabilizing means 4 stabilizes the synchronizing signal obtained from the synchronizing signal detecting means 3, on the basis of electric field information obtained from electric field information detecting means 7 which will be described later. Display controlling means 5 controls a display of the video signal obtained from the receiving means 2, by using the synchronizing signal obtained from the synchronizing signal stabilizing means. 4, and displaying means 6 displays a signal output from the display controlling means 5. The electric field information detecting means 7 detects electric field information from a signal obtained from the receiving means 2, and video signal stabilizing means 8 stabilizes the video signal obtained from the receiving means 2 by using the synchronizing signal obtained from the synchronizing signal stabilizing means 4 and the electric field information obtained from the electric field information detecting means 7, and outputs the stabilized video signal. Noise predicting means 11 predicts noises of an audio signal obtained from the receiving means 2, on the basis of the electric field information obtained from the electric field information detecting means 7. Noise canceling means 12 reduces noises of the audio signal, on the basis of the predicted noises obtained from the noise predicting means 11 and the electric field information obtained from the electric field information detecting means 7. Audio signal reproducing means 13 reproduces an audio signal output from the noise canceling means 12.

The operation of the thus configured embodiment will be described with reference to FIG. 1.

A video signal wave is obtained by the antenna 1 which is one kind of inputting means for a video signal, and the obtained signal is then transmitted to the receiving means 2. In the receiving means 2, a video signal and an audio signal are detected from a television signal, and, for example, an IF signal is generated as a control signal for detecting electric field information. The synchronizing signal detecting means 3 detects a vertical synchronizing signal and a horizontal synchronizing signal from the video signal and transmits the signals to the synchronizing signal stabilizing means.

On the other hand, in the electric field information detecting means 7, electric field information such as the state of multipaths of the received wave, the electric field strength, and variation of the electric field strength is detected from the control signal obtained from the receiving means 2.

The synchronizing signal stabilizing means 4 conducts a stabilizing process on the synchronizing signal obtained in the synchronizing signal detecting means, on the basis of the electric field information obtained in the electric field information detecting means 7. In this process, for example, a synchronizing signal of an abnormal phase is deleted, a missing synchronizing signal is interpolated, and the pulse width of a synchronizing signal is improved.

The video signal stabilizing means 8 conducts a stabilizing process on the video signal obtained from the receiving means 2 by using the synchronizing signal obtained from the synchronizing signal stabilizing means 4. The stabilizing process includes generation of a luminance signal by interpolation, generation of a color signal by interpolation, and replacement of an image. After the stabilizing process, the video signal is output. In the embodiment, specifically, objects which are to be stabilized by the video signal stabilizing means 8 include a luminance signal, a color signal, ghosts, and an image skip.

In the display controlling means 5, a signal appropriate for the displaying means 6 is generated from the video signal obtained from the video signal stabilizing means 8, by using the synchronizing signal obtained from the synchronizing signal stabilizing means 4, and the generated signal is supplied to the displaying means 6.

On the other hand, with respect to the audio signal obtained from the receiving means 2, noise components contained in the signal are predicted by the noise predicting means 11. When the electric field information is used in the prediction, it is possible to accurately predict the noise components. In the noise canceling means 12, a noise canceling process which uses the noise signal obtained from the noise predicting means 11 and corresponds to the electric field information is conducted on the audio signal obtained from the receiving means 2. The result of the process is output. The spectrum subtraction process or the filtering process may be used as the noise canceling process. The audio signal which has undergone the noise canceling process is output by the audio signal reproducing means 13.

As a result, the stabilized video signal, and the audio signal in which noises are reduced can be obtained.

Figure 2:
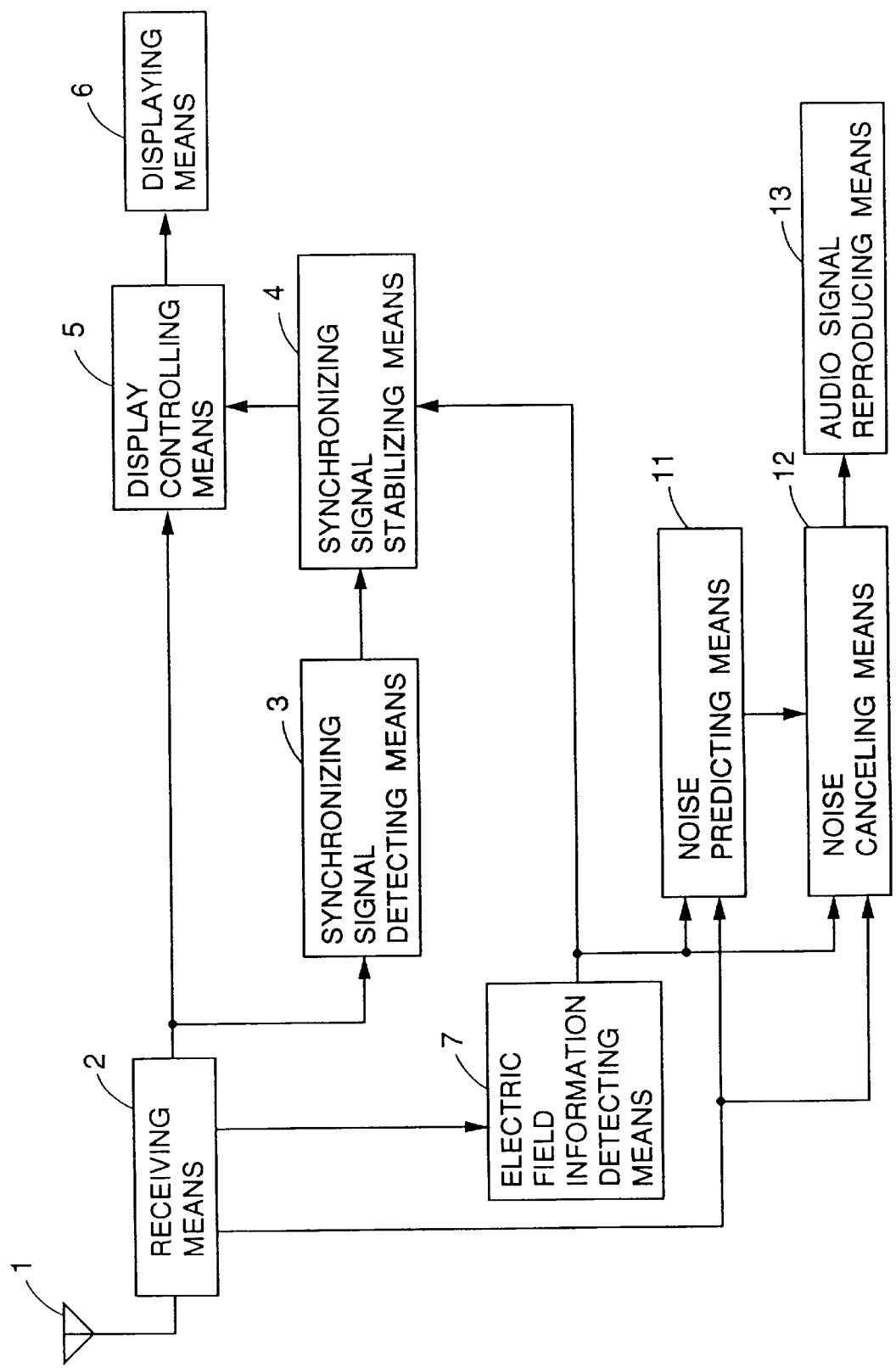
FIG. 2 is a view showing the configuration of a television video/audio signal receiver which is another embodiment of the television receiver of the invention.

In the above, the embodiment which is a receiver having video signal stabilizing means has been described. The invention is not restricted to this. As shown in FIG. 2, for example, a configuration in which video signal stabilizing means is not disposed may be employed. FIG. 2 is a view showing the configuration of a television video/audio signal receiver as another example in which the video signal stabilizing means 8 of the television video/audio signal receiver shown in FIG. 1 is not disposed. As shown in the figure, the television video/audio signal receiver comprises: receiving means 2 for receiving a television signal; synchronizing signal detecting means 3 for detecting a synchronizing signal of a video signal obtained from the receiving means 2; electric field information detecting means 7 for detecting electric field information from a signal obtained from the receiving means 2; synchronizing signal stabilizing means 4 for stabilizing the synchronizing signal obtained from the synchronizing signal detecting means 3, on the basis of the electric field information obtained from the electric field information detecting means 7; display controlling means 5 for controlling a display of the video signal obtained from the receiving means 2, by using the synchronizing signal obtained from the synchronizing signal stabilizing means 4; and displaying means 6 for displaying a signal output from the display controlling means 5. The television video/audio signal receiver further comprises: noise predicting means 11 for predicting noises of an audio signal obtained from the receiving means 2, on the basis of the electric field information obtained from the electric field information detecting means 7; noise canceling means 12 for reducing noises of the audio signal, on the basis of the predicted noises obtained from the noise predicting means 11 and the electric field information obtained from the electric field information detecting means 7; and audio signal reproducing means 13 for reproducing an audio signal output from the noise canceling means 12. The embodiment can attain effects which are substantially identical with those of the embodiment described above.

Figure 3:
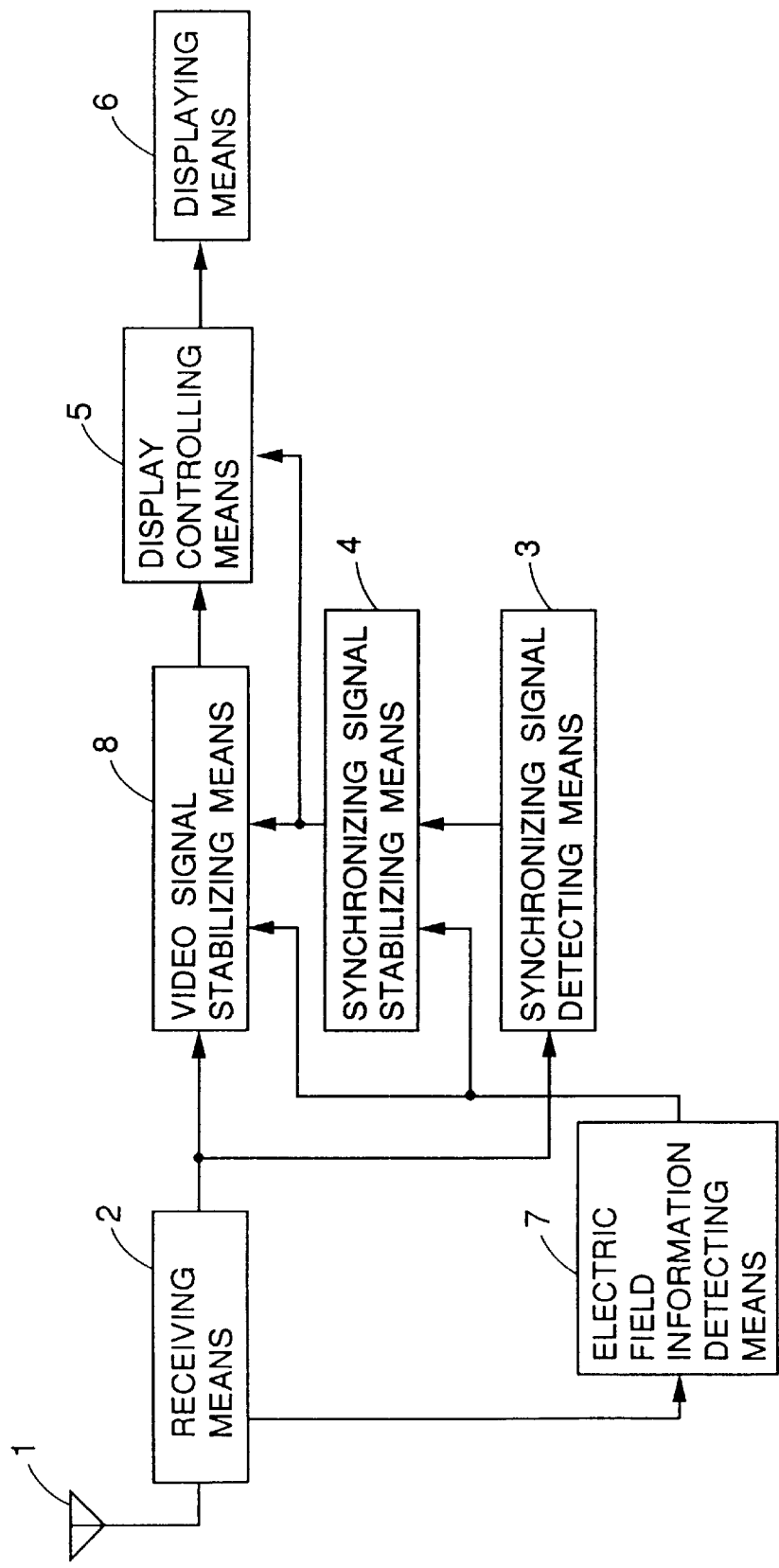
FIG. 3 is a view showing the configuration of a television video/audio signal receiver which is a further embodiment of the television receiver of the invention.

In the above, the embodiment in which the noise canceling process is conducted on an audio signal has been described. The invention is not restricted to this. As shown in FIG. 3, for example, a configuration in which noise predicting means, noise canceling means, and audio signal reproducing means are not disposed may be employed. FIG. 3 is a view showing the configuration of a television video/audio signal receiver as a further example in which the noise predicting means 11, the noise canceling means 12, and the audio signal reproducing means 13 of the television video/audio signal receiver shown in FIG. 1 are not disposed. As shown in the figure, the television video/audio signal receiver comprises: receiving means 2 for receiving a television signal; synchronizing signal detecting means 3 for detecting a synchronizing signal of a video signal obtained from the receiving means 2; synchronizing signal stabilizing means 4 for stabilizing the synchronizing signal obtained from the synchronizing signal detecting means 3; video signal stabilizing means 8 for stabilizing the video signal obtained from the receiving means 2, and for outputting the stabilized video signal; display controlling means 5 for controlling a display of the stabilized video signal output from the video signal stabilizing means 8, by using the synchronizing signal obtained from the synchronizing signal stabilizing means 4; and displaying means 6 for displaying a signal output from the display controlling means 5. The television video/audio signal receiver further comprises electric field information detecting means 7 for detecting electric field information from a signal obtained from the receiving means 2. The synchronizing signal stabilizing means 4 stabilizes the synchronizing signal, on the basis of the electric field information obtained from the electric field information detecting means 7, and the video signal stabilizing means 8 stabilizes the video signal by using the synchronizing signal obtained from the synchronizing signal stabilizing means 4 and the electric field information obtained from the electric field information detecting means 7. The embodiment can attain effects which are substantially identical with those of the embodiment described above, except that noises of the audio signal cannot be reduced.

Figure 4:
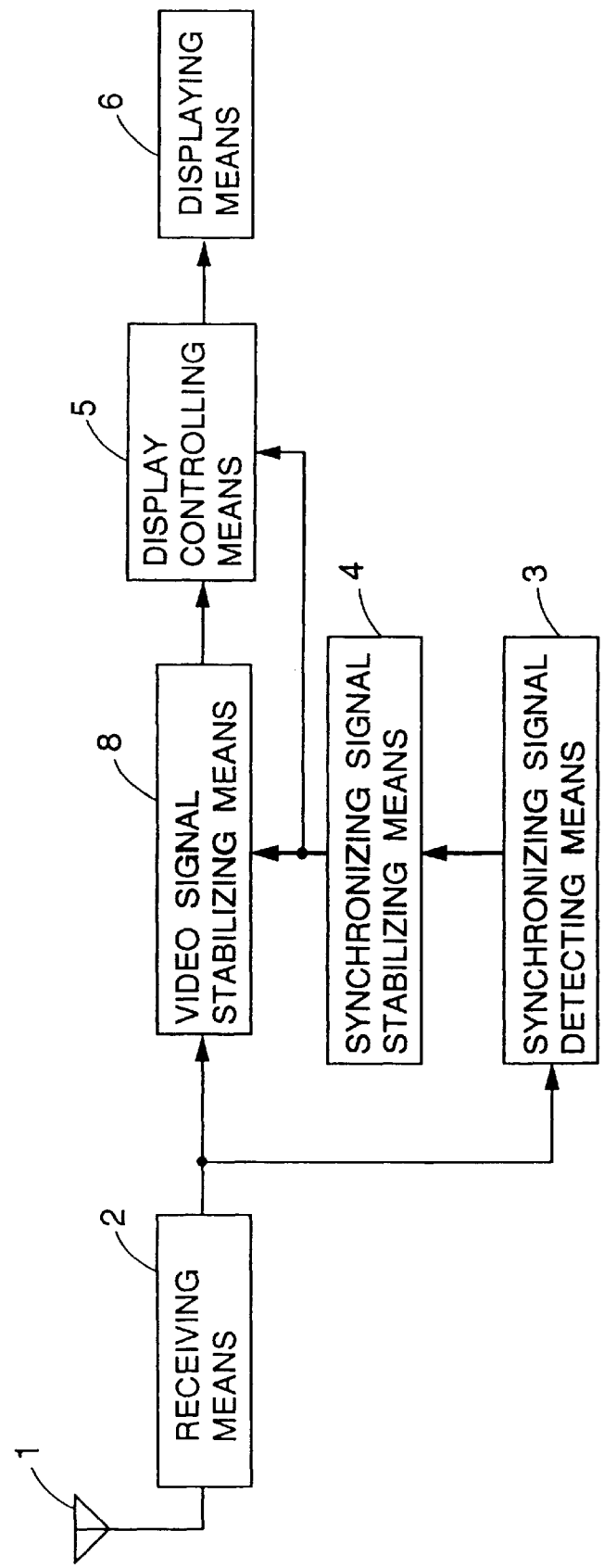
FIG. 4 is a view showing the configuration of a television video/audio signal receiver which is a further embodiment of the television receiver of the invention.

In the above, the embodiment in which electric field information of a received signal is used has been described. The invention is not restricted to this. As shown in FIG. 4, for example, a configuration in which electric field information detecting means is not disposed may be employed. FIG. 4 is a view showing the configuration of a television video/audio signal receiver as a further example in which the electric field information detecting means 7 of the television video/audio signal receiver shown in FIG. 3 is not disposed. As shown in the figure, the television video/audio signal receiver comprises: receiving means 2 for receiving a television signal; synchronizing signal detecting means 3 for detecting a synchronizing signal of a video signal obtained from the receiving means 2; synchronizing signal stabilizing means 4 for stabilizing the synchronizing signal obtained from the synchronizing signal detecting means 3; video signal stabilizing means 8 for stabilizing the video signal obtained from the receiving means 2, and for outputting the stabilized video signal; display controlling means 5 for controlling a display of the stabilized video signal output from the video signal stabilizing means 8, by using the synchronizing signal obtained from the synchronizing signal stabilizing means 4; and displaying means 6 for displaying a signal output from the display controlling means 5. The video signal stabilizing means 8 stabilizes the video signal by using the synchronizing signal obtained from the synchronizing signal stabilizing means 4. The embodiment can attain effects which are substantially identical with those of the embodiment described above except that electric field information cannot be utilized in the various stabilizing processes.

Figure 5:
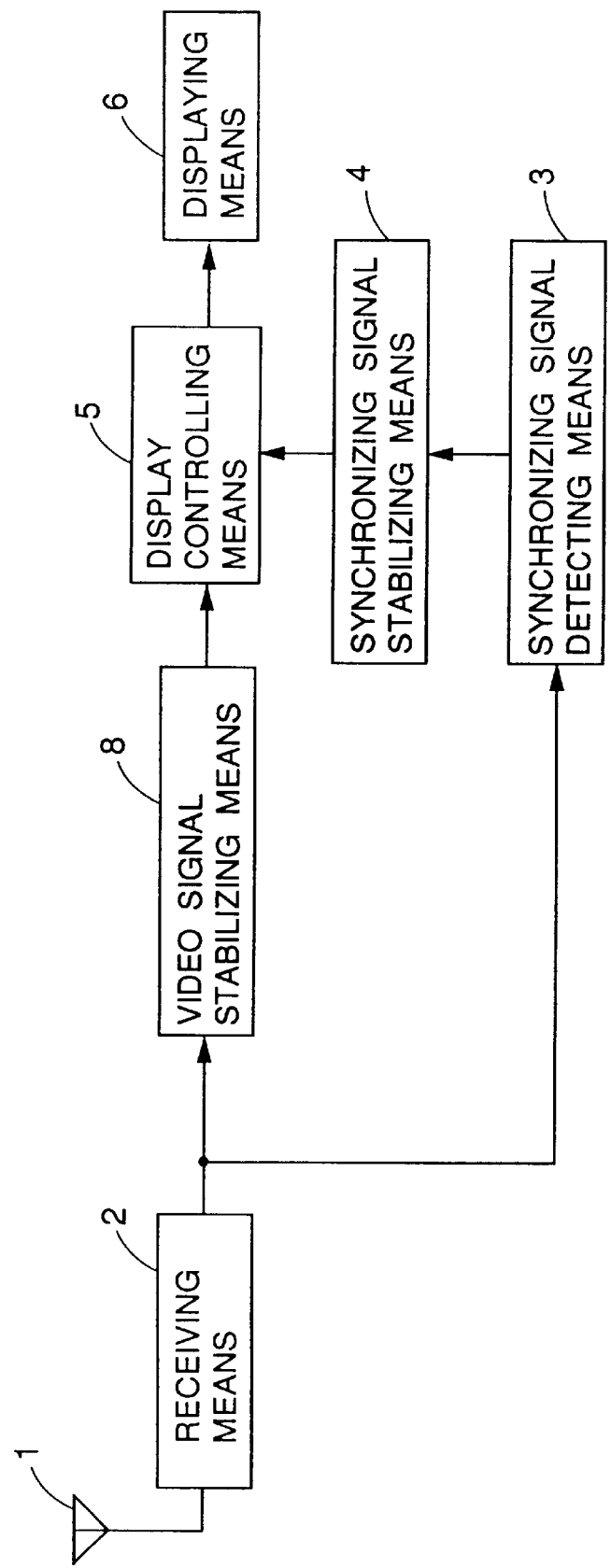
FIG. 5 is a view showing the configuration of a television video/audio signal receiver which is a further embodiment of the television receiver of the invention.

In the above, the embodiment in which, in the process of stabilizing the video signal obtained from the receiving means 2, the video signal stabilizing means uses the synchronizing signal obtained in the synchronizing signal stabilizing means 4 has been described. The invention is not restricted to this. As shown in FIG. 5, for example, a configuration in which the synchronizing signal obtained in the synchronizing signal stabilizing means 4 is not used may be employed. FIG. 5 is a view showing the configuration of a television video/audio signal receiver as a further example in which the output of the synchronizing signal stabilizing means 4 of the television video/audio signal receiver shown in FIG. 4 is not sent to the video signal stabilizing means 8. As shown in the figure, the television video/audio signal receiver comprises: receiving means 2 for receiving a television signal; synchronizing signal detecting means 3 for detecting a synchronizing signal of a video signal obtained from the receiving means 2; synchronizing signal stabilizing means 4 for stabilizing the synchronizing signal obtained from the synchronizing signal detecting means 3; video signal stabilizing means 8 for stabilizing the video signal obtained from the receiving means 2, and for outputting the stabilized video signal; display controlling means 5 for controlling a display of the stabilized video signal output from the video signal stabilizing means 8, by using the synchronizing signal obtained from the synchronizing signal stabilizing means 4; and displaying means 6. for displaying a signal output from the display controlling means 5. The embodiment can attain effects which are substantially identical with those of the embodiment described above except that the synchronizing signal cannot be utilized in the process of stabilizing the video signal in video signal stabilizing means.

Figure 6:
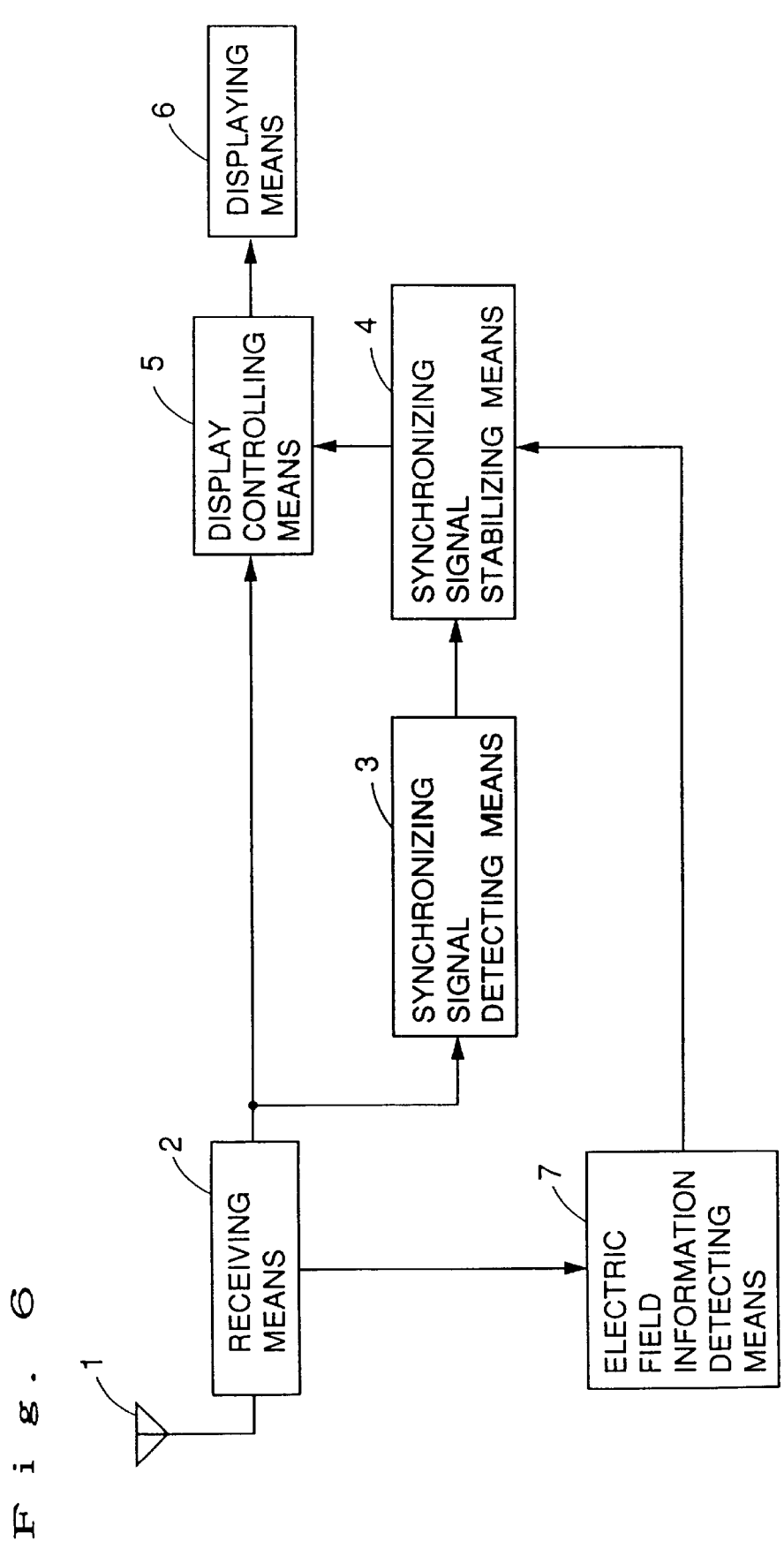
FIG. 6 is a view showing the configuration of a television video/audio signal receiver which is a further embodiment of the television receiver of the invention.

In the above, the embodiment which is a receiver having video signal stabilizing means has been described. The invention is not restricted to this. As shown in FIG. 6, for example, a configuration in which video signal stabilizing means is not disposed may be employed. FIG. 6 is a view showing the configuration of a television video/audio signal receiver as a further example in which the video signal stabilizing means 8 of the television video/audio signal receiver shown in FIG. 3 is not disposed. As shown in the figure, the television video/audio signal receiver comprises: receiving means 2 for receiving a television signal; synchronizing signal detecting means 3 for detecting a synchronizing signal of a video signal obtained from the receiving means 2; electric field information detecting means 7 for detecting electric field information from a signal obtained from the receiving means 2; synchronizing signal stabilizing means 4 for stabilizing the synchronizing signal obtained from the synchronizing signal detecting means 3, on the basis of the electric field information obtained from the electric field information detecting means 7; display controlling means 5 for controlling a display of the video signal obtained from the receiving means 2, by using the synchronizing signal obtained from the synchronizing signal stabilizing means 4; and displaying means 6 for displaying a signal output from the display controlling means 5. The embodiment can attain effects which are substantially identical with those of the embodiment described above, except that the process of stabilizing the video signal is not conducted.

Figure 7:
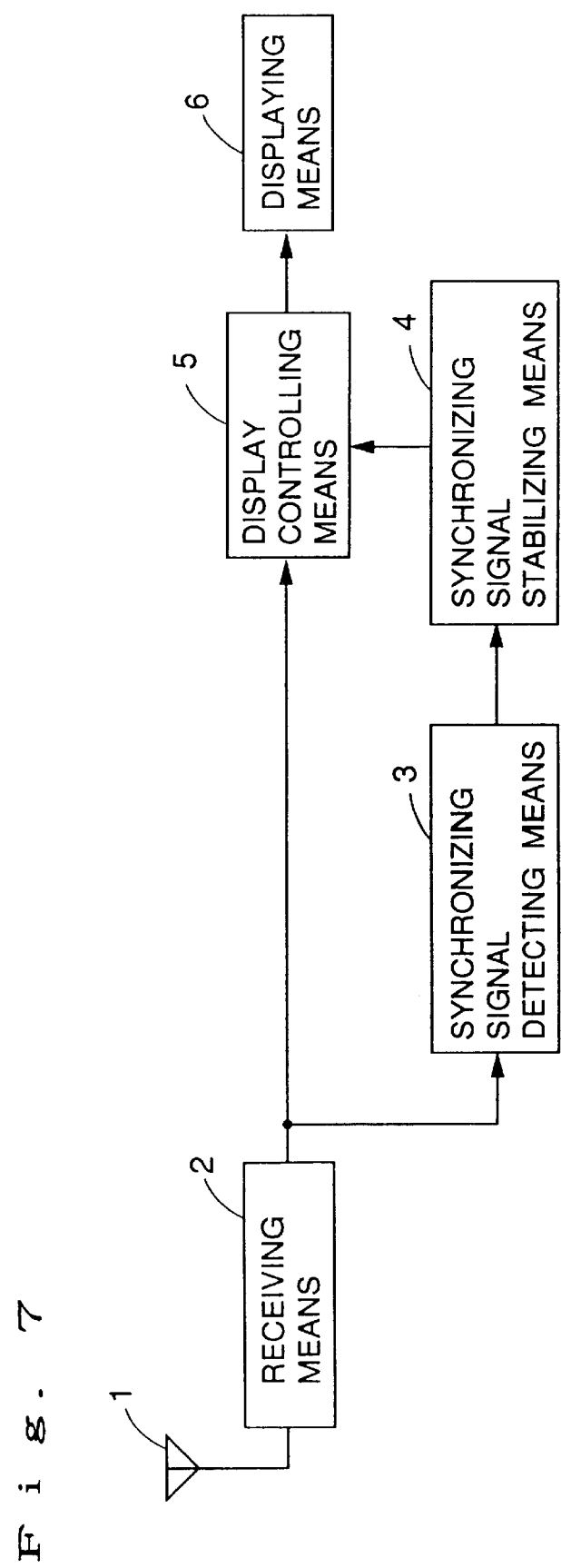
FIG. 7 is a view showing the configuration of a television video/audio signal receiver which is a further embodiment of the television receiver of the invention.

In the above, the embodiment which is a receiver having electric field information detecting means has been described. The invention is not restricted to this. As shown in FIG. 7, for example, a configuration in which electric field information detecting means is not disposed may be employed. Also in this case, it is possible to attain effects which are substantially identical with those of the embodiment described above, except that electric field information cannot be utilized in a stabilizing process of synchronizing signal stabilizing means. FIG. 7 is a view showing the configuration of a television video/audio signal receiver as a further example in which the electric field information detecting means 7 of the television video/audio signal receiver shown in FIG. 6 is not disposed. As shown in the figure, the television video/audio signal receiver comprises: receiving means 2 for receiving a television signal; synchronizing signal detecting means 3 for detecting a synchronizing signal of a video signal obtained from the receiving means; synchronizing signal stabilizing means 4 for stabilizing the synchronizing signal obtained from the synchronizing signal detecting means 3; display controlling means 5 for controlling a display of the video signal obtained from the receiving means 2, by using the synchronizing signal obtained from the synchronizing signal stabilizing means 4; and liquid crystal displaying means 6 for conducting a liquid crystal display of a signal output from the display controlling means 5. In this case, RGB signals must be supplied for each dot of the liquid crystal displaying means in order to conduct a liquid crystal display, and the timing of outputting each of the RGB signals is predetermined. The display controlling means 5 generates output timing pulses corresponding to the output timing of each of the RGB signals, on the basis of the stabilized synchronizing signal, and supplies the pulses to the liquid crystal displaying means 6. Also in the embodiment, a stabilized image can be obtained by generating the timing pulses on the basis of the stabilized synchronizing signal.

(Embodiment 2)

Figure 8:
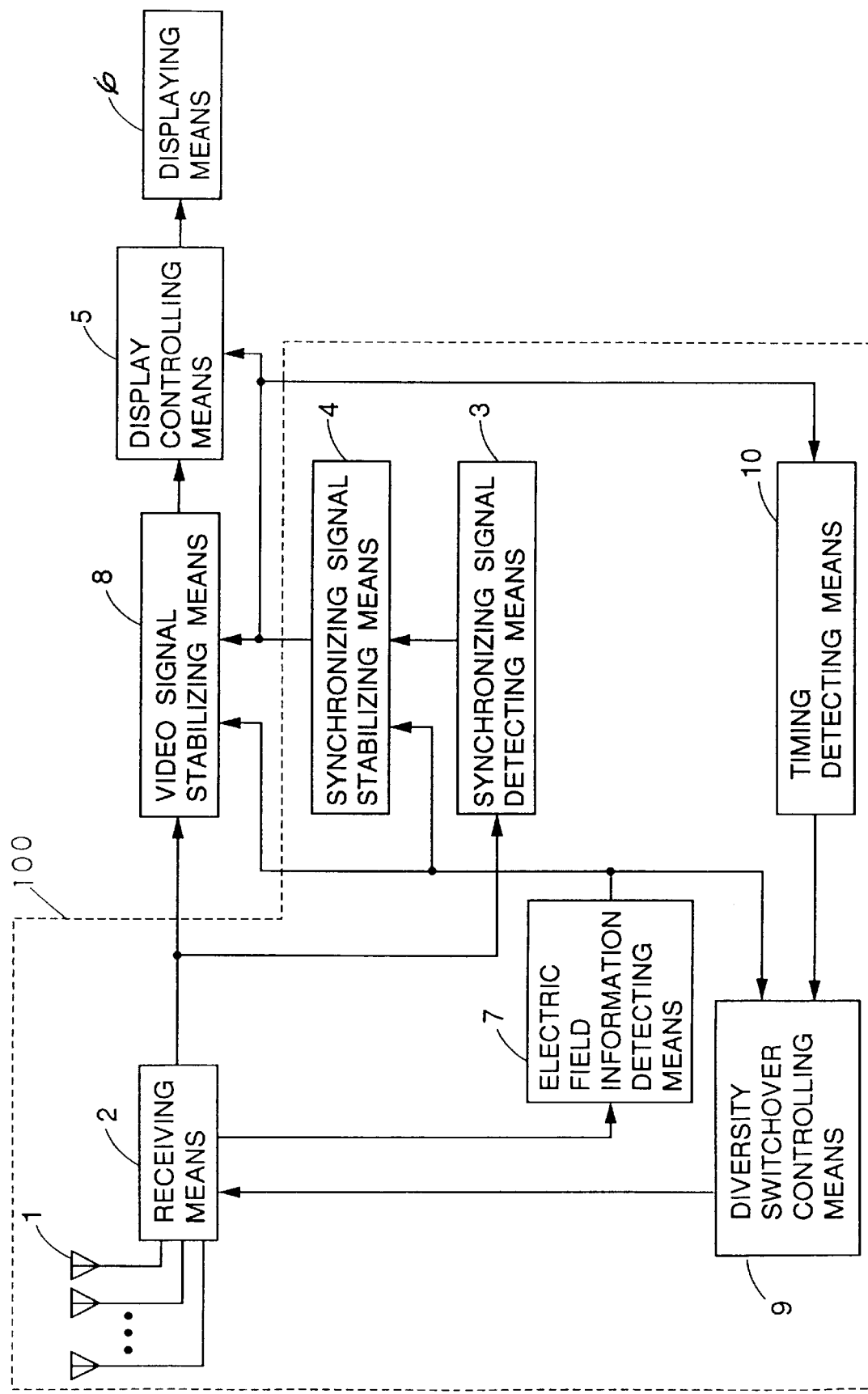
FIG. 8 is a view showing the configuration of a television video/audio signal receiver which is a further embodiment of the television receiver of the invention.

FIG. 8 is a view showing the configuration of a television video/audio signal receiver which is an embodiment of the television receiver of the invention.

The configuration of the embodiment will be described with reference to the figure. The components which are fundamentally identical with those described with reference to FIG. 1 are designated by the same reference numerals, and their description is omitted.

As shown in the figure, the television video/audio signal receiver comprises an antenna diversity controller 100, video signal stabilizing means 8, display controlling means 5, and displaying means 6. The antenna diversity controller 100 comprises diversity antennas 1, receiving means 2, synchronizing signal detecting means 3, synchronizing signal stabilizing means 4, electric field information detecting means 7, diversity switchover controlling means 9, and timing detecting means 10.

The synchronizing signal stabilizing means 4 stabilizes vertical and horizontal synchronizing signals which are detected by the synchronizing signal detecting means 3 from a video signal obtained in the receiving means 2, and outputs the stabilized synchronizing signals. The timing detecting means 10 determines a diversity switchover enable period based on the synchronizing signal stabilized by the synchronizing signal stabilizing means 4.

Figure 9B:
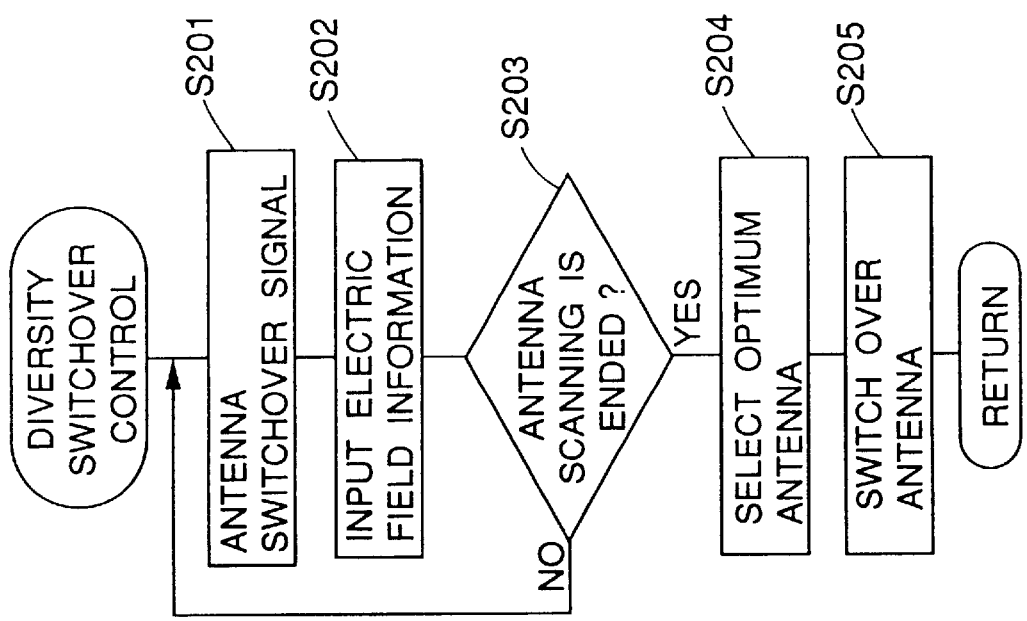
FIG. 9(*a*) is a flowchart showing a method of the diversity switchover control of an antenna diversity controller of the embodiment, and FIG. 9(*b*) is a flowchart showing a diversity switchover control routine in the method of the diversity switchover control.
Figure 9A:
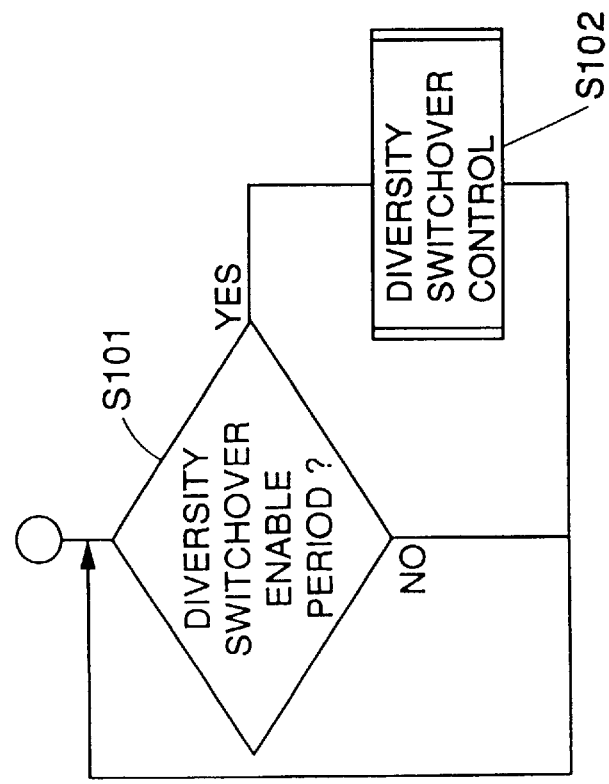

FIGS. 9(*a*) and 9(*b*) are flowcharts showing the method of controlling the diversity switchover in the antenna diversity controller of the embodiment.

As shown in FIG. 9(*a*), in step S101, the diversity switchover enable period obtained in the timing detecting means 10 is used for judging whether the diversity switchover control is to be conducted or not. The diversity switchover enable period is the vertical synchronization interval, a period including the vertical synchronization interval, or a period before and after the vertical synchronization interval.

If the current process timing is in the diversity switchover enable period, the diversity switchover control process is conducted (step S102). In order to transfer the control to the process, a loop configuration such as that shown in FIG. 9(*a*), or an interrupt process based on the diversity switchover enable period may be used.

As shown in FIG. 9(*b*), in a diversity switchover control routine, an antenna switchover signal is sent to the receiving means 2 (step S201), the antenna 1 is switched to another one, and electric field information relating to the wave obtained from the new antenna is input (step S202). This operation is conducted on each of the diversity antennas (step S203), so that electric field information of the waves received by all the antennas is obtained. When the antenna scanning (step S203) is ended, the obtained electric field information of the antennas is analyzed, and the optimum antenna is selected (step S204). Then, the antenna connection is switched to the selected optimum antenna (step S205). Thereafter, the wave input using the new antenna is conducted until the diversity switchover control (step S102) is next done.

In the judgment in step S203 on the end of the antenna scanning, the fact whether information of all the antennas has been obtained or not, or that whether the operation including the antenna switchover enters the diversity switchover enable period or not is used as the criterion.

For each of the antennas, therefore, one or plural sets of electric field information may be obtained. In the case where plural sets of electric field information are obtained, the average value, the minimum value, or the maximum value of the electric field information may be used.

The selection of the optimum antenna in step S204 may be conducted in the following manner. An antenna from which the highest electric field strength is obtained, or that in which multipaths are minimum may be selected. In this case, it is possible to accurately select the optimum antenna.

An antenna from which variation of multipaths or the electric field is small may be selected by using information relating to variation of multipaths or the electric field. In order to prevent the antenna switchover control from being frequently conducted, a method may be employed in which information of antennas which have been selected is previously stored, information of a newly selected antenna is compared with the stored information, and finally the optimum antenna is selected by using a threshold of the electric field information, the multipath strength, or the like. A control may be conducted in such a manner that an antenna in which the electric field strength is higher than a predetermined value is not selected, or that, when multipaths frequently occur, the switchover of the antennas is positively conducted. The method of selecting the optimum antenna will be described later in detail.

Next, an example in which another diversity switchover control is conducted in the above-described configuration will be described with reference to flowcharts shown in FIGS. 10(a) to 10(c).

As shown in FIG. 10(a), in steps S303 and S301, diversity switchover enable periods 1 and 2 obtained in the timing detecting means 10 are used for judging whether the diversity switchover control is to be conducted or not. The diversity switchover enable period 1 is the vertical synchronization interval, a period including the vertical synchronization interval, or a period before and after the vertical synchronization interval. The diversity switchover enable period 2 is the horizontal synchronization interval, a period including the horizontal synchronization interval, or a period before and after the horizontal synchronization interval. The first diversity switchover enable period of the invention corresponds to the diversity switchover enable period 1, and the second diversity switchover enable period of the invention corresponds to the diversity switchover enable period 2.

If the current process timing is in the diversity switchover enable period 1 or 2, a diversity switchover control process 1 or 2 is conducted (step S304 or S302). In order to transfer the control to the process, a loop configuration such as that shown in FIG. 10(a), or an interrupt process based on the diversity switchover enable period may be used.

As shown in FIG. 10(b), in a diversity switchover control routine 2, an antenna switchover signal is sent to the receiving means 2 (step S201), the antenna 1 is switched to another one, and electric field information relating to the wave obtained from the new antenna is input (step S202). On the basis of the thus obtained electric field information, the distribution of the electric field information of each antenna is obtained (step S401). This operation is conducted until the antenna scanning is ended (step S203).

In the judgment in step S203 on the end of the antenna scanning, the fact whether information of all the antennas has been obtained or not, or that whether the operation including the antenna switchover enters the diversity switchover enable period 2 or not is used as the criterion.

Then, the optimum antenna in the diversity switchover control routine 2 is selected (step S204), and the antenna connection is switched to the selected optimum antenna (step S205). In this case, the selection of the optimum antenna may be conducted so as to select the antenna selected before the control enters the diversity switchover control routine 2 (step S302). This substantially results in that the antenna selected in diversity switchover control routine 1 (step S304) is used. Therefore, the antenna switchover can be conducted for each image frame. When the antenna selection is conducted on the basis of the electric field distribution obtained in step S401 (step S204), the optimum antenna can be selected for each line or for each horizontal synchronizing signal.

As shown in FIG. 10(c), the same process as that of the diversity switchover control routine 2 is conducted in the diversity switchover control routine 1.

As described above, in the selection method of the embodiment, the optimum antenna is determined on the basis of the electric field information distribution. Hereinafter, the electric field information distribution used in the process will be described in more detail.

As the electric field information distribution, used is the electric field strength signal, a multipath level signal, or variation of such a signal. The distribution may have a form of a histogram, the maximum value, the minimum value, or the like. In the case where a histogram of the electric field strength or the multipath level is used, a histogram of the electric field strength of a certain antenna is prepared, the electric field strength or the multipath level of the maximum frequency may be used as the representative value for selecting the optimum antenna.

An antenna such as that in which the electric field strength is highest, that in which multipaths are minimum, or that in which the electric field variation and the multipath variation are small may be selected as the optimum antenna. When the multipath level is high, the followability can be improved by positively switching the antennas. When the electric field strength is high or less varied, a stabilized reception state can be obtained by suppressing the switchover of the antennas.

As described above, according to the embodiment, the diversity switchover is conducted by using a stabilized synchronizing signal and controlled by using electric field information, and hence it is possible to select an antenna of reduced multipath interference. As a result, multiple images can be reduced and an image which is further stabilized can be obtained.

In the embodiment, a noise canceling process for an audio signal is not considered. It is more preferable to form a configuration which can conduct a noise canceling process as shown in FIG. 11. FIG. 11 is a view showing the configuration of a television video/audio signal receiver of another embodiment in which the configuration of the television video/audio signal receiver shown in FIG. 8 is further provided with: noise predicting means 11 for predicting noises of an audio signal obtained from the receiving means 2, on the basis of the electric field information obtained from the electric field information detecting means 7; noise canceling means 12 for reducing noises of the audio signal, on the basis of the predicted noises obtained from the noise predicting means 11 and the electric field information; and audio signal reproducing means 13 for reproducing an audio signal output from the noise canceling means 12. In the configuration, when noises of the audio signal are to be predicted, the noise predicting means 11 utilizes also the antenna switchover signal, and, when noises are to be reduced, the noise canceling means 12 utilizes also the antenna switchover signal.

Next, the method of utilizing the antenna switchover signal in the noise cancellation will be described.

In the audio detection, the antenna switchover control causes a discontinuous signal to be superimposed on the audio signal, with the result that audio noises are generated. When the antenna switchover signal is utilized, it is possible to identify the location where noises enter the audio signal. Therefore, noises can be reduced by conducting the noise canceling process on the specified location. Noises may be canceled by a method in which, when an antenna switchover occurs, predicted noises are generated and then the noise canceling process is conducted. Since the location of noises can be identified, interpolation may be performed by using the waveform appearing before noises are generated.

According to this configuration, also a noise canceling process for an audio signal is conducted, and hence an effect that it is possible to reproduce an audio signal in which noises are further reduced is attained in addition to the above-mentioned effects.

Figure 12:
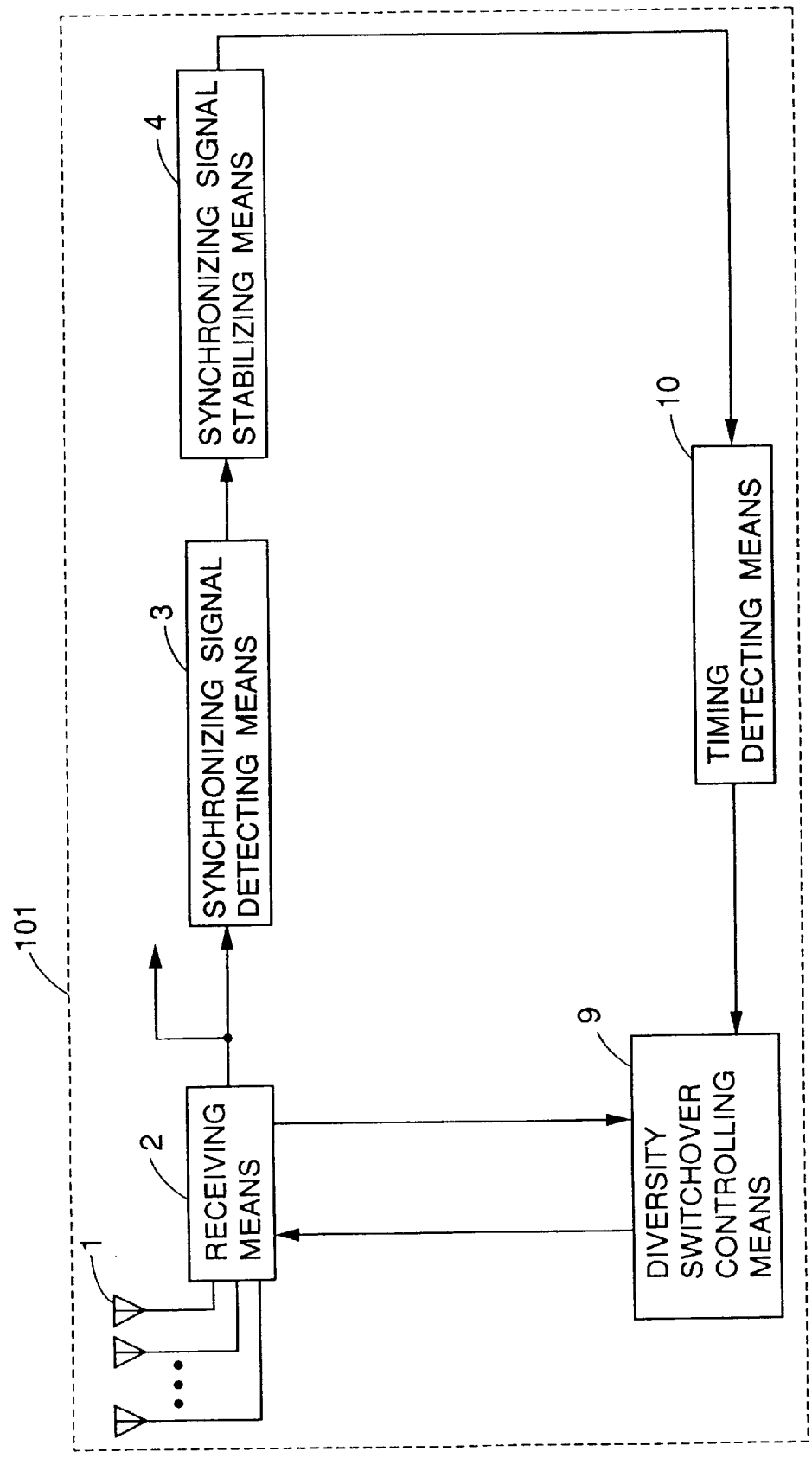
FIG. 12 is a view showing the configuration of another embodiment of the antenna diversity controller of the invention.

In the above, the embodiment in which the antenna diversity controller 100 comprises electric field information detecting means has been described. The invention is not restricted to this. As shown in FIG. 12, for example, an antenna diversity controller 101 having a configuration in which electric field information detecting means is not disposed may be used in place of the antenna diversity controller 100. The antenna diversity controller 101 shown in FIG. 12 comprises: antennas 1 of a diversity system for receiving a television wave; receiving means 2 of the diversity system for receiving television signals obtained from the antennas 1; synchronizing signal detecting means 3 for detecting a synchronizing signal of a video signal obtained from the receiving means 2; synchronizing signal stabilizing means 4 for stabilizing the synchronizing signal obtained from the synchronizing signal detecting means 3; timing detecting means 10 for detecting a timing of the video signal, on the basis of the stabilized synchronizing signal; and diversity switchover controlling means 9 for sending an antenna switchover signal to the receiving means 2 on the basis of the detected timing and a signal level obtained from the receiving means 2. In this case, the timing detected by the timing detecting means is a timing of a vertical synchronizing signal of the video signal, the timing detecting means determines a diversity switchover enable period based on the timing of the vertical synchronizing signal, and, during the determined diversity switchover enable period, the diversity switchover controlling means sends the antenna switchover signal to the receiving means and conducts the diversity switchover control of switching to an optimum antenna. According to this configuration, the diversity switchover can be controlled by using the stabilized synchronizing signal, and a stabilized image can be obtained while preventing the antennas from being switched over during one image frame. A configuration different from the above may be employed as follows. In FIG. 12, for example, the detection timing of the timing detecting means includes a timing of a vertical synchronizing signal of the video signal and that of a horizontal synchronizing signal. The timing detecting means determines a first diversity switchover enable period based on the timing of the vertical synchronizing signal and a second diversity switchover enable period based on the timing of the horizontal synchronizing signal. During the determined first or second diversity switchover enable period, the diversity switchover controlling means sends the antenna switchover signal to the receiving means and conducts the diversity switchover control of switching to an optimum antenna. According to this configuration, the use of the stabilized synchronizing signal allows the antennas to be sampled also during the horizontal synchronization interval, and hence the diversity antennas can be prevented from being erroneously switched over, with the result that a further stabilized image can be obtained. In addition to the configuration, for example, a configuration may be employed in which, when the control of switching to an optimum antenna is to be conducted, the diversity switchover controlling means obtains the signal level distribution of each of the antennas during the second diversity switchover enable period, and utilizes the obtained distribution. According to this configuration, the signal level distribution (electric field information distribution) relating to each of the antennas is obtained, and hence a further stabilized antenna can be selected, thereby enabling the diversity switchover to be correctly conducted. Therefore, it is possible to obtain an image which is further stabilized. Moreover, the diversity antenna switching control can be conducted more finely, and hence the followability for radio interference can be improved.

Figure 13:
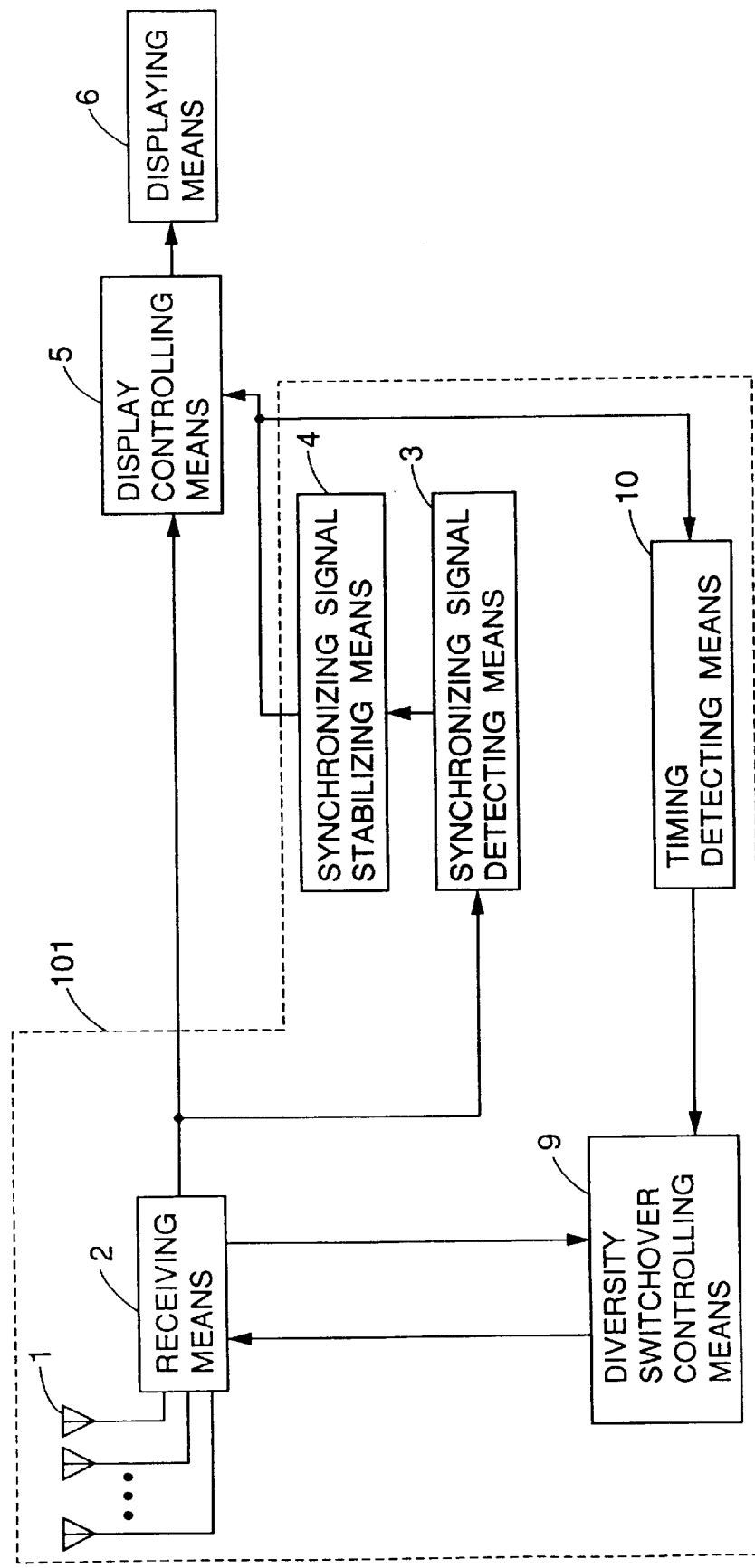
FIG. 13 is a view showing the configuration of a television video/audio signal receiver which is a further embodiment of the television receiver of the invention.

In the above, the embodiment in which the antenna diversity controller 101 is used in place of the antenna diversity controller 100 and which is provided with the video signal stabilizing means 8, the display controlling means 5, and the displaying means 6 has been described. The invention is not restricted to this. As shown in FIG. 13, for example, a configuration in which video signal stabilizing means is not provided may be employed. Another embodiment of a television video/audio signal receiver shown in FIG. 13 comprises: antennas 1 of a diversity system for receiving a television wave; receiving means 2 of the diversity system for receiving television signals obtained from the antennas 1; synchronizing signal detecting means 3 for detecting a synchronizing signal of a video signal obtained from the receiving means 2; synchronizing signal stabilizing means 4 for stabilizing the synchronizing signal obtained from the synchronizing signal detecting means 3; timing detecting means 10 for detecting a timing of the video signal, on the basis of the stabilized synchronizing signal; diversity switchover controlling means 9 for sending an antenna switchover signal to the receiving means 2 on the basis of the detected timing and the signal level obtained from the receiving means 2 to conduct a diversity switchover control; display controlling means 5 for controlling a display of the video signal obtained from the receiving means 2, by using the stabilized synchronizing signal; and displaying means 6 for displaying a signal output from the display controlling means 5. The embodiment can attain effects which are substantially identical with those of the embodiment described with reference to FIG. 12, except that the process of stabilizing the video signal by means of the video signal stabilizing means is not conducted.

(Embodiment 3)

Figure 14:
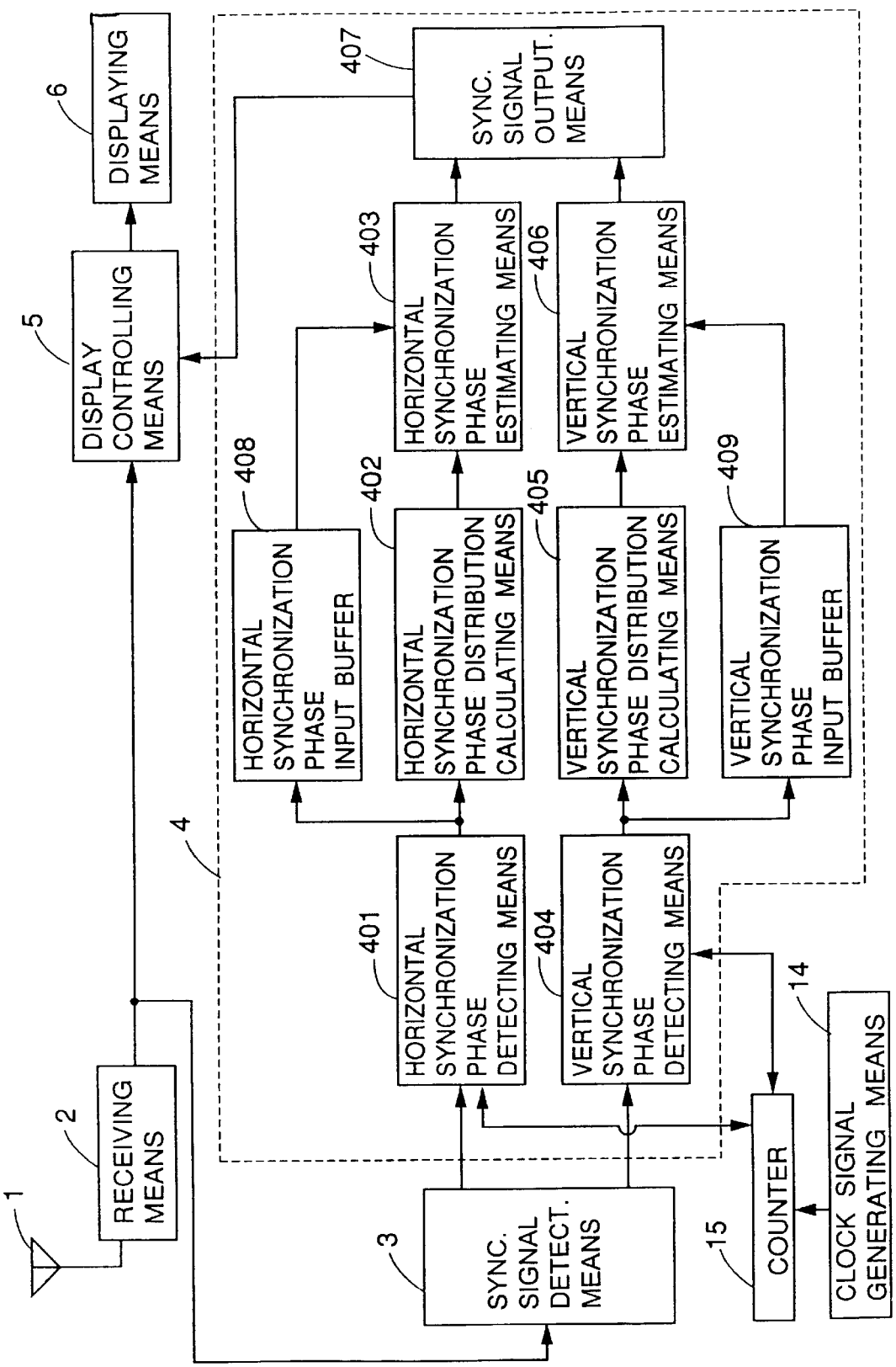
FIG. 14 is a view showing the configuration of a television video/audio signal receiver which is an embodiment using the synchronizing signal stabilizer of the invention.

FIG. 14 is a view showing the configuration of a television video/audio signal receiver which is an embodiment using the synchronizing signal stabilizer of the invention.

The configuration of the embodiment will be described with reference to the figure. The components which are fundamentally identical with those described with reference to FIGS. 7 and 13, and the like are designated by the same reference numerals. Hereinafter, synchronizing signal stabilizing means 4 (synchronizing signal stabilizer) will be mainly described.

As shown in FIG. 14, the synchronizing signal stabilizing means 4 comprises horizontal synchronization phase detecting means 401, horizontal synchronization phase distribution calculating means 402, horizontal synchronization phase estimating means 403, a horizontal synchronization phase input buffer 408, vertical synchronization phase detecting means 404, vertical synchronization phase distribution calculating means 405, vertical synchronization phase estimating means 406, a vertical synchronization phase input buffer 409, and synchronizing signal outputting means 407. The horizontal synchronization phase detecting means 401 detects the phase of a horizontal synchronizing signal of the synchronizing signals obtained from synchronizing signal detecting means 3, and the horizontal synchronization phase distribution calculating means 402 obtains the distribution of the phase of the horizontal synchronizing signal obtained by the horizontal synchronization phase detecting means 401. The horizontal synchronization phase estimating means 403 estimates the phase of the horizontal synchronizing signal, by using the distribution of the phase of the horizontal synchronizing signal obtained from the horizontal synchronization phase distribution calculating means 402. The horizontal synchronization phase input buffer 408 stores phases of horizontal synchronizing signals obtained from the horizontal synchronization phase detecting means 401, the vertical synchronization phase detecting means 404 detects the phase of a vertical synchronizing signal of the synchronizing signals obtained from the synchronizing signal detecting means 3, and the vertical synchronization phase distribution calculating means 405 obtains the distribution of the phase of the vertical synchronizing signal obtained by the vertical synchronization phase detecting means 404. The vertical synchronization phase estimating means 406 estimates the phase of the vertical synchronizing signal, by using the distribution of the phase of the vertical synchronizing signal obtained from the vertical synchronization phase distribution calculating means 405. The vertical synchronization phase input buffer 409 stores phases of vertical synchronizing signals obtained from the vertical synchronization phase detecting means 404. The synchronizing signal outputting means 407 outputs a stabilized synchronizing signal from the detected synchronizing signal, on the basis of the estimated phase of the horizontal synchronizing signal and the estimated phase of the vertical synchronizing signal. The embodiment further comprises: clock signal generating means 14; and a counter 15 which detects the phase of each synchronizing signal which will be described later, as a counter value by using a clock signal obtained from the clock signal generating means 14. The horizontal synchronization phase distribution calculating means 402 and the vertical synchronization phase distribution calculating means 405 are configured so as to obtain the frequency of the phase of each synchronizing signal, by using the counter value obtained by the counter 15.

The operation of the thus configured embodiment will be described with reference to the drawings.

The horizontal synchronization phase detecting means 401 detects the phase of a horizontal synchronizing signal which passes through the receiving means 2 and is then output from the synchronizing signal detecting means 3.

As the phase, used is the counter value of the counter 15 (or a timer) of a period which is equal to the horizontal synchronization interval, i.e., the 1 H period or similar to the period, or that of a counter of an arbitrary period. In the case of a counter of an arbitrary period, the difference between the arbitrary period and the period of the horizontal synchronization is previously known, and the counter value is used while being corrected on the basis of the difference.

Hereinafter, the case of the counter 15 of the 1 H period will be described. When a horizontal synchronizing signal is input, the counter value at the timing of the input is set to be an input phase. The input phase is accumulated in the horizontal synchronization phase input buffer 408. The horizontal synchronization phase input buffer 408 stores a specified number of input values. In this case, latest data are used as the data of the specified number. For this purpose, FIFO or a ring buffer may be used.

Figure 15:
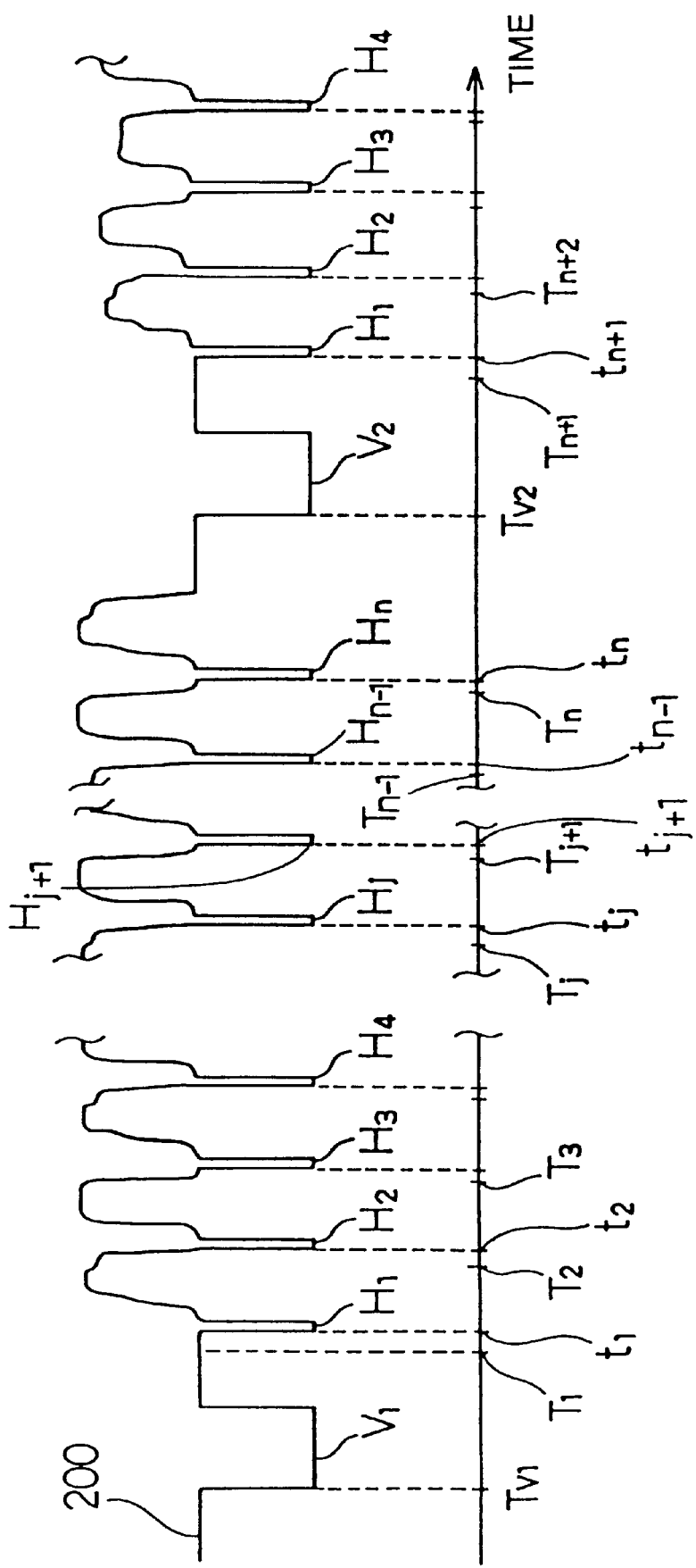
FIG. 15 is a view showing timings of detecting the phases of vertical and horizontal synchronizing signals of a video signal in the embodiment.

The operation will be described in more detail with reference to FIGS. 15 and 16. FIG. 15 is a view illustrating the timings of detecting the phases of vertical and horizontal synchronizing signals of a video signal. FIG. 16 is a view diagrammatically showing the manner of storing phase data in the horizontal synchronization phase input buffer 408.

As shown in FIG. 15, a received signal 200 in which horizontal synchronizing signals $H_1$ to $H_n$ exist between vertical synchronizing signals $V_1$ and $V_2$ and the vertical synchronizing signal $V_2$ is followed by horizontal synchronizing signals $H_1$, $H_2$, $H_3$, $H_4$, . . . is sequentially supplied to the synchronizing signal detecting means 3. The times when the vertical synchronizing signals $V_1$ and $V_2$ are detected are indicated by $T_{V1}$, and $T_{V2}$. The counter 15 starts the count operation at a fixed period or the 1 H period with using $T_1$ ($T_{n+1}$) when a fixed time has elapsed from the time $T_{V1}$ ($T_{V2}$) when the vertical synchronizing signal is detected, as the reference. If the value of the counter 15 at the time $t_1$ when the horizontal synchronization phase detecting means 401 detects the initial horizontal synchronizing signal $H_1$ in the fixed interval between the times $T_1$ to $T_2$ is 50, the counter value is stored in the horizontal synchronization phase input buffer 408 as shown in FIG. 16(a). If the value of the counter 15 at the time $t_2$ when the horizontal synchronization phase detecting means 401 detects the horizontal synchronizing signal $H_2$ in the fixed interval between the times $T_2$ to $T_3$ is 70, the counter value is stored in the horizontal synchronization phase input buffer 408 as shown in FIG. 16(b). The recording operations are sequentially repeated. If the value of the counter 15 at the time $t_j$ when the horizontal synchronizing signal $H_j$ is detected in the interval between the times $T_j$ to $T_{j+1}$ is 120, the value at the time $t_{j+1}$ when the horizontal synchronizing signal $H_{j+1}$ is detected is 100, the value at the time $t_{n-1}$ when the horizontal synchronizing signal $H_{n-1}$ is detected is 65, and the value at the time $t_n$ when the horizontal synchronizing signal $H_n$ is detected is 60, the counter values for the n−j+1 number of latest horizontal synchronizing signals among the n number of horizontal synchronizing signals are stored in the horizontal synchronization phase input buffer 408. The stored contents of the horizontal synchronization phase input buffer 408 are held for a predetermined period which continues until, for example, the next vertical synchronizing signal $V_2$ is detected. The stored contents are used in the estimation of the horizontal synchronization phase which will be described later. The estimated horizontal synchronization phase is used for a synchronizing signal of a frame which is subsequently sent. After the vertical synchronization phase detecting means 404 detects the vertical synchronizing signal TV2 which is subsequently sent, the counter 15 again starts the count operation in the same manner as described above with using time $T_{n+1}$ as the reference. The counter value of the latest horizontal synchronizing signal phase is stored in the horizontal synchronization phase input buffer 408. The n number of counter values of the phases of the horizontal synchronizing signals $H_1$ to $H_n$ which are detected for each frame are classified into predetermined classes by the horizontal synchronization phase distribution calculating means 402 in the manner described later. The frequencies of phase data in each class are calculated, and a frequency table such as a histogram for obtaining the frequency distribution is prepared.

In the above, the operations relating to the horizontal synchronization phase detecting means 401 have been mainly described. The operations relating to the vertical synchronization phase detecting means 404 are substantially identical with those described above when the horizontal synchronizing signal is replaced with the vertical synchronizing signal. Therefore, their detailed description is omitted.

Returning to FIG. 14, the horizontal synchronization phase distribution calculating means 402 obtains the distribution of the input phases. As the distribution, the occurrence probability distribution relating to each phase in the 1 H period, a histogram of input phases in discrete data, or the like may be used. Next, the horizontal synchronization phase estimating means 403 estimates the horizontal synchronization phase, on the basis of the prepared phase distribution and the data of the input buffer. In this case, the maximum distribution, for example, the phase of the maximum probability in the probability distribution is selected as the phase of the synchronizing signal. In the histogram, the class of the maximum frequency is selected. In order to check the selected data, the data is compared with the contents of the input buffer. If the contents selected in the horizontal phase distribution exist also in the input buffer, the reliability of the contents selected in the horizontal phase distribution is high. Therefore, the phase is used as an estimated value. In the case where a histogram is used as the phase distribution, since each class has a substantial width, a data in the vicinity of the maximum frequency of the histogram is selected from the data of the input buffer. In this case, an average value, a median, or the like of data included in a class in the vicinity of the maximum frequency of the histogram may be used from the input buffer. In the case where values which have been estimated in the past are stored, it is possible also to select a value which is a data of the input buffer estimated in the past and included in the class in the vicinity of the maximum value of the histogram. In this way, the horizontal synchronization phase is estimated, the estimated phase is transmitted to the synchronizing signal outputting means, and the synchronizing signal is output. The synchronizing signal outputting means outputs the estimated synchronizing signal. In this case, in place of the phase of the synchronizing signal detected by the synchronizing signal detecting means 3, the timing of outputting the vertical synchronizing signal may be used as the timing of outputting the estimated synchronizing signal. This produces an effect that the image is hardly disturbed. The timing may be based on the timing of outputting the horizontal synchronization phase. Also in this case, the same effect that the image is hardly disturbed can be attained.

The estimation of the horizontal synchronization phase in the horizontal synchronization phase estimating means 403 may be conducted at any time. When timing of the estimation is restricted to one of the following timings, the load can be further reduced. Namely, the estimation may be conducted when the horizontal synchronizing signal is input, when the horizontal synchronizing signal is output, when the vertical synchronizing signal is input, when the vertical synchronizing signal is output, or immediately after the vertical or horizontal synchronizing signal period is ended.

Figure 17:
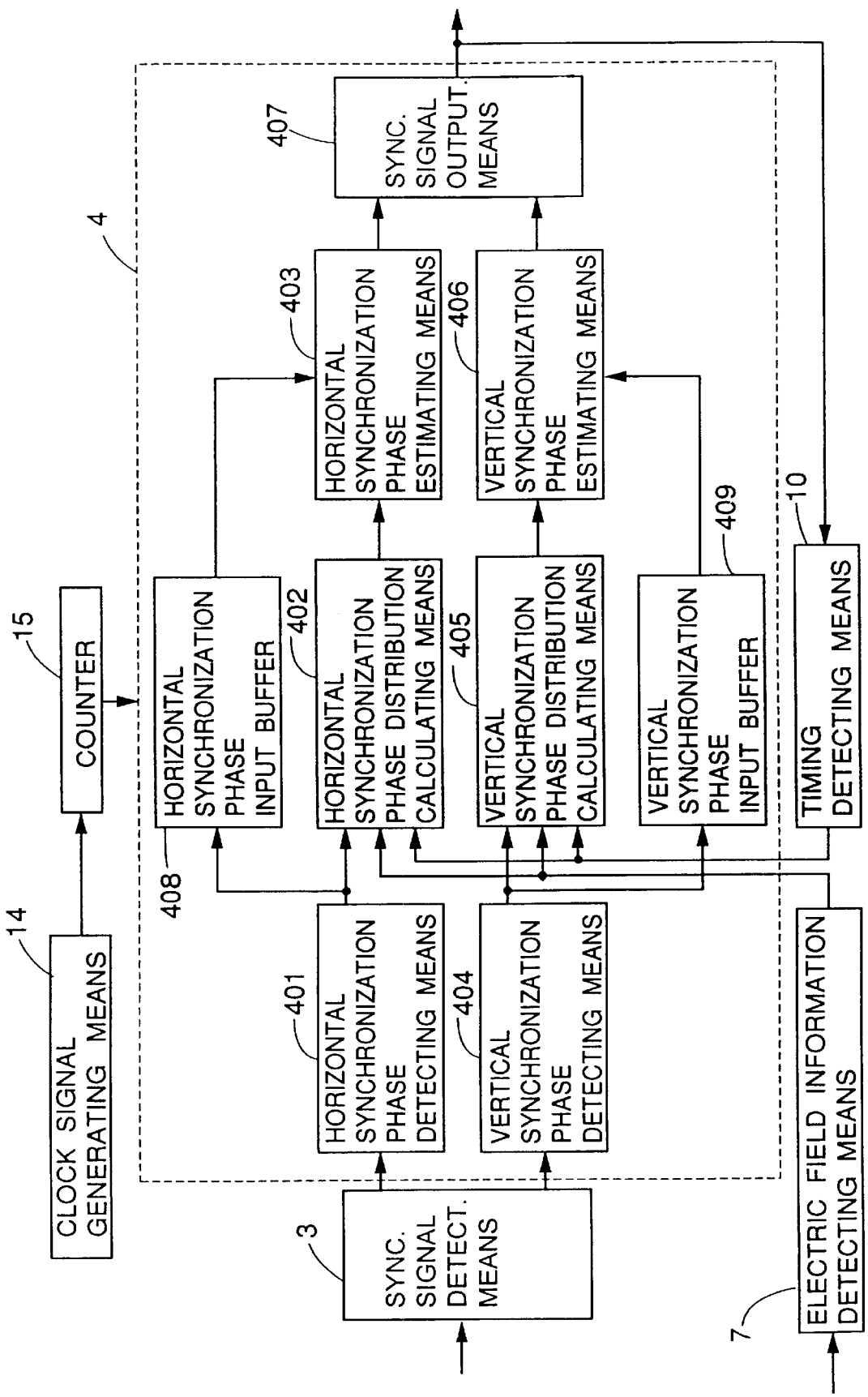
FIG. 17 is a view showing the configuration of a television video/audio signal receiver which is another embodiment using the synchronizing signal stabilizer of the invention.

In the embodiment, the timing when data of the phase distribution of synchronizing signals are updated (reset) is not particularly described. As shown in FIG. 17, for example, it is preferable to have timing detecting means for detecting the timing of the video signal on the basis of the stabilized synchronizing signal output from the synchronizing signal outputting means 407.

In such a configuration, the horizontal synchronization phase distribution calculating means 402 updates the phase distribution by utilizing a timing signal obtained from the timing detecting means 10, and the vertical synchronization phase distribution calculating means 405 updates the phase distribution by utilizing the timing signal obtained from the timing detecting means 10. FIG. 17 is a view showing the configuration of a television video/audio signal receiver of another embodiment in which the configuration of the television video/audio signal receiver shown in FIG. 14 is further provided with the timing detecting means 10, and electric field information detecting means 7 for detecting electric field information from a signal obtained from the receiving means 2. FIG. 17 particularly shows the configuration centered on synchronizing signal stabilizing means 4 (synchronizing signal stabilizer). According to this configuration, the updation of the data of the phase distribution of the synchronizing signal can be conducted at the timing when the stabilized vertical synchronizing signal is output, or that when the stabilized horizontal synchronization phase is output. Consequently, this produces an effect that the image is further hardly disturbed.

The calculation result of the horizontal synchronization phase distribution obtained by the horizontal synchronization phase distribution calculating means 402 may be reset by an output of the timing detecting means 10 using the timing of the vertical synchronizing signal which is currently output, so as to be calculated for each phase. The estimation of the horizontal synchronization phase may be conducted for each frame, or several times for one frame. As a result, it is possible to flexibly cope with the updation of the channel and the electric field state which is changed during one frame, and also to reduce the process.

According to this configuration, the horizontal synchronization phase distribution is calculated and the horizontal synchronization phase is estimated. Even when radio interference occurs, therefore, a horizontal synchronization phase which is most accurate can be obtained, disturbance and distortion of an image can be reduced, and an image having a sharp outline can be obtained. Since the input horizontal synchronizing signal is not restricted by forming a window, it is possible to flexibly cope with ghost signals in which the path difference is large, or with a channel change.

Next, the horizontal synchronization phase input buffer 408 and the vertical synchronization phase input buffer 409 in the configuration shown in FIG. 17 will be described in more detail.

A vertical synchronizing signal input table which will be described later corresponds to the vertical synchronization phase input buffer 409, and a horizontal synchronizing signal input table to the horizontal synchronization phase input buffer 408.

First, the horizontal synchronizing signal input table will be described with reference to FIG. 18(a).

As described above, when a horizontal synchronizing signal is supplied from synchronizing signal detecting means 3 to horizontal synchronization phase detecting means 401, a counter 15, a timer, or the like detects the phase of the signal. The phase is expressed by the value of the counter 15 or the timer in which the horizontal synchronization interval corresponds to one period, and the value of the counter 15 or the timer in which the vertical synchronization interval or one frame corresponds to one period. When the horizontal synchronizing signal is input, the vertical synchronization phase and the horizontal synchronization phase of the signal are obtained and then input to a table of a predetermined data number. At the same time, the electric field information detecting means 7 obtains electric field information at the timing when the horizontal synchronizing signal is input, such as the multipath level, the electric field strength, and variation amounts of these values. The obtained information is input to the table of the same data number. The reliability of the input horizontal synchronizing signal is judged by using the electric field information. The degree of the reliability is input to the table of the same data number. These data are recorded in, for example, the line of data No. 1 of the horizontal synchronizing signal input table shown in FIG. 18(a) in the sequence starting from the left end of the figure and directed toward the right end, as vertical synchronization phase 1, horizontal synchronization phase 1, electric field information 1, and reliability 1. In FIG. 18(a), the various kinds of data in the line of data No. 1 are data of the horizontal synchronizing signal $H_n$ shown in FIG. 15, and the various kinds of data in the line of data No. J correspond to data of the horizontal synchronizing signal $H_j$ shown in FIG. 15.

When a histogram is used for representing the horizontal synchronization distribution in the estimation of the horizontal synchronization phase, a class in the vicinity of the maximum value of the histogram is obtained, and the horizontal synchronizing signal input table is used in order to obtain an estimated value.

First, the data of the horizontal synchronization phase and the reliability which are recorded in the horizontal synchronizing signal input table are checked. Among data included in the class in the vicinity of the maximum value of the horizontal synchronization phase, data of high reliability are extracted from the horizontal synchronizing signal input table. Next, the average value of the extracted data is obtained to be set as an estimated value of the horizontal phase. Alternatively, the latest one of the extracted data may be set as an estimated value of the horizontal phase, or, in the case where a value which has been estimated in the past is stored, a data which is closest to the past estimated value may be obtained from the extracted data and then set as an estimated value of the horizontal phase. Alternatively, the distribution of the extracted data may be obtained and a data of the maximum frequency may be set as an estimated value. In the case where data included in the vicinity of the class of the maximum value do not exist in the data recorded in the horizontal synchronizing signal input table, the past estimated value may be used as it is, a median in the vicinity of the maximum class may be used, or an average of the estimated value and the median in the vicinity of the maximum class may be used.

According to this configuration, the accuracy of the estimation of the horizontal synchronization phase can be improved. When a histogram is used for representing the horizontal synchronization distribution, the estimation accuracy can be improved. FIG. 18(b) is a view showing a vertical synchronizing signal input table. The table is identical with the horizontal synchronizing signal input table, and hence its description is omitted.

Next, a horizontal phase frequency table in the horizontal synchronization phase distribution calculating means 402 of the configuration shown in FIG. 17 will be further described.

First, the case where one horizontal phase frequency table is used will be described with reference to FIG. 19(a).

The phases of horizontal synchronizing signals are classified into an M number (M is an integer) of classes as indicated by phases 1 to M in a table of FIG. 19(a), and the frequency of the input horizontal synchronization phase is calculated. Specifically, the distribution of the count value (see FIG. 16) of the phases of horizontal synchronizing signals which are input in one frame period always exists between the count value of 0 and the count value at the timing of the 1 H period, and hence the spread width of the distribution is divided into an M number of classes. Then, the count value of each horizontal synchronizing signal belonging to each of the divided classes is detected. The detection frequency, i.e., the number of detections is calculated for each class. For example, the line indicated as phase 1 in the table of FIG. 19(a) corresponds to a first class, and the frequency calculated for the class is recorded as detection frequency 1.

The detection frequency in the frequency table is calculated in the following method. When a vertical synchronizing signal is output, the table is cleared. The phase frequencies of all horizontal synchronizing signals which are input until the next vertical synchronizing signal is output or during one frame period are obtained for each class. In this way, the frequency table is obtained, and a class in the vicinity of the maximum class is obtained. With using also the horizontal synchronizing signal input table (see FIG. 18(a)) which has been described above, the horizontal synchronization phase estimating means 403 estimates the horizontal synchronization phase.

The kinds of horizontal phase frequency tables will be described more specifically with reference to the figures.

As shown in FIGS. 20(a) to 20(d), various kinds of horizontal phase frequency tables are obtained in accordance with the state of radio interference.

When the wave strength is sufficiently high and disturbances due to multipaths and the like less occur, a distribution such as shown in FIG. 20(a) is obtained. When the wave level is low, a distribution such as shown in FIG. 20(b) is obtained. When multipaths exist, a distribution such as shown in FIG. 20(c) or 20(d) having plural peaks is obtained.

In the case of a distribution such as shown in FIG. 20(a), the peak may be used as an estimated value of the phase. In the case of a distribution such as shown in FIG. 20(b), similarly, the peak may be used as an estimated value of the phase, and the phase estimation may be accurately conducted with reference to an average of data of high reliability, or a histogram, a median, and past estimated data of the horizontal synchronizing signal input table (see FIG. 18(a)).

In the case of a distribution such as shown in FIG. 20(c) or 20(d), an estimated value is obtained on the basis of the peaks of the distribution, information of the above-mentioned horizontal synchronizing signal input table, and past output information. If a past estimated value is at, for example, the maximum peak of the peaks of the distribution, the value is used as an estimated value. If a past estimated value is at a peak other than the maximum peak of the distribution, the decision on whether an estimated value is set to be the maximum peak or the past peak can be done by using relatively new data of the horizontal synchronizing signal input table. For example, a method may be employed in which, if data belonging to the maximum peak exist in a larger number in relatively new data of the horizontal synchronizing signal input table, the maximum peak of the distribution is used as an estimated value class.

As a result, estimation of the horizontal phase can be realized by obtaining the maximum distribution class, and it can be conducted easily and correctly. Since plural peaks of a distribution can be obtained and dominant multipaths can be specified from the peaks, a skip and flicker of an image can be reduced. A peak of a distribution can be obtained, and components of multipaths can be obtained from the peak. The delay time of each component can be obtained. According to this configuration, it is possible to conduct ghost cancellation in a video signal.

The case where two horizontal frequency tables 1 and 2 are used will be described with reference to FIGS. 19(a) and 19(b).

In the case where two horizontal frequency tables 1 and 2 are used, the tables are updated in the following manner.

The electric field information at the timing when a horizontal synchronizing signal is input is checked. When the electric field information is sufficient or multipaths are small in number, the horizontal frequency table 1 is updated. When multipaths are large in number, the horizontal frequency table 2 is updated. If the operation of clearing the horizontal synchronization phase frequency tables is inhibited during a period other than the channel switching, the horizontal frequency table 1 shows a steady-state frequency, and the horizontal frequency table 2 shows the state where multipaths occur. In the case of the horizontal phase estimation, when the frequency table 1 have a sufficiently large number of data, or, for example, when the total number of data in the vicinity of the maximum class or the total data number of each class is equal to or larger than a specified value, the horizontal phase can be estimated by using the frequency table 1. When the total number is equal to or smaller than the specified value, the horizontal phase can be estimated by using the frequency tables 1 and 2. In the case where the total number is equal to or smaller than the specified value, the estimation is conducted in the following manner. Plural peaks are obtained from frequency information relating to multipaths of the frequency table 2, and the peaks are checked to see whether they exist in the frequency table 1 or not. If exist, relatively new data of the horizontal synchronizing signal input table are further checked, and a data of a higher frequency and belonging to each peak is used as an estimated value. If the peaks do not exist in the table, a past output phase is selected as an estimated value.

Also when multipaths are many, the horizontal frequency table 1 may be subjected to the updating operation in a duplicate manner. In this case, the frequency table to be used in estimation is determined in accordance with the number of data in the vicinity of a peak of the distribution. In the above, the embodiment in which the frequency based on counter values is calculated to obtain the phase distribution has been described. The invention is not restricted to this. For example, a configuration in which the phase distribution is treated as an analog value may be employed.

According to this configuration, the horizontal phase estimation in the case of multipaths can be conducted more accurately with excellent responsiveness.

In the above, the horizontal phase frequency table has been described in detail. The vertical phase frequency table has similar contents as those of the horizontal phase frequency table, and hence its description is omitted.

Figure 21:
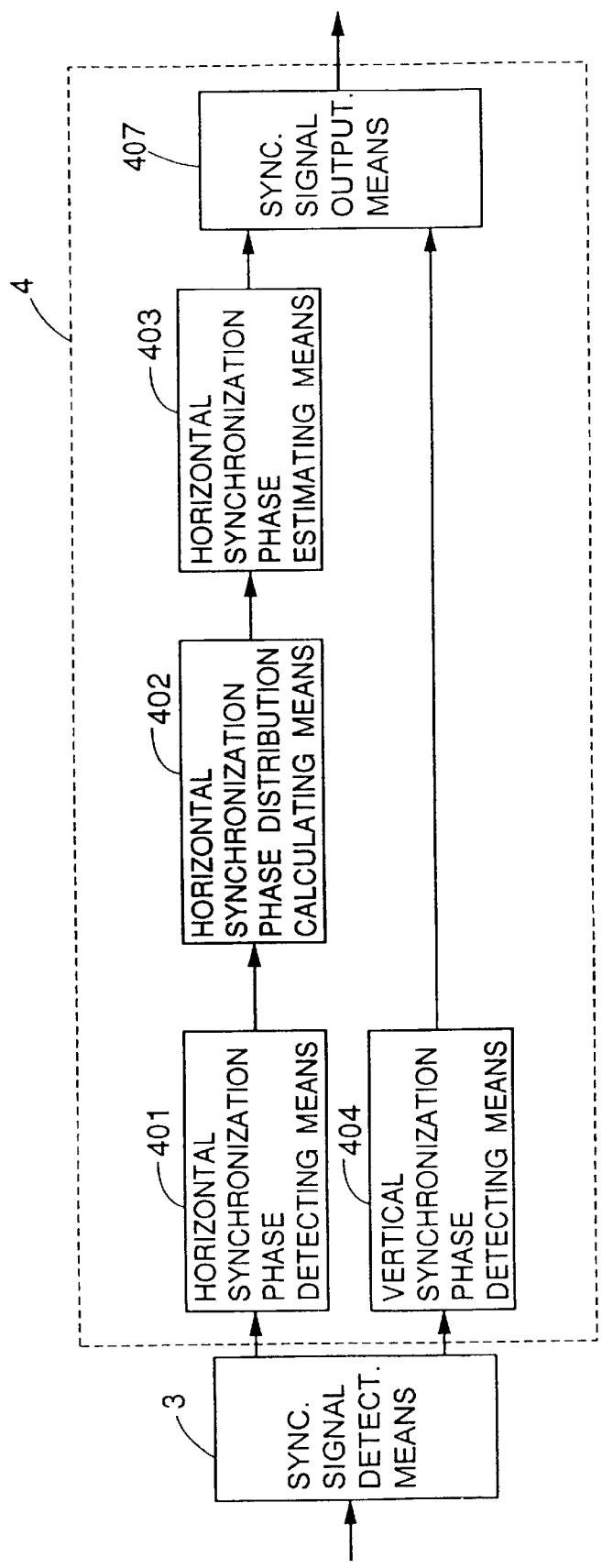
FIG. 21 is a view showing the configuration of another embodiment of the synchronizing signal stabilizer of the invention.

In the above, the embodiment in which the horizontal synchronization phase signal and the vertical synchronization phase signal are subjected to estimation of the phase of each signal has been described. The invention is not restricted to this. As shown in FIG. 21, for example, the phase estimation may be conducted only on the horizontal synchronization phase signal. In this case, the horizontal synchronizing signal can be stabilized, and hence a video signal which is more stabilized can be obtained. FIG. 21 is a view showing the configuration of another embodiment of the synchronizing signal stabilizer.

Figure 22:
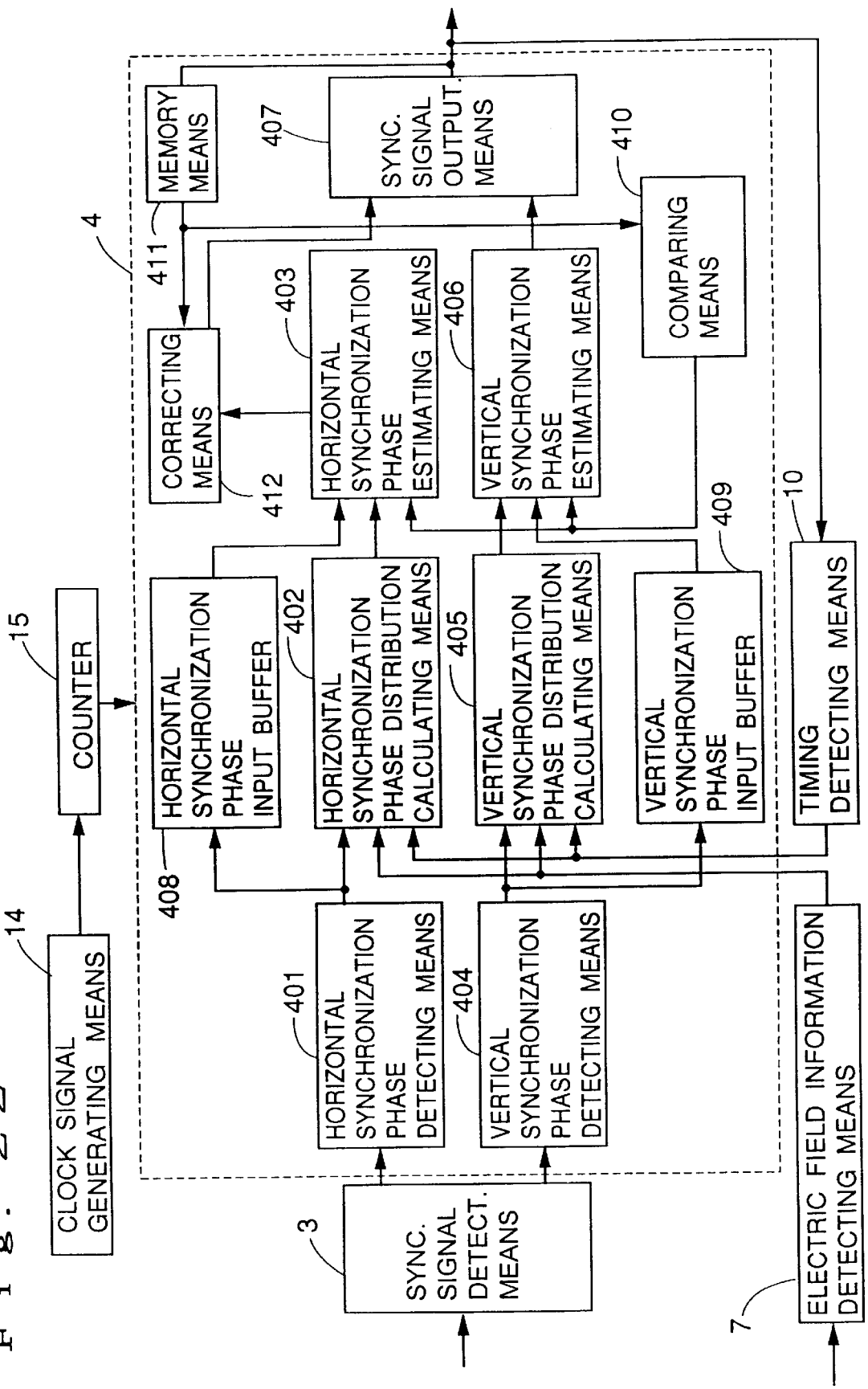
FIG. 22 is a view showing the configuration of a television video/audio signal receiver which is a further embodiment using the synchronizing signal stabilizer of the invention.

In the description of the embodiment, the manner of controlling the output of the synchronization phase in the case where the synchronization phase is largely changed has not been particularly discussed. In order to smoothly cope with such a case, a configuration shown in FIG. 22 may be employed. FIG. 22 is a view showing the configuration of a television video/audio signal receiver of another embodiment in which the configuration of the television video/audio signal receiver shown in FIG. 17 is further provided with: memory means 411 for storing an output signal of the synchronizing signal outputting means 407; and comparing means 410 for comparing the stored output signal with the horizontal synchronizing signal phase estimated by the horizontal synchronization phase estimating means 403, for comparing the stored output signal with the vertical synchronizing signal phase estimated by the vertical synchronization phase estimating means 406, and for correspondingly outputting results of the comparisons to the horizontal synchronization phase estimating means 403 and the vertical synchronization phase estimating means 406. In the embodiment, the horizontal synchronization phase estimating means 403 and the vertical synchronization phase estimating means 406 shown in FIG. 22 conduct the phase estimation by utilizing also the comparison results output from the comparing means. Specifically, the memory means 411 stores previous synchronization phases. The comparing means 410 compares the synchronization phase output from the horizontal synchronization phase estimating means 403 or the vertical synchronization phase estimating means 406, with the previous synchronization phases stored in the memory means 411. When a channel is to be switched over, for example, there is a possibility that the result of the comparison shows a large difference. Even if the phase is largely changed, the phase is not immediately output. Specifically, in order to wait for stabilization of the variation of the synchronization phase, the comparing means 410 follows the change of the phase after an elapse of a fixed time from the timing when the phase is largely changed. Therefore, the comparing means 410 controls the synchronization phase estimating means 403 and 406 so as to output a phase obtained before the timing when the phase is largely changed. According to this configuration, it is possible to output a phase which does not follow the erroneous phase variation due to malfunction or the like and which is further stabilized. The television video/audio signal receiver shown in FIG. 22 further comprises correcting means 412. The correcting means 412 compares the output signal stored in the memory means 411 with the estimated horizontal synchronization phase signal obtained from the horizontal synchronization phase estimating means 403, and, in accordance with the result of the comparison, corrects a change of the estimated horizontal synchronization phase signal which is caused by disturbance of the clock signal due to malfunction of the clock signal generating means 14 or the like. Specifically, the correcting means 412 compares the output phase of the horizontal synchronization phase estimating means 403 with the previous phase of the memory means 411. As a result, if it is judged that the output phase of the horizontal synchronization phase estimating means 403 tends to be gradually increased or reduced for each frame, for example, the correcting means 412 judges that such a phase change is caused by an abnormality of the clock signal, and conducts a correction for eliminating the change. Since the correcting means 412 is disposed in this way, it is possible to obtain a video signal which is further stabilized.

(Embodiment 4)

Figure 23:
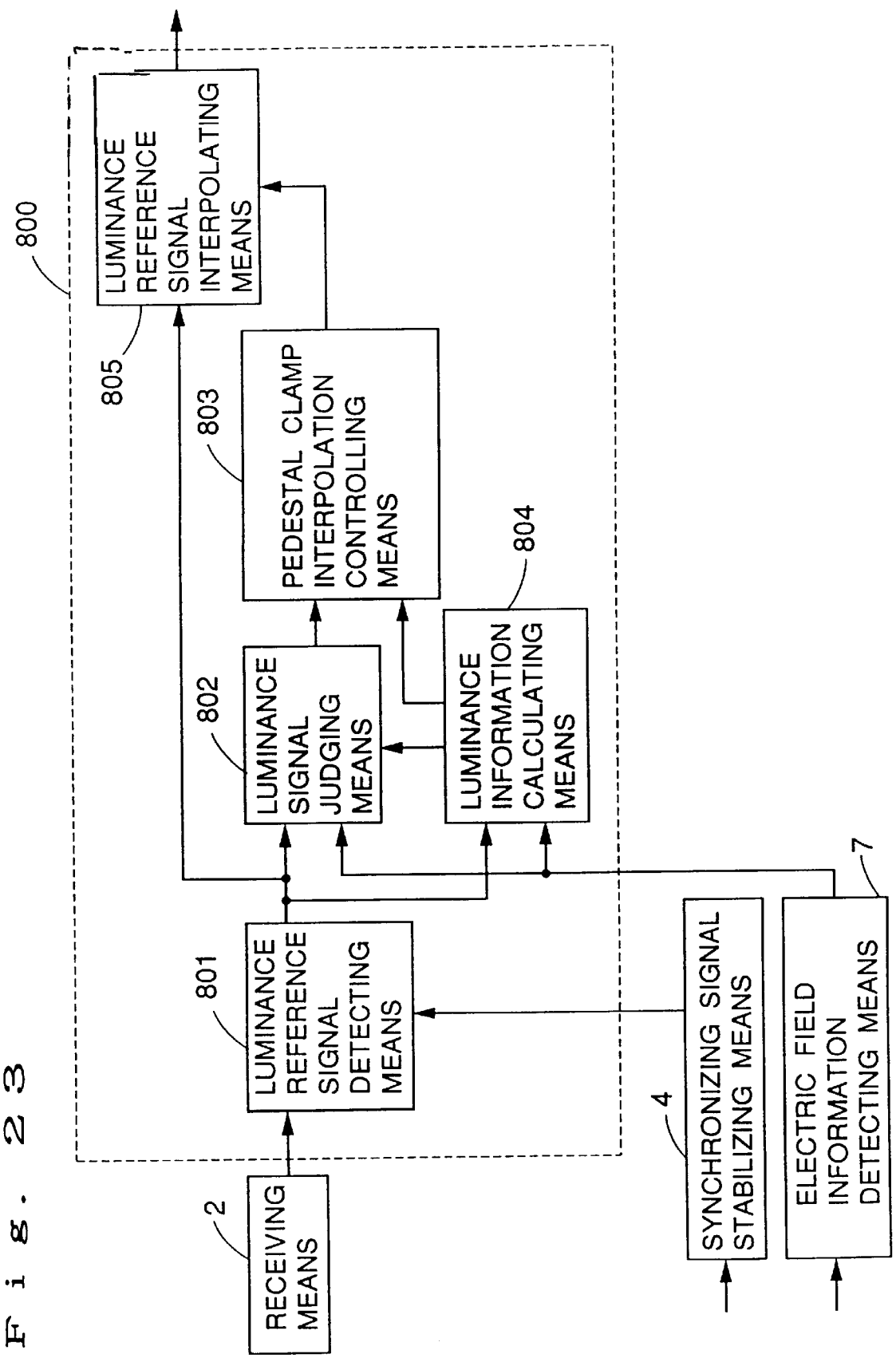
FIG. 23 is a view diagrammatically showing the configuration of a television video/audio signal receiver which is an embodiment using the luminance signal stabilizer of the invention.

FIG. 23 is a view diagrammatically showing the configuration of a television video/audio signal receiver which is an embodiment using the luminance signal stabilizer of the invention.

The configuration of the embodiment will be described with reference to the figure. The components which are fundamentally identical with those described with reference to FIG. 3 and the like are designated by the same reference numerals, and their description is omitted. FIG. 23 is a view showing in more detail the video signal stabilizing means 8 of the television video/audio signal receiver of FIG. 3. A luminance signal stabilizer 800 corresponds to the video signal stabilizing means 8. Hereinafter, therefore, the internal configuration of the luminance signal stabilizer 800 will be mainly described.

As shown in FIG. 23, the luminance signal stabilizer 800 comprises the following means. Luminance reference signal detecting means 801 obtains a luminance reference signal of a video signal included in the received signal received by the receiving means 2, by using the stabilized synchronizing signal of the video signal. Luminance information calculating means 804 calculates luminance information from the luminance reference signal and holds the calculated luminance information. Luminance reference signal judging means 802 judges reliability of the luminance reference signal by using the luminance information held in the luminance information calculating means 804. Pedestal clamp interpolation controlling means 803 conducts an interpolation generation control of the luminance reference signal on the basis of a result of the judgement. On the basis of the result of the judgement, luminance reference signal interpolating means 805 outputs the luminance reference signal with interpolating the luminance reference signal in accordance with interpolation information obtained from Pedestal clamp interpolation controlling means 803, or outputs the luminance reference signal without conducting the interpolation. Electric field information detecting means 7 detects electric field information from a signal obtained from the receiving means 2. When the luminance information is to be calculated, the luminance information calculating means 804 utilizes the electric field information, and, when the judgement is to be conducted, the luminance reference signal judging means 802 utilizes also the electric field information. The luminance reference signal interpolation controlling means in the invention corresponds to the pedestal clamp interpolation controlling means 803.

The operation of the thus configured embodiment will be described with reference to FIGS. 23 and 24.

Referring to FIG. 23, the luminance reference signal of the video signal obtained in the receiving means 2 is detected by the luminance reference signal detecting means 801. In this case the position where the luminance reference signal exists can be correctly obtained by using the stabilized synchronizing signal obtained from the synchronizing signal stabilizing means 4.

The luminance reference signal judging means 802 judges the stability and reliability of the luminance reference signal supplied from the luminance reference signal detecting means 801. The luminance reference signal is a signal which is an object of the interpolating process. In the judgment, the luminance information obtained from the luminance information calculating means 804, and the electric field information obtained from the electric field information detecting means 7. The luminance information corresponds to an interpolation value which will be described later.

As the method of calculating the luminance information in the luminance information calculating means 804, a method in which average luminance information is obtained for each frame of an image may be employed. The average luminance information for each frame may be obtained while, by using the electrical field information, excluding multipaths and a state in which the electric field is weak or that in which the electric field is largely varied. As a luminance average of a frame, an average within a range of several frames may be calculated. Alternatively, the luminance average may be obtained for each line (for each horizontal synchronizing signal), or for plural lines.

Figure 24:
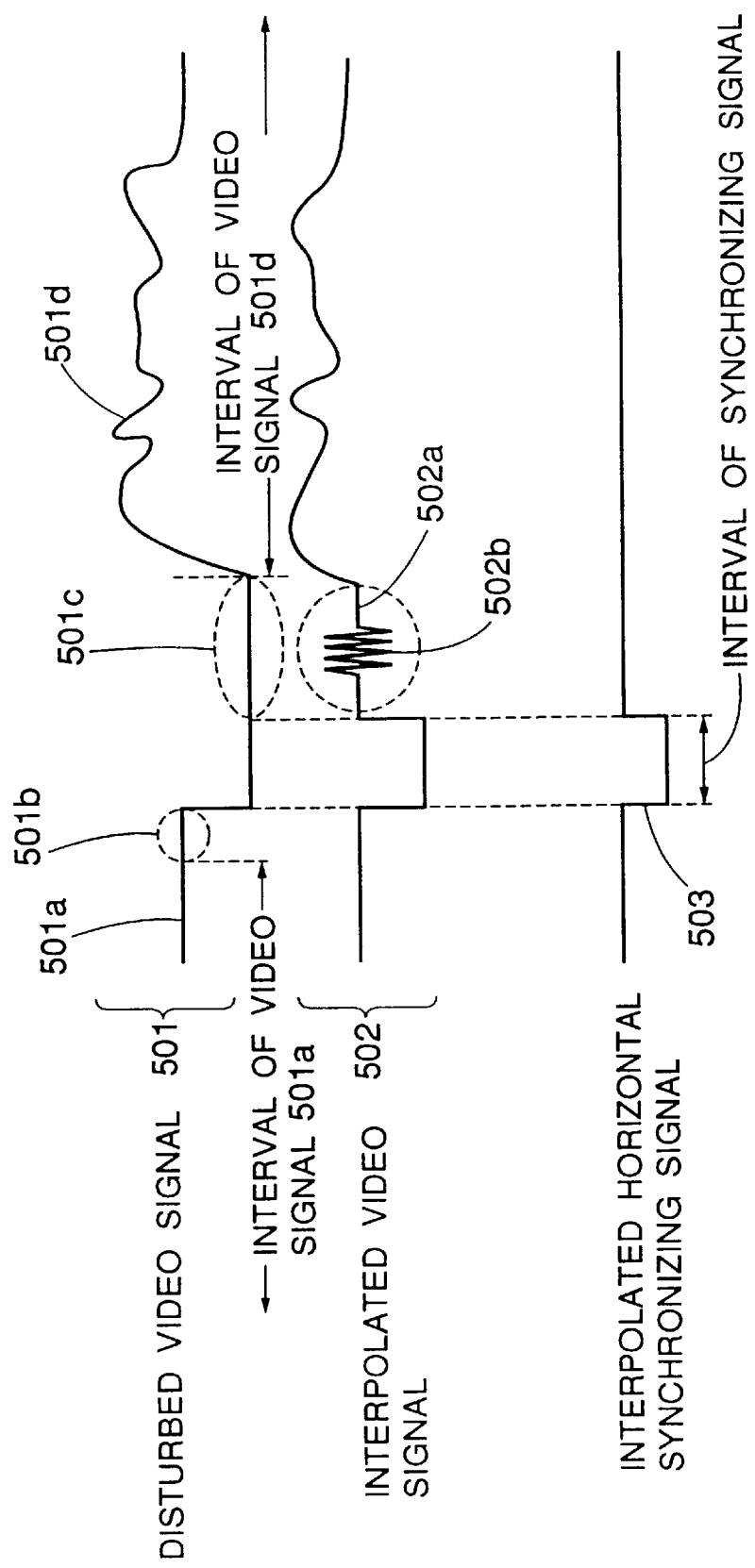
FIG. 24 is a view illustrating the interpolation in the embodiment.

In the embodiment, as shown in FIG. 24, the luminance information calculating means 804 calculates luminance information by using the luminance reference signal obtained from a signal 501b which exists between a video signal 501a received immediately before a horizontal synchronizing signal 503 and the horizontal synchronizing signal 503, and holds the information. The luminance reference signal interpolating means 805 conducts the interpolation by using the luminance information on a luminance reference signal 501c in a period from a timing which is immediately after the horizontal synchronizing signal 503 to a timing which is immediately before a video signal 501d sent subsequent to the horizontal synchronizing signal 503. In other words, in accordance with the luminance information, the zone in which interpolation is to be conducted is a zone from the end of a horizontal synchronizing signal to the beginning of the next video signal. As shown in the figure, the luminance reference signal 501c suffers two disturbances, i.e., a pedestal level disturbance and a color burst disturbance. An interpolated video signal 502 shown in the figure is a result of an operation in which also a stabilizing process of a color reference signal conducted in another embodiment described later is applied. In the case where only a stabilizing process of the luminance reference signal is conducted, a signal 502a shown in the figure which has undergone pedestal level interpolation is added to a color burst signal. In the case where only a stabilizing process of the color reference signal is conducted, a signal 502b shown in the figure which has undergone color burst interpolation is added to the DC value of the color burst signal as described later.

Specifically, the pedestal clamp interpolation controlling means 803 sends a judgment result output from the luminance reference signal judging means 802 and on whether interpolation of a luminance signal is to be conducted or not, and the luminance information which is to be used as the interpolation value and which is output from the luminance information calculating means, to the luminance reference signal interpolating means 805. If a judgment result indicating that interpolation of a luminance signal is to be conducted is obtained, the luminance reference signal interpolating means 805 conducts interpolation of the luminance reference signal. By contrast, if a judgment result indicating that interpolation of a luminance signal is not to be conducted is obtained, the luminance reference signal interpolating means 805 uses the luminance reference signal (in FIG. 24, a signal corresponding to the luminance reference signal 501c) sent from the luminance reference signal detecting means 801 to the luminance reference signal judging means 802, as it is, and does not conduct the interpolating process.

When the luminance reference signal interpolating means 805 is to conduct the process of interpolation, the process may be realized by interpolating and replacing the waveform included in the luminance reference signal in the video signal level, or by merely adding the DC value during a period including the luminance reference signal. When values of DC components are subjected to addition or the like in this way, also the color burst signal which is a color signal is improved. When the luminance reference signal is obtained as a digital signal, the luminance reference signal may be replaced with an interpolated value or the interpolation level may be added or subtracted. In an actual video signal process, the luminance reference signal has a pedestal level and can be realized by interpolation of the pedestal clamp level. Since the stabilized horizontal synchronizing signal is used, the sample timing of the pedestal clamp level in the luminance reference signal detecting means can be correctly obtained.

Since the luminance reference signal is stabilized in this way, flicker of a screen can be prevented from occurring, thereby producing an image which is easy to watch. The use of electric field information enables the disturbance zone of the video reference signal to be correctly detected, and also a reference signal which does not suffer a disturbance to be identified. Therefore, a correct interpolated value can be obtained. Furthermore, it is possible to correctly identify a reference signal which must be interpolated. As a result, flicker of the luminance signal due to wave interference can be improved very accurately, and hence an image which is easy to watch can be obtained. Moreover, the embodiment is particularly effective in the case of multipaths due to a delayed signal or a disturbance of the video reference signal caused by post ghost. Luminance information is calculated from a signal immediately before a synchronizing signal and the information is estimated as correct luminance reference information. Even when a disturbance occurs after the synchronizing signal, therefore, a correct video reference signal can be obtained and the interpolation level can be correctly estimated, with the result that the image quality can be improved.

In the above, the embodiment in which the luminance information calculating means calculates luminance information by using the luminance reference signal obtained from a signal existing between a video signal received immediately before a synchronizing signal and the synchronizing signal has been described. The invention is not restricted to this. For example, a configuration may be employed in which the luminance information calculating means calculates the luminance information by using a luminance reference signal obtained between a video signal received immediately before a synchronizing signal and the synchronizing signal, and also the luminance reference signal obtained in a period from a timing which is immediately after the synchronizing signal to a timing which is immediately before a video signal sent subsequent to the synchronizing signal. Also in this case, the same effect as described above, i.e., the effect that an image which is easy to watch can be obtained is attained.

In the above, the embodiment in which a stabilized synchronizing signal is used has been described. The invention is not restricted to this. For example, a synchronizing signal is not required to have undergone a stabilizing process.

In the above, the embodiment in which electric field information is used has been described. The invention is not restricted to this. For example, a configuration in which electric field information is not used may be employed.

Figure 25:
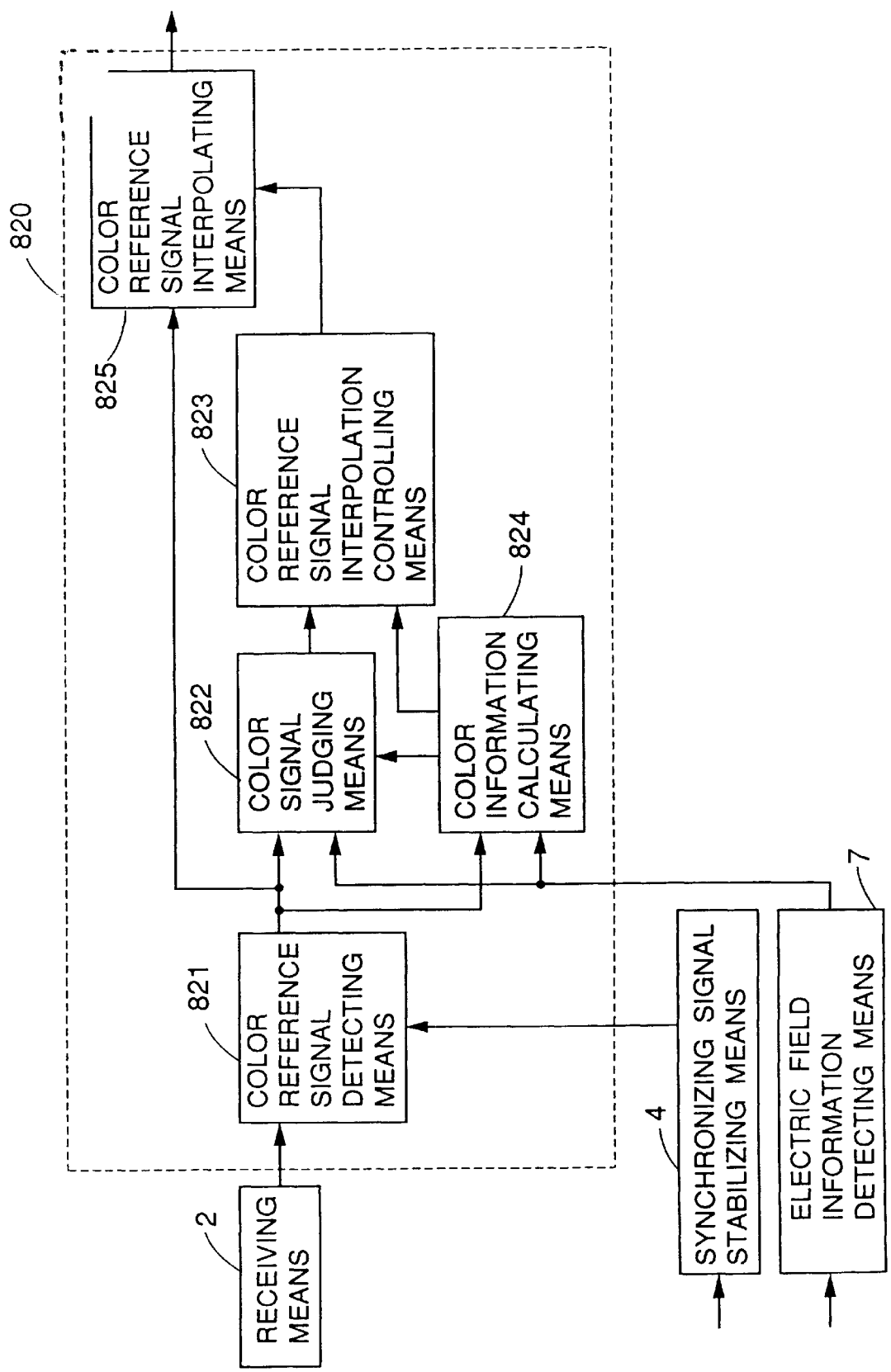
FIG. 25 is a view diagrammatically showing the configuration of a television video/audio signal receiver which is an embodiment using the color signal stabilizer of the invention.

In the above, the embodiment in which the luminance reference signal is stabilized has been described. The invention is not restricted to this. As shown in FIG. 25, for example, a color reference signal may be stabilized in a configuration which is fundamentally identical with that described above. FIG. 25 shows a color signal stabilizer 820 which is another embodiment, and is a view showing in more detail the video signal stabilizing means 8 of the television video/audio signal receiver of FIG. 3. The color signal stabilizer 820 corresponds to the video signal stabilizing means 8. As shown in FIG. 25, color reference signal detecting means 821 obtains a color reference signal of a video signal included in a received signal received in the receiving means 2, by using the stabilized synchronizing signal of the video signal. Color information calculating means 824 calculates color information from the color reference signal and holds the calculated color information. Color reference signal judging means 822 judges reliability of the color reference signal by using the color information held in the color information calculating means 824. Color reference signal interpolation controlling means 823 conducts an interpolation generation control of the color reference signal on the basis of a result of the judgement. On the basis of the result of the judgement, color reference signal interpolating means 825 outputs the color reference signal with interpolating the color reference signal in accordance with interpolation information obtained from the color reference signal interpolation controlling means 823, or outputs the color reference signal without conducting the interpolation. Electric field information detecting means 7 detects electric field information from a signal obtained from the receiving means 2. When the color information is to be calculated, the color information calculating means 824 utilizes the electric field information, and, when the judgement is to be conducted, the color reference signal judging means 822 utilizes also the electric field information. Also in the embodiment, the same effect as described above, i.e., the effect that an image which is easy to watch can be obtained is attained.

Figure 26:
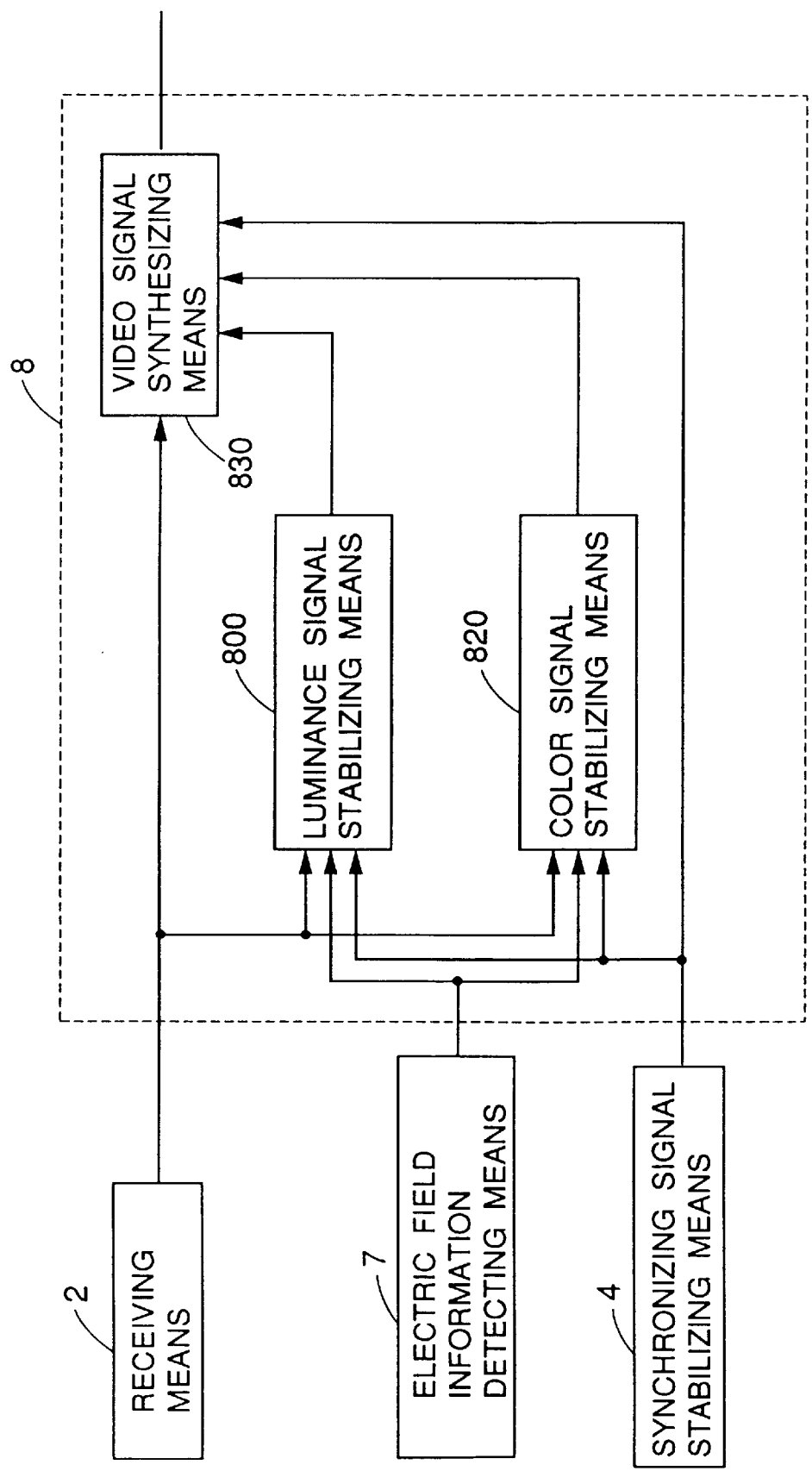
FIG. 26 is a view diagrammatically showing the configuration of a television video/audio signal receiver which is an embodiment using the luminance signal stabilizer and the color signal stabilizer of the invention.

In the above, the embodiments in which the image stabilizing means stabilizes one of the luminance reference signal and the color reference signal have been described. The invention is not restricted to them. As shown in FIG. 26, for example, a configuration in which both the luminance reference signal and the color reference signal are stabilized may be employed. In this case, as shown in FIG. 26, video signal synthesizing means 830 synthesizes the video signal, the luminance reference signal output from the luminance reference signal interpolating means 805 (see FIG. 23), and the color reference signal output from the color reference signal interpolating means 825 (see FIG. 25) with each other, and outputs the synthesized video signal. According to this configuration, an effect that which is further easy to watch can be attained. FIG. 26 shows a video signal stabilizer which is another embodiment, and is a view showing in more detail the video signal stabilizing means 8 of the television video/audio signal receiver of FIG. 3.

Figure 27:
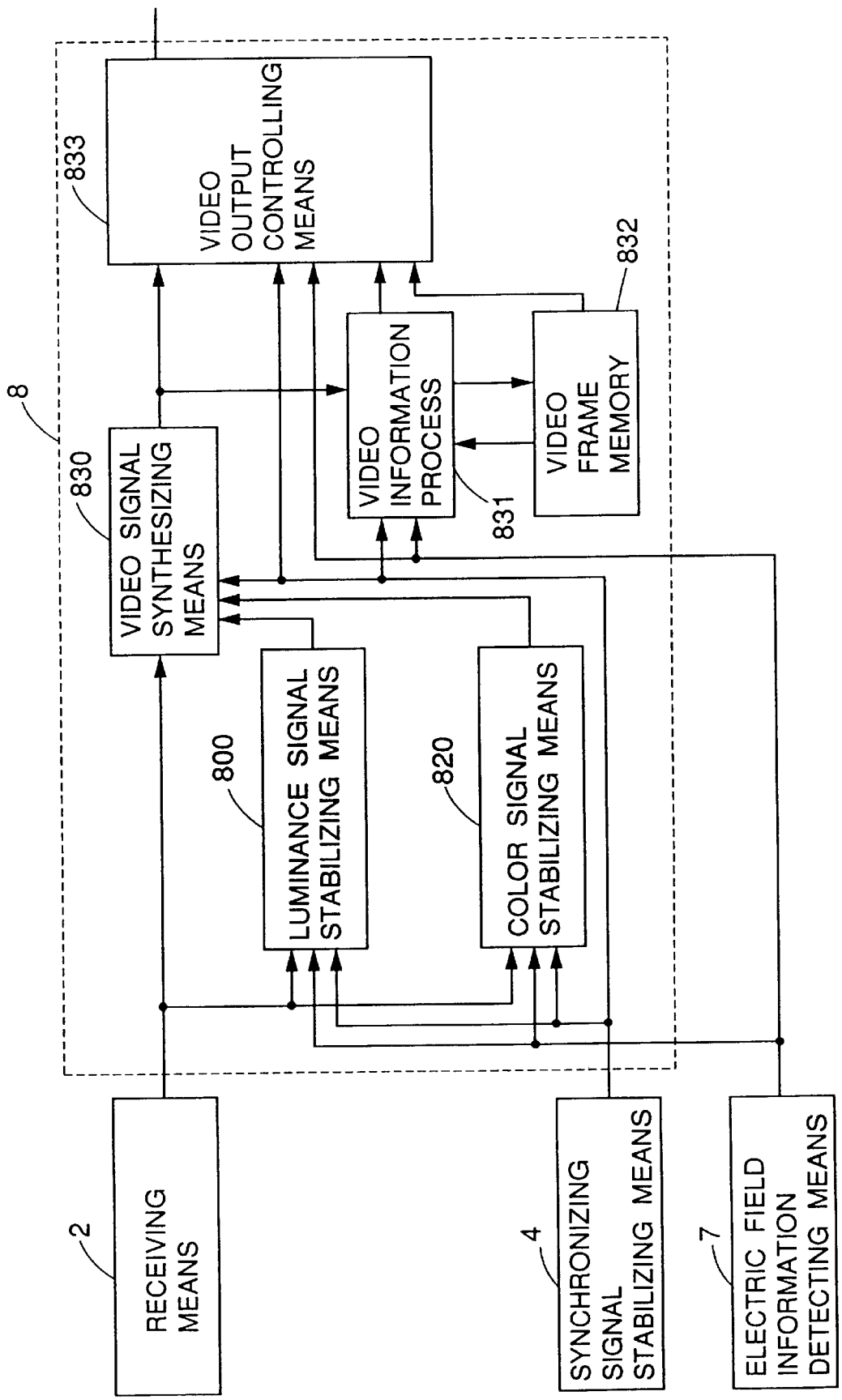
FIG. 27 is a view diagrammatically showing the configuration of a television video/audio signal receiver which is another embodiment using the luminance signal stabilizer and the color signal stabilizer of the invention.

In the description of the embodiment, the manner of controlling the video signal output from the video signal synthesizing means has not been particularly discussed. As shown in FIG. 27, for example, the configuration of FIG. 26 may be modified so as to further comprise video information processing means 831, a video frame memory 832, and video output controlling means 833. Specifically, as shown in FIG. 27, the video frame memory 832 stores the video signal, and the video information processing means 831 processes the synthesized video signal obtained from the video signal synthesizing means 830, and the video signal stored in the video frame memory, on the basis of a synchronizing signal which has undergone a predetermined stabilizing process and the electric field information, and outputs video data to the video frame memory. The video output controlling means 833 selects one of the video signal obtained from the video signal synthesizing means 830, and the video signal obtained from the video frame memory 832, on the basis of the stabilized synchronizing signal output from the synchronizing signal stabilizing means 4, the electric field information from the electric field information detecting means 7, and a control signal from the video information processing means 831, and outputs the selected video signal. In this case, when multipaths obtained from the electric field information exceed a predetermined reference, the video signal obtained from the video frame memory 832 may be selected, whereby a video signal which is further stabilized can be output. In this case, preferably, the selected video signal is a video signal immediately before a video signal in which multipaths exceed the predetermined reference.

In the above, the embodiment in which, in order to stabilize the video signal, the luminance reference signal or the color reference signal is stabilized has been described. However, the manner of stabilizing the video signal is not restricted. Therefore, the stabilizer may be realized by, for example, a configuration comprising: electric field information detecting means for detecting electric field information from an input received signal; a video frame memory which stores a video signal of the received signal; video signal stabilizing means for conducting a stabilizing process on the video signal; and video output controlling means for, by using the electric field information, selecting one of the video signal obtained from the video signal stabilizing means, and the video signal obtained from the video frame memory, and for outputting the selected video signal. According to this configuration, a video signal can be selected by using the electric field information, and hence a video signal which is further stabilized can be output.

The embodiments described above may be realized by hardware using electronic circuits and the like, or a software using programs.

As apparent from the above description, the invention has an advantage that an incoming video signal can be further stabilized as compared with the prior art, or that noises of an incoming audio signal can be further reduced as compared with the prior art.

Hereinafter, embodiments of the invention will be described with reference to the drawings.

(Embodiment 5)

Figure 28:
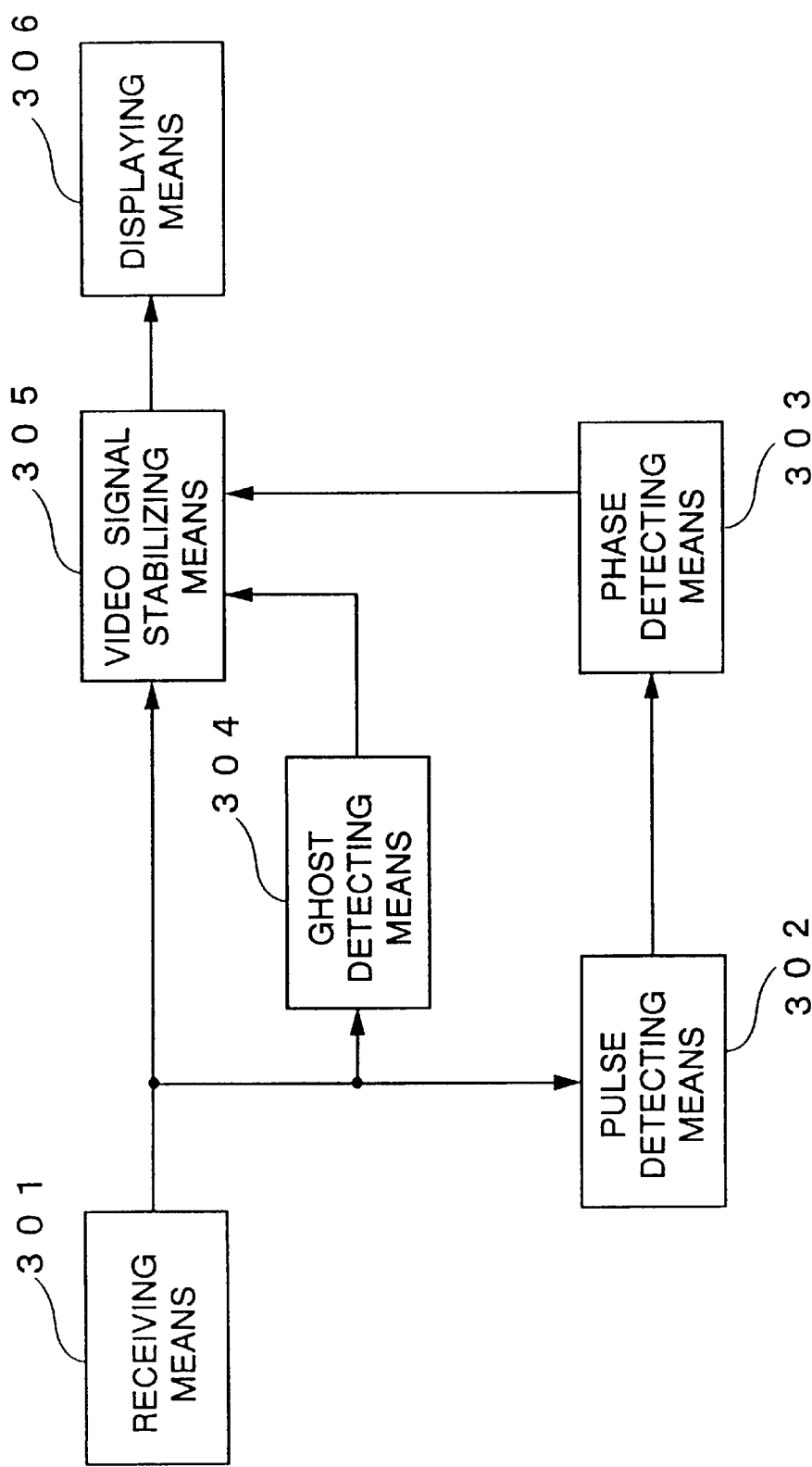
FIG. 28 is a view showing the configuration of a television signal receiver which is an embodiment of the invention.

FIG. 28 is a view showing the configuration of a television signal receiver which is an embodiment of the invention.

The configuration of the embodiment will be described with reference to the figure. Receiving means 301 receives a television signal. Pulse detecting means 302 detects an equalizing pulse of a video signal obtained from the receiving means 301, and phase detecting means 303 detects the phase of the pulse obtained from the pulse detecting means 302. Ghost detecting means 304 detects an amount of ghosts included in the video signal obtained from the receiving means 301, by using a ghost detection reference signal (GCR) included in the video signal. Video signal stabilizing means 305 stabilizes an image on the basis of the ghost amount obtained in the ghost detecting means and control information obtained in the equalized phase detecting means 303, and displaying means 306 displays an image on the basis of a stabilized video signal obtained from the video signal stabilizing means 305.

The operation of the thus configured embodiment will be described with reference to FIG. 28.

The receiving means 301 detects and generates a video signal from the television signal.

The pulse detecting means 302 detects pulses included in the video signal and transmits the pulses to the phase detecting means 303.

Figure 29:
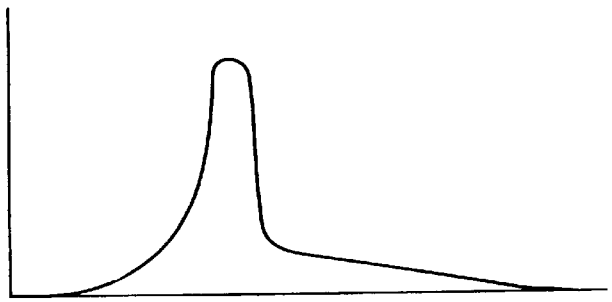
FIG. 29 is a view showing a phase distribution of pulses in the embodiment.
Figure 29:
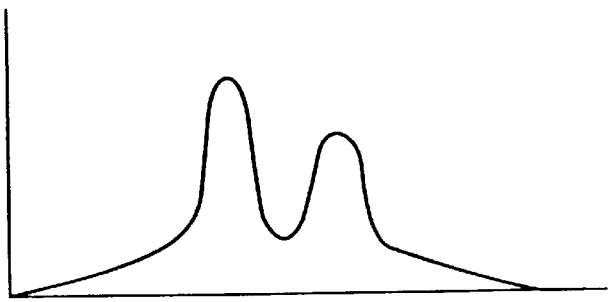

The phase detecting means 303 prepares a distribution of phases in which pulses are generated in the obtained pulse interval, and detects a normal pulse phase and an abnormal pulse phase. The manner of the operation is shown in FIG. 29.

As an example of the preparation of the phase distribution, a case in which the pulse detecting means 302 detects an equalizing pulse in a vertical blanking interval and the phase detecting means 303 detects the phase of the equalizing pulse will be considered. In this case, the falling or rising edge of the equalizing pulse interval detected by the pulse detecting means 302 may be used in the phase distribution. In FIG. 29, the abscissa indicates one half of the phase of the period of the horizontal synchronization, and the ordinate indicates the occurrence frequency. In the figure, (a) shows the equalized phase distribution in the case where the video signal which does not suffer a disturbance, and (b) shows a state in which the video signal suffers a disturbance due to multipaths or the like. In (a) of the figure, a peak appears at a position which is substantially equivalent to the phase of a horizontal synchronizing signal or which is offset from the phase by a fixed amount. By contrast, in the case of a video signal which suffers a disturbance due to multipaths, plural peaks may appear in addition to the peak of (a). The phase differences of the peak positions indicate the delay times of ghosts, and the frequency difference of the peak values indicates the disturbance amount or the ghost amount. As the frequency difference of the peak values is smaller, the disturbance amount is judged to be larger.

On the other hand, the ghost detecting means 304 detects ghost components included in the video signal. In the detection of ghosts, a technique such as that in which the ghost cancel signal (GCR) included in the video signal is used, or that in which autocorrelation of the video signal is obtained may be employed.

The video signal stabilizing means 305 conducts a stabilizing process on the video signal by using the phase and amount of the image disturbance obtained from the phase detecting means 303, and a transfer function of the ghost amount or ghost components obtained from the ghost detecting means 304. The object of the stabilizing process on the video signal is a ghost, and the phenomena include multiple images and image skip. As an image stabilizing processing method, a method in which video signals provided with a phase difference are added to each other, or that in which a multiplication of the reciprocal of a transfer function of ghosts is performed may be employed. Particularly, ghosts can be effectively eliminated by, in the case where the ghost detecting means 304 can obtain a transfer function of ghosts, using the reciprocal of the transfer function, and, in the case where the delay time and the delay amount can be obtained from the phase detecting means 303, adding video signals having a phase difference with each other.

In the displaying means 306, the video signal obtained from the video signal stabilizing means 305 is displayed on a display device such as a CRT, a liquid crystal display device, or a plasma tube.

In this way, a stabilized video signal can be obtained.

Figure 30:
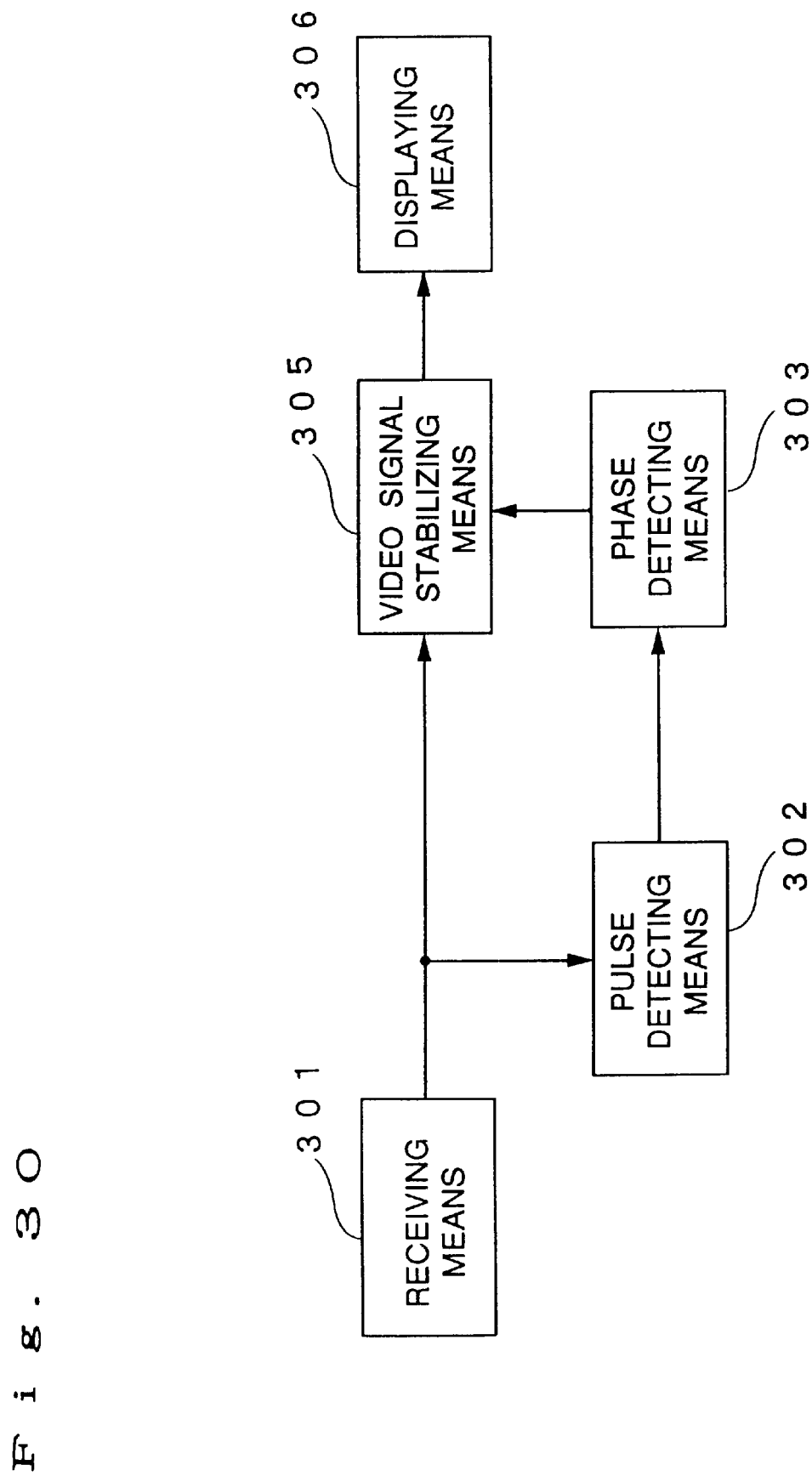
FIG. 30 is a view showing the configuration of a television signal receiver which is another embodiment of the invention.

In the above, the receiver comprising the ghost detecting means has been described. The invention is not restricted to this. As shown in FIG. 30, a configuration which is not provided with ghost detecting means may be employed. FIG. 30 shows a television signal receiver as another example which is not provided with the ghost detecting means 304 of the television signal receiver shown in FIG. 28. As shown in the figure, the television signal receiver comprises: receiving means 301 for receiving a television signal; pulse detecting means 302 for detecting a pulse of a video signal obtained from the receiving means; phase detecting means 303 for detecting the phase of the pulse; video signal stabilizing means 305 for conducting image-stabilization on the video signal obtained in the receiving means 301, on the basis of control information obtained from the phase detecting means 303; and displaying means 306 for displaying a video signal obtained from the video signal stabilizing means 305. In this case, the phase detecting means can detect a disturbance of the video signal, and hence it is possible to attain effects which are substantially equivalent to those of the embodiment described above.

Figure 31:
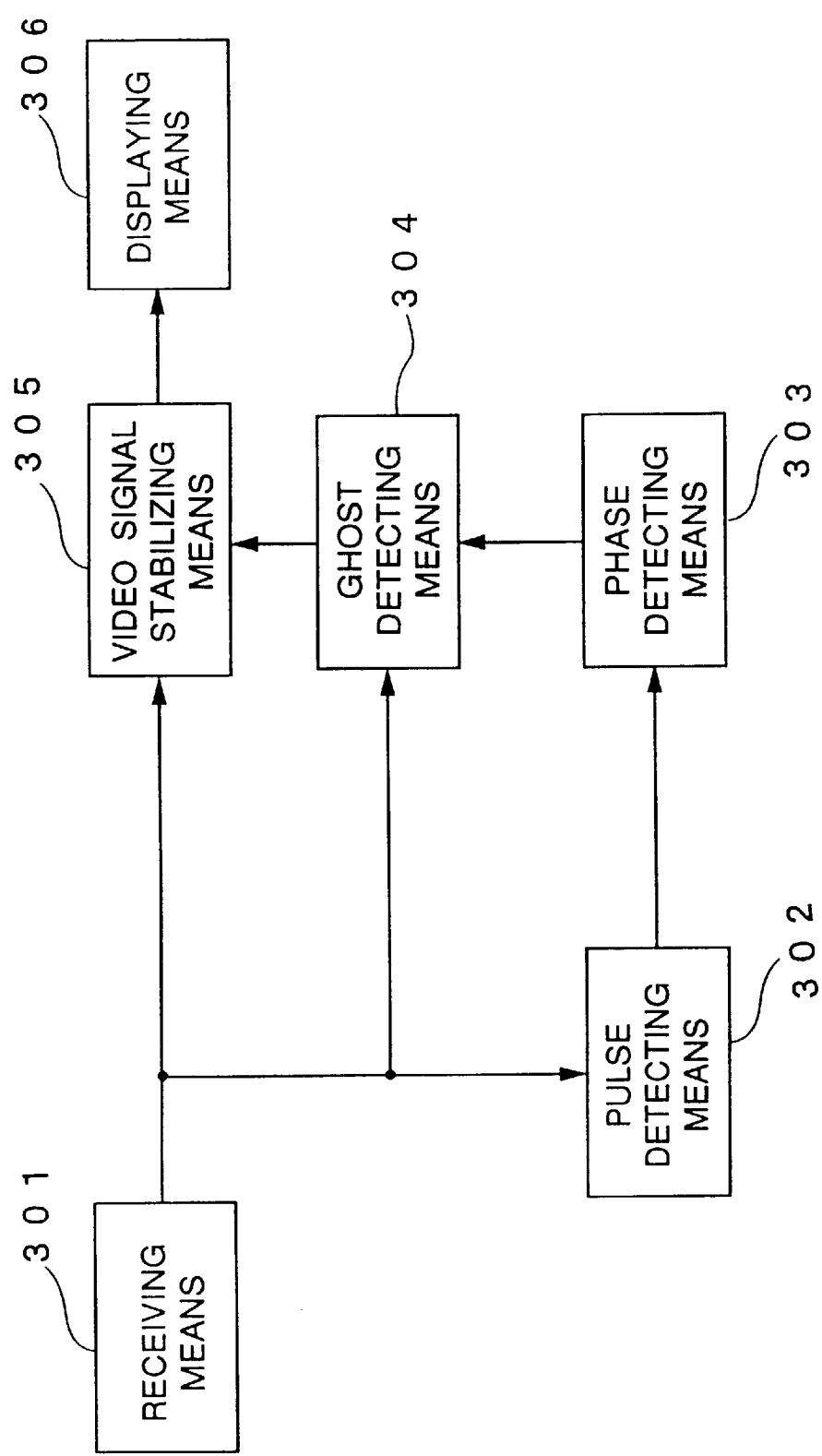
FIG. 31 is a view showing the configuration of a television signal receiver which is another embodiment of the invention.

In the above, the receivers respectively with and without the ghost detecting means have been described. The invention is not restricted to this. As shown in FIG. 31, a configuration which is provided with the ghost detecting means 304 and controlled by the phase detecting means 303 may be employed. FIG. 31 shows a television signal receiver as another example in which the ghost detecting means 304 of the television signal receiver shown in FIG. 28 is controlled by the phase detecting means 303. As shown in the figure, the television signal receiver comprises: receiving means 301 for receiving a television signal; pulse detecting means 302 for detecting a pulse of a video signal obtained from the receiving means 301; phase detecting means 303 for detecting the phase of the pulse; ghost detecting means 304 for detecting a ghost of the video signal, on the basis of a control signal obtained from the phase detecting means 303; video signal stabilizing means 305 for conducting image-stabilization on the video signal obtained from the receiving means, on the basis of control information obtained from the ghost detecting means 304; and displaying means 306 for displaying a video signal output from the video signal stabilizing means 305. The phase detecting means 303 previously gives the delay times and delay amounts of ghosts to the ghost detecting means 304. Therefore, the ghost detecting means 304 can rapidly calculate the transfer function of ghosts by using the GCR, etc. In this case, effects which are substantially equivalent to those of the embodiment described above can be attained rapidly and correctly.

(Embodiment 6)

Figure 32:
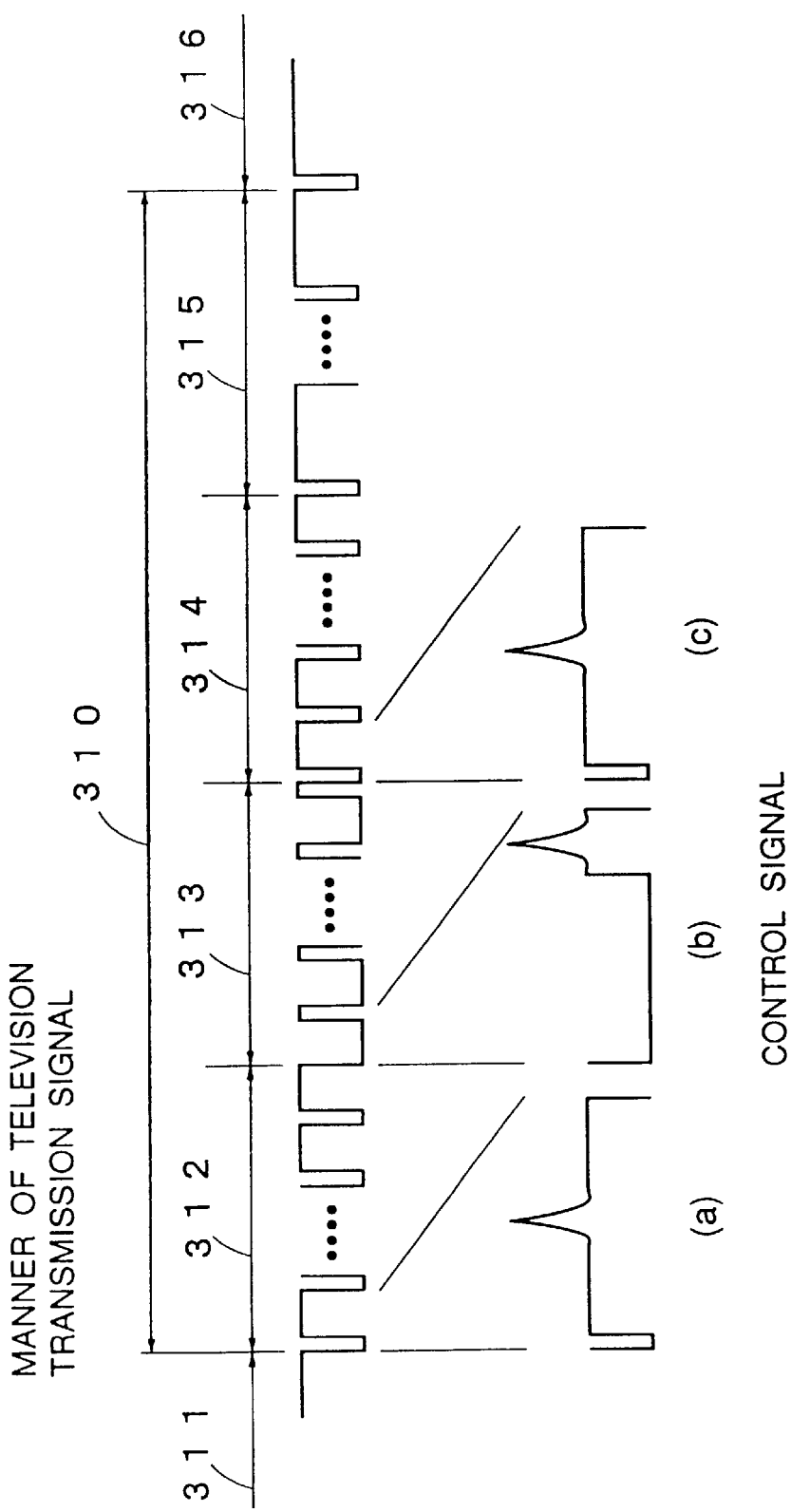
FIG. 32 is a view diagrammatically showing a method of transmitting a television signal which is an embodiment of the invention.

FIG. 32 is a view diagrammatically showing the method of transmitting a television signal of the invention in which a control signal is inserted into a video signal.

The embodiment will be described with reference to the figure which shows the contents of a television signal. The reference numeral 310 designates a vertical blanking interval, 311 designates a video signal interval, 312 designates an anterior equalizing pulse interval, 313 designates a vertical synchronizing signal interval, 314 designates a posterior equalizing pulse interval, 315 designates a reserve video signal interval, and 316 designates a video signal interval which is followed by the video signal interval after an elapse of a predetermined time and repeatedly appears. In the figure, (a) shows an example of a control signal which is inserted into the anterior equalizing pulse interval 312, (b) shows an example of a control signal which is inserted into the vertical synchronizing signal interval 313, and (c) shows an example of a control signal which is inserted into the posterior equalizing pulse interval 314. In the reserve video signal interval 315, actually, no display is conducted. Signals such as character signals, the ghost cancel reference signal, and a color phase reference exist in the interval.

The method of transmitting a television signal of the invention which is configured as described above will be described. The figure shows the manners of inserting control signals at positions of a positive level in the anterior equalizing pulse interval 312, the vertical synchronizing signal interval 313, and the posterior equalizing pulse interval 314 in the vertical blanking interval. In the figure, (a), (b), and (c) are enlarged views of one pulse interval of the anterior equalizing pulse interval 312, the vertical synchronizing signal interval 313, and the posterior equalizing pulse interval 314, respectively. The one interval is equal to one half of the period of the horizontal synchronizing signal. In (a), a signal such as $\sin(x)/x$ of a positive level and having a steep edge is inserted at a position of the positive interval. A similar signal is inserted into each of (b) and (c). When the television signal shown in the figure is received, in the case where there is no reception abnormality such as multipaths, control signals are obtained at the same positions as those shown in the figure. In the case where there is reception abnormality, a pulse is generated also at a position other than the positions at which the pulses are inserted. When positive pulses of the received signal obtained in the blanking interval 310 are checked, therefore, it is possible to know the reception abnormality state. If the signal of the maximum positive pulse level among the obtained signals is a correct control signal, signals of a positive level other than the signal can be checked to know the phase difference and the level difference. The transfer function of the reception abnormality can be known by obtaining the transfer function of the maximum level signal or a control signal which is estimated to be correct, and signals other than the signal.

As described above, when the method of transmitting a television signal of the invention is used, abnormality of the transmission system can be obtained by using a transfer function, or a delay time and a delay amount. Therefore, abnormality of an image, for example, ghosts such as multiple images and image skip can be improved.

In the above, the embodiment in which a control signal is inserted into all of the anterior equalizing pulse interval 312, the vertical synchronizing signal interval 313, and the posterior equalizing pulse interval 314 has been described. Alternatively, a configuration in which a control signal is inserted into the anterior equalizing pulse interval 312 and the posterior equalizing pulse interval 314 may be employed. A single or plural control signals may be inserted into each zone. Also in these configurations, it is possible to detect similar reception abnormality.

In the case where plural control signals are inserted, when the signals are continuously inserted, the ghost detection ability is restricted to one half phase of the horizontal period because the periods of the equalizing pulse and the vertical synchronizing pulse are one half of the horizontal synchronization. However, the ghost detection ability can be improved to the whole phase of the horizontal period by inserting a control signal every other pulse. Furthermore, the detection ability can be widened by, for example, inserting a control signal on alternate pulses or every two or three pulses. When a pattern in which a control signal is continuously inserted is combined with that in which a control signal is inserted on alternate pulses, a difference can be produced between the detection ability for a disturbed wave of one half of the horizontal period or less, and that for other waves, with the result that the disturbed wave detection can be effectively conducted.

In the embodiment, a steep pulse is inserted as a control signal. Alternatively, a control signal such as those shown in FIGS. 6 and 7 may be inserted. The television signal is configured in the same manner as that of FIG. 32, and hence its description is omitted.

Figure 33:
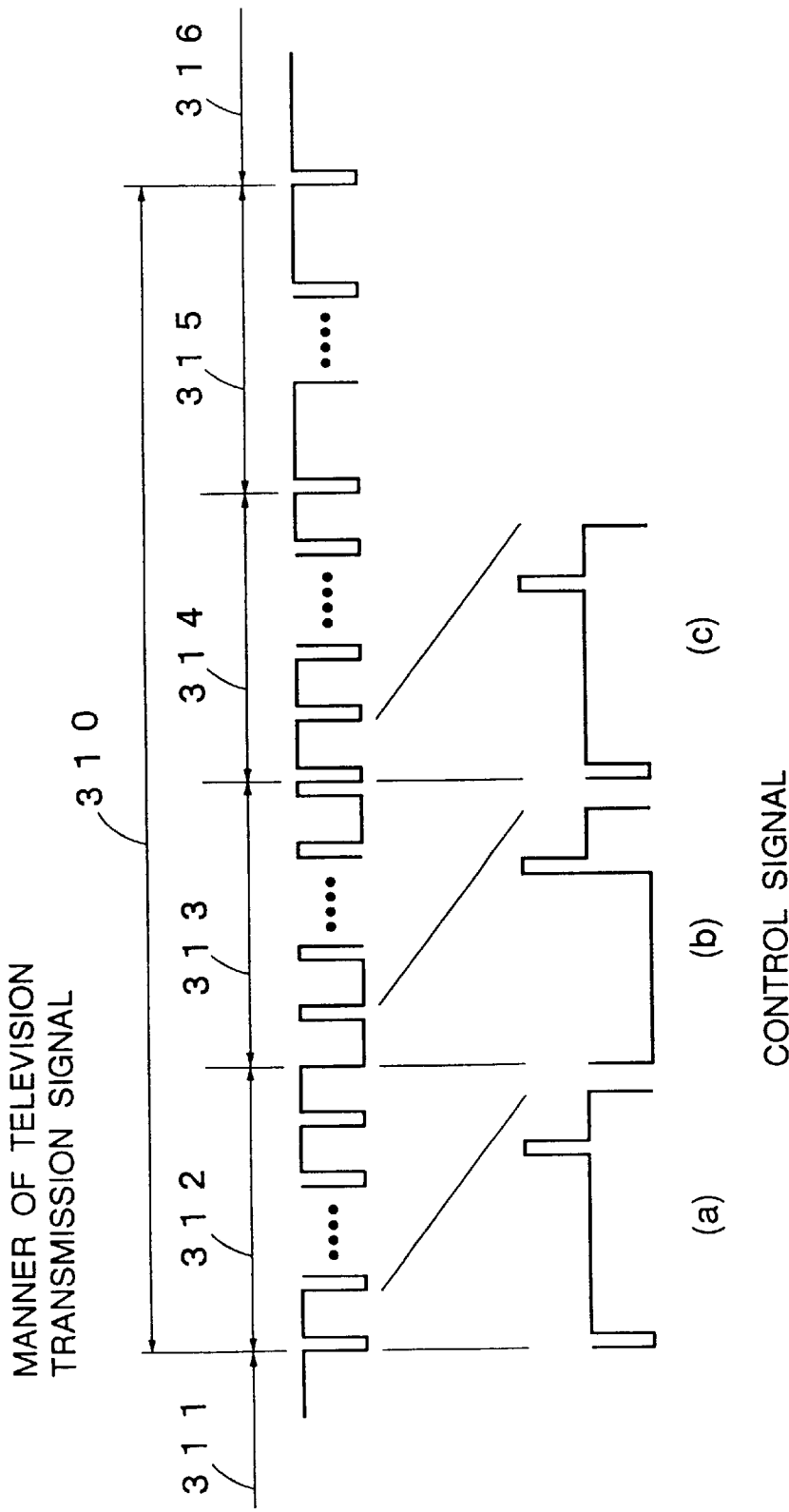
FIG. 33 is a view diagrammatically showing a method of transmitting a television signal which is another embodiment of the invention.
Figure 34:
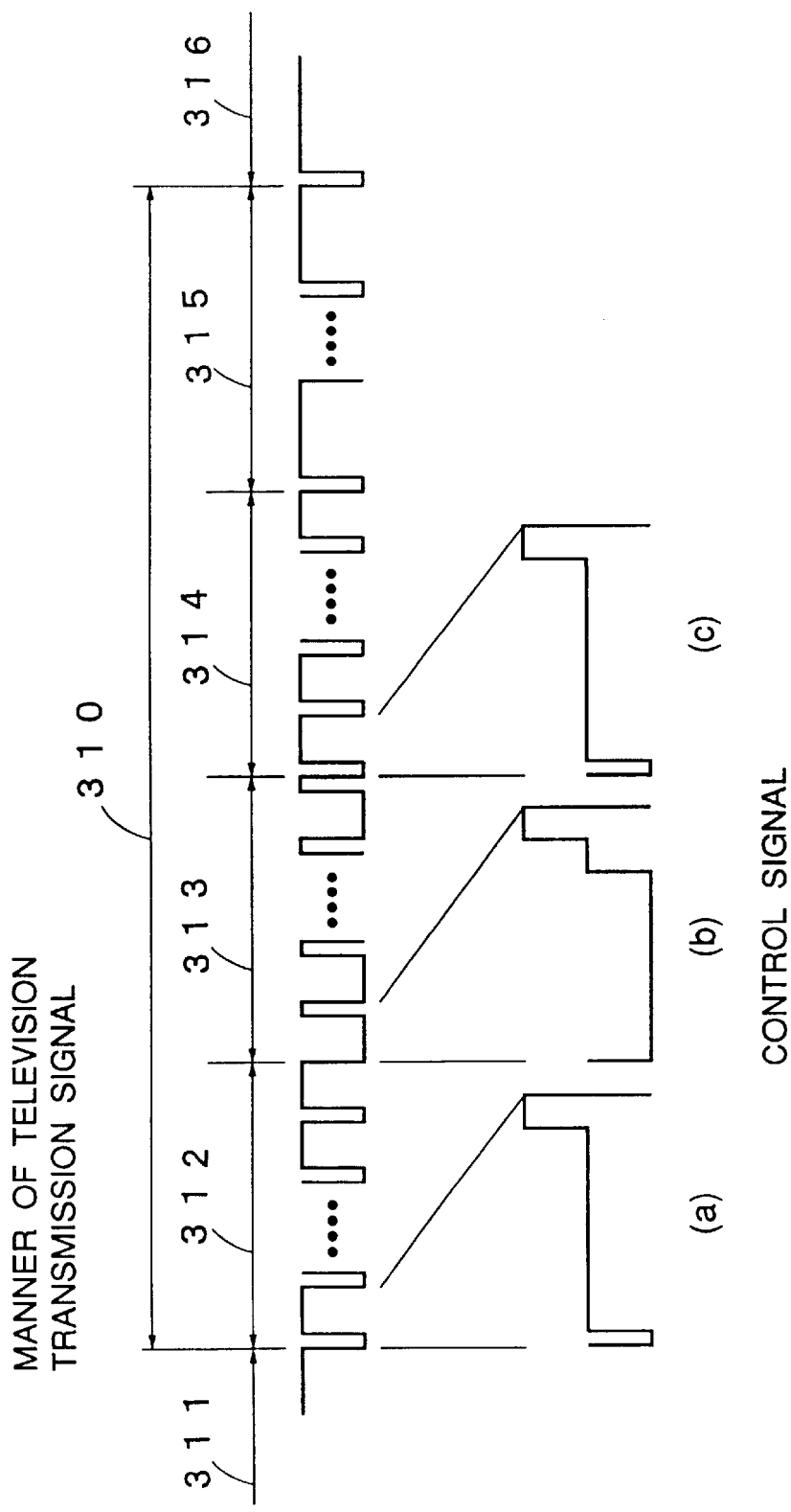
FIG. 34 is a view diagrammatically showing a method of transmitting a television signal which is another embodiment of the invention.

In FIG. 33, (a), (b), and (c) show waveforms of inserted control signals. The control signals have rectangular waveforms. FIG. 34 shows the case where a step function is inserted as a control signal. Also in this case, it is possible to detect similar reception abnormality as that in the embodiment described above.

When the control signals are to be inserted in (a), (b), and (c) of FIGS. 5, 6, and 7, the phase from the falling edge of the corresponding pulse of one period of each of the anterior equalizing pulse interval 312, the posterior equalizing pulse interval 314, and the vertical synchronizing signal interval 313 may be controlled so that the control signals are inserted at the same phase. This enables the method to exert a further correct ability of detecting reception abnormality.

In the embodiment described above, the control signal is inserted into the anterior equalizing pulse interval 312, he vertical synchronizing signal interval 313, and the posterior equalizing pulse interval 314. The control signal may be inserted also into the reserve video signal interval 315. In this case, the control signals are increased in number and hence reception abnormality can be detected more correctly.

Also in the case of a television signal in which the GCR such as the ghost cancel signal is previously inserted into the reserve video signal interval, the control signal according to the invention can be further inserted. In this configuration, the present invention causes the number of control signals to be further increased. Therefore, the ghost detection can be conducted more rapidly.

(Embodiment 7)

Figure 35:
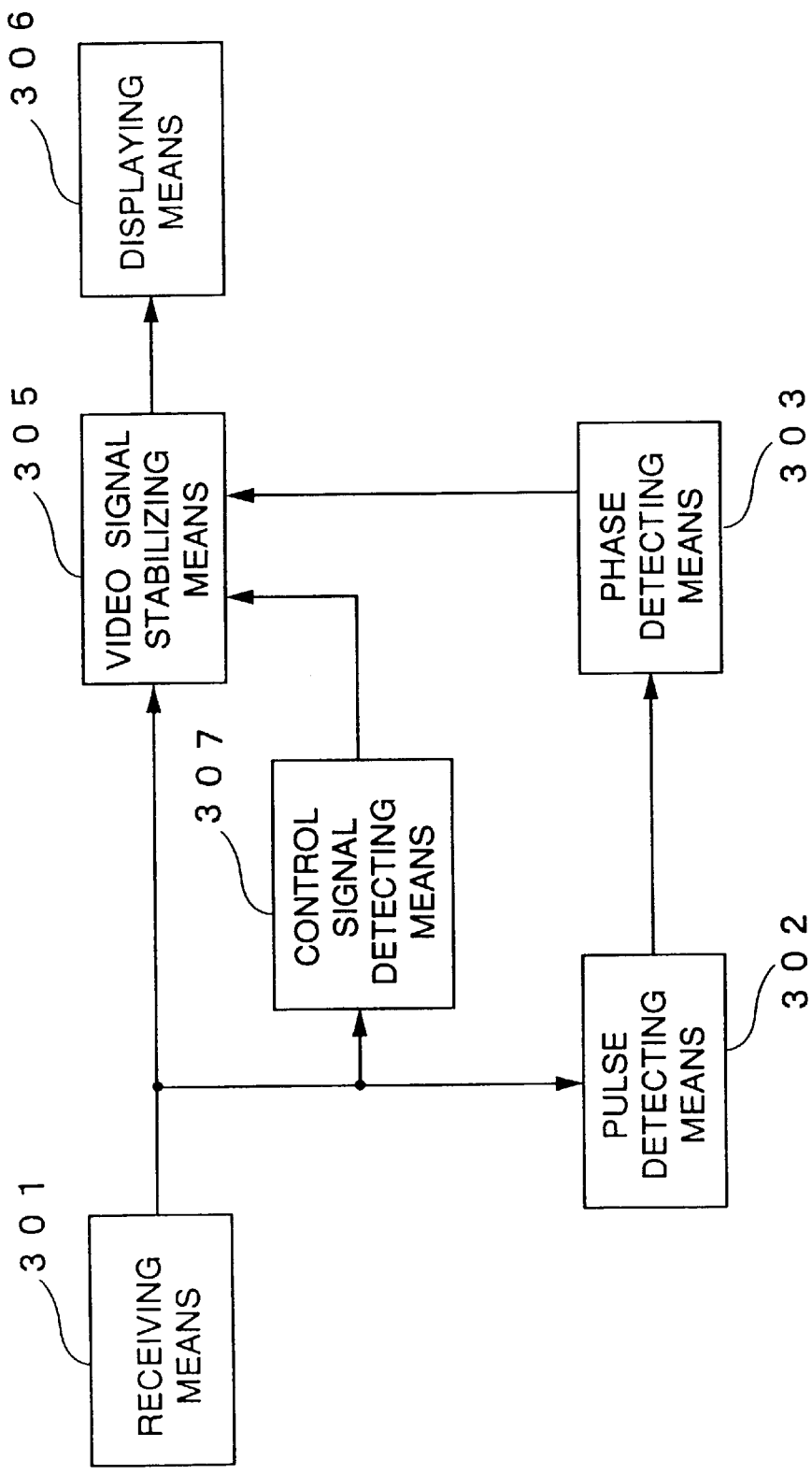
FIG. 35 is a view showing the configuration of a television signal receiver which is another embodiment of the invention.

FIG. 35 is a view showing the configuration of a television signal receiver which is an embodiment of the invention.

The configuration of the embodiment will be described with reference to the figure. The components which are fundamentally identical with those of the embodiment described with reference to FIG. 28 and the like are designated by the same reference numerals, and their description is omitted. As shown in FIG. 35, as compared with the embodiment of FIG. 28, the ghost detecting means 304 of FIG. 28 is replaced with control signal detecting means 307.

Hereinafter, the control signal detecting means 307 of the embodiment will be described. A control signal such as that used in the method of transmitting a television signal of the invention is inserted into a television signal. The control signal detecting means 307 detects the control signal from the television signal. For example, the case where a television signal shown in FIG. 32 is received will be considered. First, when a video signal is not disturbed, a reception waveform similar to that of FIG. 32(a) can be obtained. When a video signal is disturbed, a single pulse such as shown in FIG. 32(a) does not appear, but instead plural pulses appear at various levels. The control signal detecting means 307 in the embodiment detects the disturbance amount from the control signal in such a disturbed state. The means has a function of obtaining the disturbance amount, such as the delay time of a ghost, the ghost amount, or a transfer function of a ghost and a disturbed signal. Ghosts are detected in the equalizing pulse interval or the vertical synchronizing signal interval in the vertical blanking interval.

On the basis of the disturbed state or the ghost state obtained by the disturbed signal detecting function of the control signal detecting means 307 and the disturbed state detecting function due to pulse detecting means 302 and phase detecting means 303, video signal stabilizing means 305 stabilizes the video signal. As a result, image stabilization which is superior to that of the embodiment described above can be conducted.

In the embodiment, disturbance information obtained in the phase detecting means 303 is transmitted only to the video signal stabilizing means 305. Alternatively, the disturbance information may be transmitted also to the control signal detecting means 307, thereby enabling the control signal detecting means 307 to obtain a transfer function of disturbance more rapidly. In the alternative, the responsiveness of eliminating a disturbance is enhanced, so that the receiver operates more effectively in the use of mobile reception.

Figure 36:
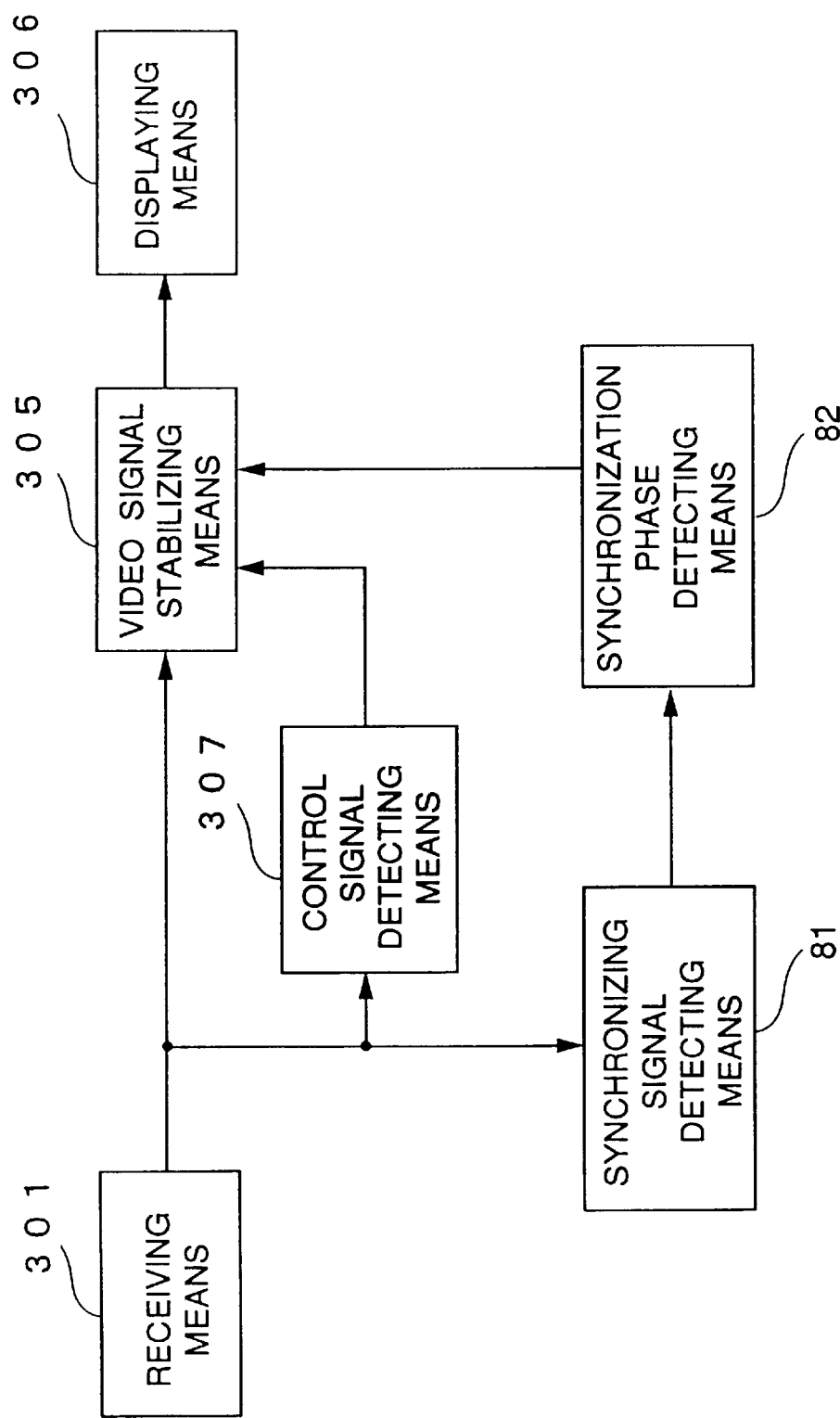
FIG. 36 is a view showing the configuration of a television signal receiver which is another embodiment of the invention.

In the above, the embodiment of the television signal receiver which comprises the pulse detecting means 302 and the phase detecting means 303 has been described. The invention is not restricted to this. As shown in FIG. 36, for example, a configuration which, in place of these means, uses synchronizing signal detecting means 81 and synchronization phase detecting means 82 may be employed. As shown in the figure, the receiver comprises: receiving means 301; the synchronizing signal detecting means 81 for detecting a synchronizing signal of a signal obtained from the receiving means 301; the synchronization phase detecting means 82 for detecting the phase of the synchronizing signal obtained from the synchronizing signal detecting means 81; control signal detecting means 307 for detecting a control signal from the video signal obtained in the receiving means 301; video signal stabilizing means 305 for stabilizing the video signal on the basis of control information obtained from the control signal detecting means 307. and disturbance information obtained from the synchronization phase detecting means 82; and displaying means for displaying the signal.

The operations of the synchronizing signal detecting means 81 and the synchronization phase detecting means 82 will be described. The synchronizing signal detecting means 81 detects synchronizing signals from the video signal, and the synchronization phase detecting means 82 prepares the distribution of the obtained synchronizing signals. This functions in the same manner as the phase detecting means 303 of FIG. 28, and hence a synchronization phase distribution similar to that shown in FIG. 29 can be obtained. In this case, however, the period is obtained with using one horizontal period as a reference. In the same manner as the phase detecting means 303, also the synchronization phase detecting means 82 can obtain the disturbed state of the video signal, and the delay time and delay amount of a ghost.

As described above, also the embodiment in which the pulse detecting means 302 and the phase detecting means 303 are respectively replaced with the synchronizing signal detecting means 81 and the synchronization phase detecting means 82 can attain effects which are equivalent to those of the embodiment described above.

In the embodiment, disturbance information obtained in the phase detecting means 82 is transmitted only to the video signal stabilizing means 305. Alternatively, the disturbance information may be transmitted also to the control signal detecting means 307, thereby enabling the control signal detecting means 307 to operate rapidly and correctly.

Figure 37:
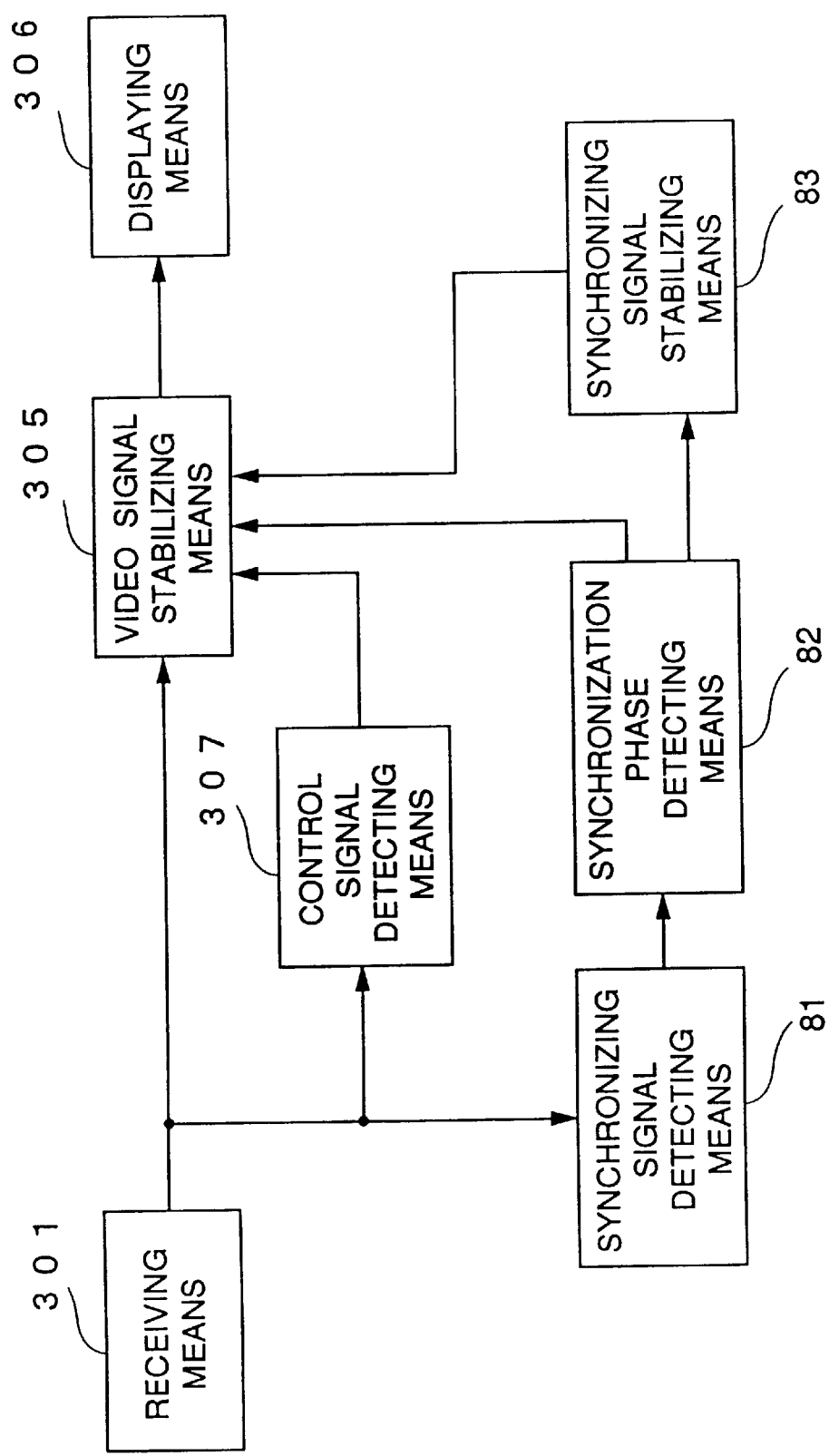
FIG. 37 is a view showing the configuration of a television signal receiver which is another embodiment of the invention.

The embodiment of FIG. 36 may be modified so as to further comprise synchronizing signal stabilizing means 83. FIG. 37 shows a television signal receiver to which the synchronizing signal stabilizing means 83 is added. As shown in the figure, the receiver comprises: receiving means 301; synchronizing signal detecting means 81 for detecting a synchronizing signal of a signal obtained from the receiving means 301; synchronization phase detecting means 82 for detecting a phase of the synchronizing signal obtained from the synchronizing signal detecting means 81; synchronizing signal stabilizing means 83 for estimating a correct phase from the phase of the synchronizing signal obtained from the synchronization phase detecting means; control signal detecting means 307 for detecting a control signal from a video signal obtained in the receiving means 301; video signal stabilizing means 305 for stabilizing the video signal on the basis of a stabilized synchronizing signal obtained in the synchronizing signal stabilizing means 83; and displaying means for displaying the signal. The synchronizing signal stabilizing means 83 estimates a correct horizontal synchronization phase or a vertical synchronization phase from the phase distribution such as that shown in FIG. 29, and generates the stabilized synchronizing signal. Therefore, the television signal receiver of the embodiment can attain an effect that distortion or a flow of a video signal due to a lack or abnormality of synchronization can be reduced, in addition to the effects of the television signal receiver described above.

Figure 38:
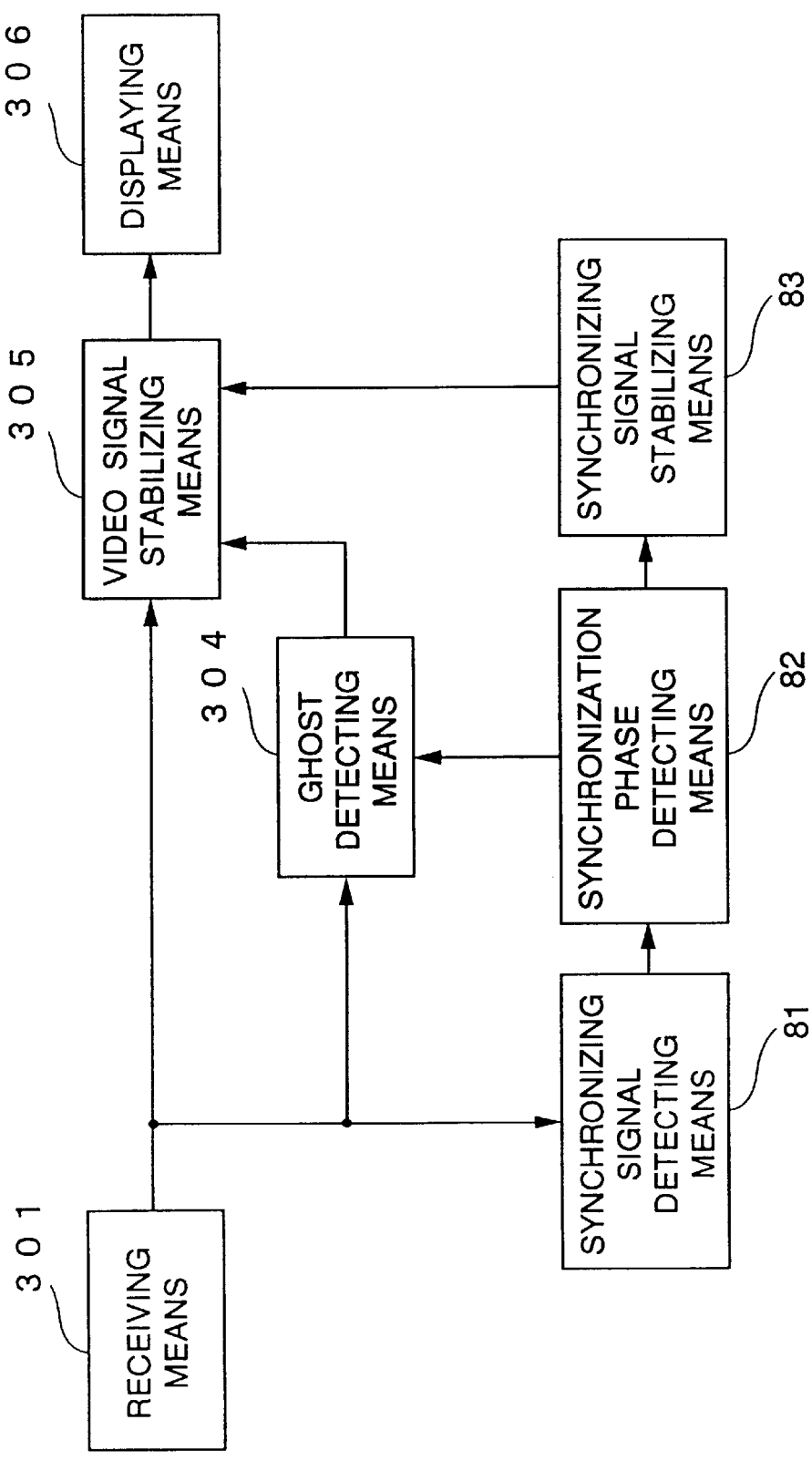
FIG. 38 is a view showing the configuration of a television signal receiver which is another embodiment of the invention.

In the above, the embodiment which uses the control signal detecting means 307 has been described. As shown in FIG. 38, the embodiment may be modified so as to use ghost detecting means 304.

FIG. 38 is a view showing the configuration of a television signal receiver as another example which uses the ghost detecting means 304 in place of the control signal detecting means 307 of the television signal receiver of FIG. 37. As shown in the figure, the television signal receiver comprises: receiving means 301; synchronizing signal detecting means 81 for detecting a synchronizing signal of a signal obtained from the receiving means 301; synchronization phase detecting means 82 for detecting the phase of the synchronizing signal obtained from the synchronizing signal detecting means 81; synchronizing signal stabilizing means 83 for estimating a correct phase from the phase of the synchronizing signal obtained from the synchronization phase detecting means 82; ghost detecting means 304 for detecting a ghost cancel signal from a video signal obtained from the receiving means 301, on the basis of control information from the synchronization phase detecting means 82; video signal stabilizing means 305 for stabilizing the video signal on the basis of disturbance information of a received signal obtained from ghost detecting means 304 and a stabilized synchronizing signal obtained in the synchronizing signal stabilizing means 83; and displaying means for displaying the signal. In this case, the synchronization phase detecting means 82 previously gives a ghost signal to the ghost detecting means 304, and hence it is possible to attain an effect that the process is conducted rapidly and correctly, in addition to the effects of the embodiment described above. Even when the control information obtained in the synchronization phase detecting means 82 is independently transmitted to the video signal stabilizing means 305, it is possible to attain effects which are substantially equivalent to those of the embodiment described above.

Figure 39:
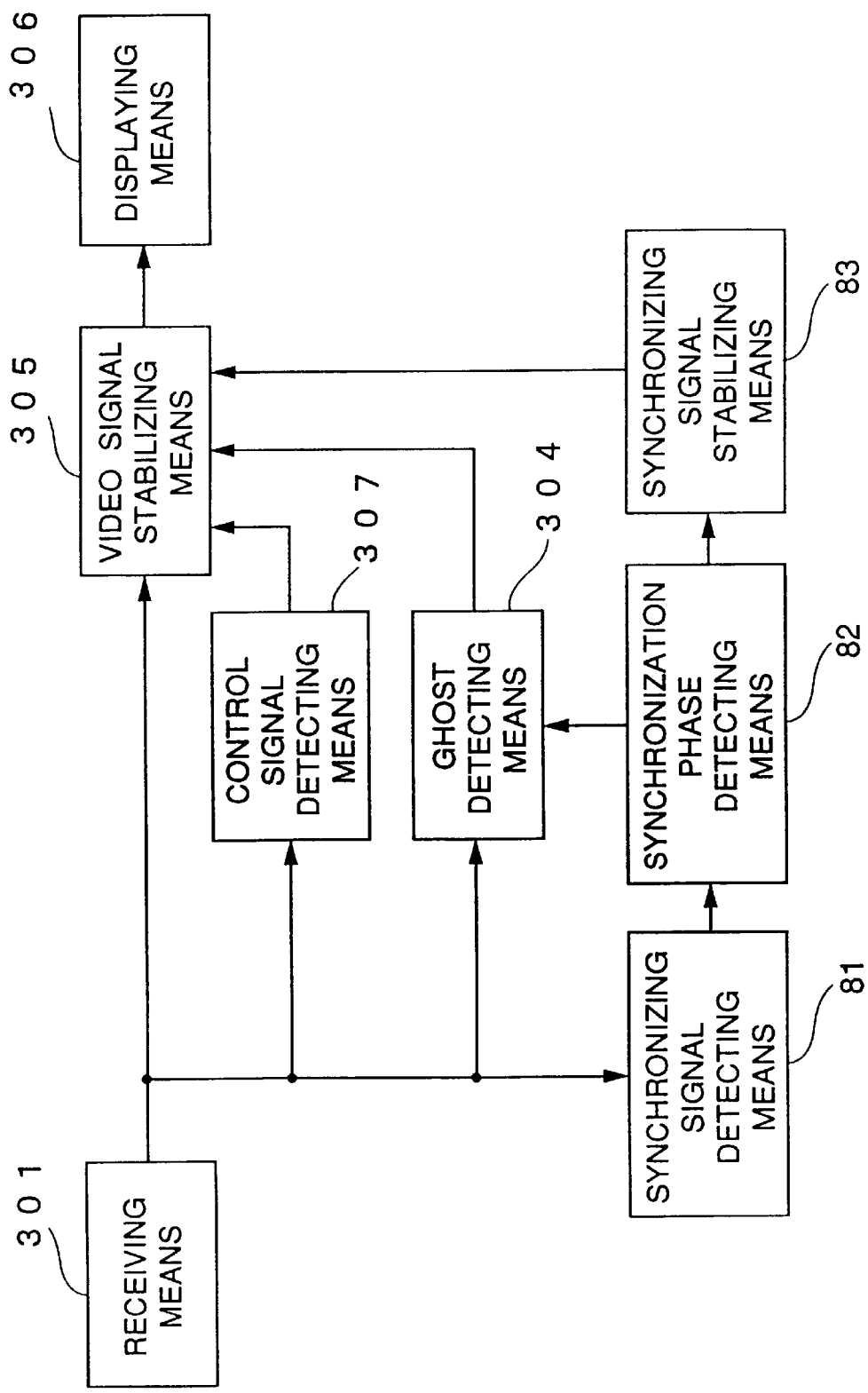
FIG. 39 is a view showing the configuration of a television signal receiver which is another embodiment of the invention.
Figure 40:
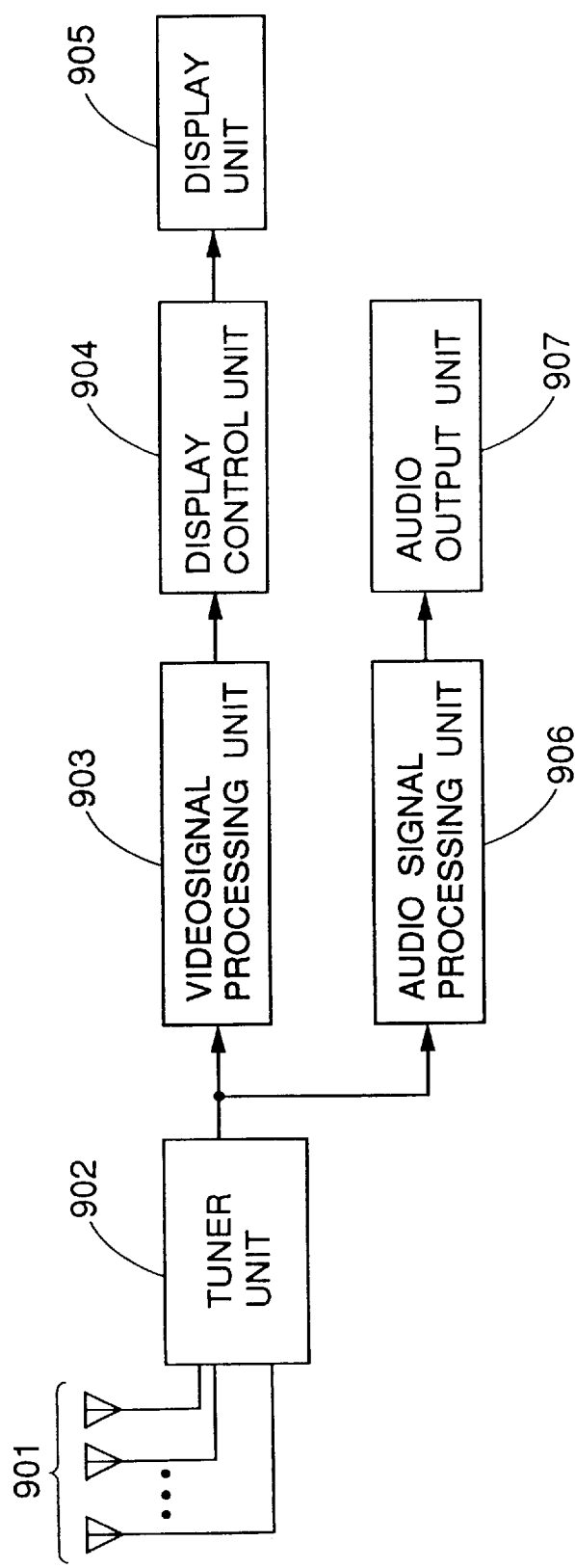
FIG. 40 is a view showing the configuration for reception in a car television set of the prior art.

In the above, the embodiment which comprises the ghost detecting means 304 in place of the control signal detecting means 307 has been described. The invention is not restricted to this. A configuration in which both the control signal detecting means 307 and the ghost detecting means 304 are disposed may be employed. FIG. 39 shows a television signal receiver in which control signal detecting means is added to the configuration of the television signal receiver of FIG. 38. As shown in the figure, the receiver comprises: receiving means 301; synchronizing signal detecting means 81 for detecting a synchronizing signal of a signal obtained from the receiving means 301; synchronization phase detecting means 82 for detecting the phase of the synchronizing signal obtained from the synchronizing signal detecting means 81; synchronizing signal stabilizing means 83 for estimating a correct phase from the phase of the synchronizing signal obtained from the synchronization phase detecting means; ghost detecting means 304 for detecting a ghost cancel signal from a video signal obtained from the receiving means 301, on the basis of control information from the synchronization phase detecting means 82; control signal detecting means 307 for detecting a control signal from a video signal obtained in the receiving means 301; video signal stabilizing means 305 for stabilizing the video signal on the basis of disturbance information of a received signal obtained from the control signal detecting means 307 and a stabilized synchronizing signal obtained in the synchronizing signal stabilizing means 83; and displaying means for displaying the signal. In this case, it is possible to attain an effect that the process is conducted rapidly and correctly, as compared with the embodiment described above.

Hereinafter, relationships between the ghost detecting means 304 and the synchronization phase detecting means 82 will be described.

In the ghost detecting means 304, the accuracy of the result of the ghost detection using the GCR can be improved on the basis of the detection result of the synchronization phase detecting means 82, and the detection speed can be enhanced by using a signal in the synchronization phase detecting means 82.

Next, the operation will be described. In the synchronization phase detecting means 82, as shown in FIGS. 20(A) to 20(D), the phase of the synchronizing signal is detected on the basis of the synchronization phase distribution (FIG. 20(A)), and, when ghosts occur, a distribution such as that shown in FIG. 20(C) or 20(D) is obtained. As a result, it is possible to detect also the phase of a ghost signal. The phase of the synchronizing signal and the ghost phase obtained in the synchronization phase detecting means 82 are compared with the ghost phase obtained in the ghost detecting means 304. If the ghost phases are substantially identical with each other, the ghost detecting means 304 transmits the result of the ghost detection to the video signal stabilizing means 305. If the ghost phases of the ghost detecting means 304 and the synchronization phase detecting means 82 are not close to each other, there is a possibility that erroneous detection has occurred, and hence it is judged that a ghost does not occur. (This is effective in the case where the time constant of the ghost detecting means is set to be small in order to cope with varying ghosts. There is a high possibility that the result of the ghost detection obtained from the ghost detecting means 304 by using the GCR contain many errors. Therefore, the synchronization phase detecting means 82 is used as data for verification. This can improve the accuracy and the detection speed.) When the detection speed of the ghost detecting means 304 is set so as to have a sufficiently large time constant, the result of the detection of the ghost detecting means 304 using the GCR may be output as it is, irrespective of the result of the synchronization phase detecting means 82 (under conditions which are set so that no ghost occurs, such as the case where the antenna is fixed). When one of the detection of the ghost detecting means 304 using the GCR, and the synchronization phase detecting means 82 indicates that several ghosts of the same degrees are continuously detected, it may be judged that ghosts occur. When ghosts of the same degrees are alternatingly detected, it may be judged that ghosts occur. In these cases, ghost detection can be rapidly conducted.

As apparent from the above description, the invention can provide a television signal for facilitating detection of a disturbance of a received video signal, whereby the received video signal can be further stabilized as compared with the prior art, and also an image in which, even when the disturbance state is changed in mobile reception, high followability is obtained and which is therefore easy to watch.

What is claimed is:

1. A television receiver comprising:

receiving means for receiving a television signal;

synchronizing signal detecting means for detecting a synchronizing signal of a video signal obtained from said receiving means;

electric field information detecting means for detecting electric field information from a signal obtained from said receiving means;

synchronizing signal stabilizing means for stabilizing the detected synchronizing signal on the basis of the electric field information;

display controlling means for controlling a display of the video signal by using the stabilized synchronizing signal; and displaying means for displaying a signal output from said display controlling means.

2. A television receiver according to claim 1, wherein objects which are to stabilized by said video signal stabilizing means include a luminance signal, a color signal, ghosts, and an image skip.

3. A television receiver comprising:

receiving means for receiving a television signal;

synchronizing signal detecting means for detecting a synchronizing signal of a video signal obtained from said receiving means;

synchronizing signal stabilizing means for stabilizing the detected synchronizing signal;

video signal stabilizing means for stabilizing the video signal obtained from said receiving means, by using the stabilized synchronizing signal, and for outputting the stabilized video signal;

display controlling means for controlling a display of the stabilized video signal by using the stabilized synchronizing signal; and displaying means for displaying a signal output from said display controlling means;

wherein said receiver further comprises electric field information detecting means for detecting electric field information from a signal obtained from said receiving means, said synchronizing signal stabilizing means stabilizes the synchronizing signal on the basis of the electric field information obtained from said electric field information detecting means, and/or said video signals stabilizing means stabilizes the video signal by using also the electric field information obtained from said electric field information detecting means.

4. A television receiver according to claim 3, wherein said receiver further comprises:

noise predicting means for predicting noises of an audio signal obtained from said receiving means, on the basis of the obtained electric field information;

noise canceling means for reducing noises of the audio signal on the basis of the predicted noises obtained from said noise predicting means and the obtained electric field information; and audio signal reproducing means for reproducing an audio signal output from said noise canceling means.

* * * * *

UNITED STATES PATENT AND TRADEMARK OFFICE
CERTIFICATE OF CORRECTION

PATENT NO.   : 6,473,134 B1                                               Page 1 of 1
DATED        : October 29, 2002
INVENTOR(S)  : Akira Nohara et al.

It is certified that error appears in the above-identified patent and that said Letters Patent is hereby corrected as shown below:

Column 41,
Line 28, after the words "to claim" delete the number "1" and insert the number -- 3 --.
Line 29, after the words "which are to" insert the word -- be --.

Signed and Sealed this

Seventh Day of October, 2003

JAMES E. ROGAN
*Director of the United States Patent and Trademark Office*